(12) United States Patent
Chen et al.

(10) Patent No.: US 10,200,709 B2
(45) Date of Patent: Feb. 5, 2019

(54) HIGH-LEVEL SYNTAX EXTENSIONS FOR HIGH EFFICIENCY VIDEO CODING

(71) Applicant: QUALCOMM Incorporated, San Diego, CA (US)

(72) Inventors: Ying Chen, San Diego, CA (US); Ye-Kui Wang, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 13/801,731

(22) Filed: Mar. 13, 2013

(65) Prior Publication Data

US 2013/0243081 A1    Sep. 19, 2013

Related U.S. Application Data

(60) Provisional application No. 61/611,959, filed on Mar. 16, 2012, provisional application No. 61/624,990, (Continued)

(51) Int. Cl.
*H04N 19/58* (2014.01)
*H04N 19/51* (2014.01)
(Continued)

(52) U.S. Cl.
CPC ............ *H04N 19/51* (2014.11); *H04N 19/52* (2014.11); *H04N 19/58* (2014.11); *H04N 19/597* (2014.11); *H04N 19/70* (2014.11)

(58) Field of Classification Search
CPC ........ H04N 19/70; H04N 19/00; H04N 19/51; H04N 19/58
See application file for complete search history.

(56) References Cited

U.S. PATENT DOCUMENTS 7,023,921 B2  4/2006  Subramaniyan et al.
7,876,828 B2  1/2011  Lee et al.
(Continued)

FOREIGN PATENT DOCUMENTS

AU    2013231961 B2    7/2017
CN    101248670 A      8/2008
(Continued)

OTHER PUBLICATIONS

Takahashi, et al. "Descriptions of 3D Video Coding Proposal (HEVC-Compatible Category)", ISO/IEC JTC1/SC29/WG11 MPEG2011/M22566 Nov. 2011, Geneva, CH.*
(Continued)

*Primary Examiner* — James M Pontius
*Assistant Examiner* — Kyle M Lotfi
(74) *Attorney, Agent, or Firm* — Shumaker & Sieffert, P.A.

(57) ABSTRACT

In one example, a device includes a video coder configured to code a picture order count (POC) value for a first picture of video data, code a second-dimension picture identifier for the first picture, and code, in accordance with a base video coding specification or an extension to the base video coding specification, a second picture based at least in part on the POC value and the second-dimension picture identifier of the first picture. The video coder may comprise a video encoder or a video decoder. The second-dimension picture identifier may comprise, for example, a view identifier, a view order index, a layer identifier, or other such identifier. The video coder may code the POC value and the second-dimension picture identifier during coding of a motion vector for a block of the second picture, e.g., during advanced motion vector prediction or merge mode coding.

59 Claims, 12 Drawing Sheets

Related U.S. Application Data filed on Apr. 16, 2012, provisional application No. 61/658,344, filed on Jun. 11, 2012, provisional application No. 61/663,484, filed on Jun. 22, 2012, provisional application No. 61/746,476, filed on Dec. 27, 2012.

(51) Int. Cl.
*H04N 19/597* (2014.01)
*H04N 19/52* (2014.01)
*H04N 19/70* (2014.01)

(56) References Cited

U.S. PATENT DOCUMENTS

| | | | |
|---|---|---|---|
| 8,165,216 | B2 | 4/2012 | Chen et al. |
| 2007/0014346 | A1 | 1/2007 | Wang et al. |
| 2007/0064800 | A1 | 3/2007 | Ha |
| 2007/0071107 | A1 | 3/2007 | Ha |
| 2008/0117985 | A1 | 5/2008 | Chen et al. |
| 2008/0137742 | A1 | 6/2008 | Chen et al. |
| 2008/0219351 | A1 | 9/2008 | Kim et al. |
| 2008/0240242 | A1 | 10/2008 | Lainema |
| 2009/0010323 | A1 | 1/2009 | Su et al. |
| 2009/0074073 | A1 | 3/2009 | Srinivasan et al. |
| 2009/0190662 | A1 | 7/2009 | Park et al. |
| 2009/0238269 | A1 | 9/2009 | Pandit et al. |
| 2009/0290643 | A1 | 11/2009 | Yang |
| 2009/0304068 | A1 | 12/2009 | Pandit et al. |
| 2009/0304084 | A1 | 12/2009 | Hallapuro et al. |
| 2009/0310676 | A1 | 12/2009 | Yang |
| 2010/0002762 | A1* | 1/2010 | Pandit ............... H04N 19/597 375/240.01 |
| 2010/0027615 | A1 | 2/2010 | Pandit et al. |
| 2010/0034258 | A1 | 2/2010 | Pandit et al. |
| 2010/0091844 | A1 | 4/2010 | Jeon et al. |
| 2010/0118944 | A1 | 5/2010 | Tanaka et al. |
| 2010/0166074 | A1 | 7/2010 | Ho et al. |
| 2010/0189173 | A1 | 7/2010 | Chen et al. |
| 2010/0202539 | A1 | 8/2010 | Kondo et al. |
| 2010/0220790 | A1 | 9/2010 | Jeon et al. |
| 2010/0246683 | A1 | 9/2010 | Webb et al. |
| 2011/0080954 | A1 | 4/2011 | Bossen et al. |
| 2011/0176615 | A1 | 7/2011 | Lee et al. |
| 2011/0317930 | A1 | 12/2011 | Kim et al. |
| 2012/0189059 | A1 | 7/2012 | Segall |
| 2012/0189060 | A1 | 7/2012 | Lee et al. |
| 2012/0213282 | A1 | 8/2012 | Choi et al. |
| 2012/0269270 | A1 | 10/2012 | Chen et al. |
| 2012/0269271 | A1 | 10/2012 | Chen et al. |
| 2013/0243093 | A1 | 9/2013 | Chen et al. |
| 2013/0272408 | A1 | 10/2013 | Chen |
| 2013/0322536 | A1 | 12/2013 | Yang |
| 2014/0126641 | A1 | 5/2014 | Takahashi et al. |

FOREIGN PATENT DOCUMENTS

| | | |
|---|---|---|
| CN | 101496407 A | 7/2009 |
| CN | 101548550 A | 9/2009 |
| EP | 1377067 A1 | 1/2004 |
| EP | 2285114 A2 | 2/2011 |
| EP | 2424240 A2 | 2/2012 |
| JP | 2009510892 | 3/2009 |
| JP | 2009523355 | 6/2009 |
| JP | 2009543508 | 12/2009 |
| JP | 2010520697 | 6/2010 |
| JP | 2013034171 A | 2/2013 |
| JP | 2014513897 | 6/2014 |
| KR | 20070036611 A | 4/2007 |
| KR | 20090046826 A | 5/2009 |
| KR | 20100081984 A | 7/2010 |
| RU | 2381630 C2 | 2/2010 |
| RU | 2443074 C2 | 2/2012 |
| WO | 2007037645 | 4/2007 |
| WO | 2007081176 | 7/2007 |
| WO | 2007114611 A1 | 10/2007 |
| WO | 2008005574 A2 | 1/2008 |
| WO | 2008007913 A1 | 1/2008 |
| WO | 2008047303 A2 | 4/2008 |
| WO | WO2008047303 * | 4/2008 ............... H04N 7/26 |
| WO | 2008053746 | 5/2008 |
| WO | 2008108566 A1 | 9/2008 |
| WO | 2009051419 | 4/2009 |
| WO | 2010043773 A1 | 4/2010 |
| WO | 2012124121 | 9/2012 |
| WO | 2012144829 A2 | 10/2012 |
| WO | 2013002109 A1 | 1/2013 |
| WO | 2013028116 A1 | 2/2013 |
| WO | 2013030456 A1 | 3/2013 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross et al., "WD5: Working Draft 5 of High-Efficiency Video Coding," JCTVC-G1103, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen et al., "AHG10: Hooks related to motion for the 3DV extension of HEVC", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/,No. JCTVC-J0122, XP030112484, 20 pp.

Chen et al., "AHG12: Hooks for temporal motion vector prediction and weighted prediction in HEVC multiview/3DV extension", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-I0353, XP030112116, 7 pp.

Chen et al.,"AHG10: Motion related hooks for HEVC multiview/3DV extension based on long-term reference pictures", MPEG Meeting; Jul. 11-20, 2012; Stockholm; (Motion Picture Expert Group or ISO/IEC JTC1/SC29/WG11), No. m25443, XP030053777, 8 pp.

Hannuksela et al., "AHG21: On reference picture list construction and reference picture marking", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G643, XP030110627, 10 pp.

International Search Report and Written Opinion—PCT/US2013/031573, ISA/EPO, dated Aug. 5, 2013, 26 pp.

(56) References Cited

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jeon, et al., "Non-CE9: simplification of merge/skip TMVP ref_idx derivation," Document: JCTVC-G163, M21716, Joint Collaborative Team on Video Coding (JCT-VC) of ITU-T SG16 WP3 and ISO/IEC JTC1/SC29/WG11, 7th Meeting: Geneva, CH, Nov. 19-30, 2011, 12 pp.

Lin et al: "Improved Advanced Motion Vector Prediction", MPEG Meeting; Jan. 20-28, 2011,; Daegu; (Motion Picture Expert Group or ISO / IEC JTC1/SC29/WG11), No. m18877, XP030047446, 8 pp.

Kim, et al: "Restricted usage of motion vectors for long-term reference picture in motion vector prediction process", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/,, No. JCTVC-J0302, XP030112664, 13 pp.

Kim, et al., "Restriction on motion vector scaling for Merge and AMVP", JCT-VC Meeting, MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/,,No. JCTVC-G551, XP030110535, 4 pp.

Li, et al., "High-level Syntax: Marking process for non-TMVP pictures", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G398, XP030110382, 3 pp.

Lim, et al., "MVP scaling issue for LTRPs", JCT-VC Meeting; MPEG Meeting; Apr. 27-May 7, 2012; Geneva; (Joint Collaborative Team on Video Coding-of ISO/IEC JTC1/SC29/WG11 and ITU-T SG.16); URL: http://wftp3.itu.int/av-arch/jctvc-site/, No. JCTVC-I0422, XP030112185, 4 pp.

Nam et al., "Advanced motion and disparity prediction for 3D video coding", MPEG Meeting; Nov. 28-Dec. 2, 2011; Geneva; (Motion Picture Expert Group or ISO/IEC JTC1/SC29/WG11), No. m22560, XP030051123, 6 pp.

Ohm, et al., "Work Plan in 3D Standards Development," Document: JCT3V-B1006, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 5 pp.

Partial International Search Report—PCT/US2013/031573, ISA/EPO, dated Jun. 19, 2013, 11 pp.

Senoh, et al., "Disparity vector prediction CE plan for MVC/CE4", MPEG Meeting; Apr. 3-7, 2006, Montreux; (Motion Pictureexpert Group or ISO / IEC JTC1/SC29/WG11), No. M13166, XP030041835, ISSN: 0000-0239, 6 pp.

Lee et al., "Disparity vector prediction in MVC", JVT Meeting; MPEG Meeting; Apr. 21-27, 2007; San Josa CR, US; (Joint Video Team of ISO/IEC JTC1/SC29/WG11 and ITU-T SG.16), No. JVT-W104, XP030007064, ISSN: 0000-0153, 8 pp.

Takahashi, et al., "3D-HEVC-CE3 results on motion parameter prediction by Sony", MPEG Meeting; Feb. 6-10, 2012; San Josa CR; (Motion Picture Expert Group or ISO/IEC JTC1/SC29/WG11), No. m23639, XP030052164, 4 pp.

Takahashi, et al., "Descriptions of 3D Video Coding Proposal (HEVC-Compatible Category) by Sony", 98. MPEG Meeting; Nov. 28-Dec. 2, 2011 Geneva; (Motion Picture Expert Group or ISO/IEC JTC1/SC29/WG11), No. m22566, XP030051129, 36 pp.

Takahashi, et al., "High-level Syntax: Motion vector prediction issue for long-term reference picture", JCT-VC Meeting; MPEG Meeting; Jul. 11-20, 2012; Stockholm; (Joint Collaborative Team on Video Coding of ISO/IEC JTC1/SC29/WG11 and ITU-T 5G.16); URL: http://wftp3.itu.int/av-arch/jctvc-site/, No. JCTVC-J0071, XP030112433, 6 pp.

Tech, et al., "MV-HEVC Working Draft 2," Document: JCT3V-B1004_d0, Joint Collaborative Team on 3D Video Coding Extension Development, of ITU-T SG 16 WP 3 and ISO/IEC JTC 1/SC 29/WG 11, 2nd Meeting: Shanghai, CN, Oct. 13-19, 2012, 22 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

Zheng et al., "Extended Motion Vector Prediction for Bi predictive Mode", JCT-VC Meeting; MPEG Meeting; Mar. 16-23, 2011; Geneva; (Joint Collaborative Team on Video Coding of ISO/IEC JTC1/SC29/WG11and ITU-T SG.16); URL: http://wftp3.itu.int/av-arch/jctvc-site/No. JCTVC-E343, XP030008849, ISSN: 0000-0005, 4 pp.

Zhou, "Non-CE9: Modified H positions for memory bandwidth reduction in TMVP derivation," Document: JCTVC-G082, M21630, Joint Collaborative Team on Video Coding (JCT-VC) of ITU-T SG16 WP3 and ISO/IEC JTC1/SC29/WG11, 7th Meeting: Geneva, CH, Nov. 19-30, 2011, 12 pp.

Jung, et al, "Description of Core Experiment 9: MV Coding and Skip/Merge operations", [online], JCTVC-D609, Retrieved from the internet: <URL:http://phenix.it-sudparis.eu/jct/doc_end_user/documents/4_Daegu/wg11/JCTVC-D609-v3.zip>, Feb. 14, 2011, 11 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Bross, et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.

International Preliminary Report on Patentability—PCT/US2013/031573, The International Bureau of WIPO—Geneva, Switzerland, dated Jul. 8, 2014, 10 pp.

ITU-T H.264, Series H: Audiovisual and Multimedia Systems, Infrastructure of audiovisual services—Coding of moving video, Advanced video coding for generic audiovisual services, Mar. 2005, 343 pages.

ITU-T H.265, Series H: Audiovisual and Multimedia Systems, Infrastructure of audiovisual services—Coding of moving video, High efficiency video coding, The International Telecommunication Union, Apr. 2013, 317 pp.

"Joint Draft 8.0 on Multiview Video Coding", 28th JVT meeting, Hannover, Germany, Document: JVT-AB204 (rev.1), Jul. 2008. available from http:// wftp3.itu.int/av-arch/jvt-site/2008_07_Hannover/JVT-AB204.

JVT-AD007, "Editor's draft revision to ITU-T Rec. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip.

Schwarz, et al., "Test Model under Consideration for HEVC based 3D video coding", MPEG Meeting; Nov. 28, 2011-Feb. 12, 2012; Geneva; (Motion Picture Expert Group or ISO/IEC JTC1/ SC29/WG11), No. M12350, XP030018845, 42 pp.

"Text of ISO/IEC FDIS 23002-3 Representation of Auxiliary Video and Supplemental Information," ISO/IEC JTC 1/SC 29/WG 11, MPEG Doc, N81368, Marrakech, Morocoo, Jan. 2007, 27 pp.

Second Written Opinion from International Application No. PCT/US2013/031573, dated Mar. 24, 2014, 12 pp.

Bossen, et al, Simplified motion vector coding method, Joint Collaborative Team on Video Coding (JCT-VC)of ITU-T SG16 WP3 and ISO/IEC JTC1/SC29/WG11JCTVC-B09 4, Retreived from the internet: <http://wftp3.itu.int/av-arch/jctvc-site/2010_07_B_Geneva/JCTVC-B094.doc>, Jul. 2010, 5 pp.

Laroche, et al., "RD Optimized Coding for Motion Vector Predictor Selection",IEEE Transaction on Circuits and Systems for Video

(56) References Cited

OTHER PUBLICATIONS

Technology, IEEE Service Center, Piscataway, NJ, US, vol. 18 (9), Sep. 1, 2008 (Sep. 1, 2008), pp. 1247-1257.
Takahashi Y et al., "Description of 3D Video Coding Proposal (HEVC-compatible category)", MPEG Meeting, Dec. 2, 2011, 36 pp.

* cited by examiner

HIGH-LEVEL SYNTAX EXTENSIONS FOR HIGH EFFICIENCY VIDEO CODING

This application claims the benefit of U.S. Provisional Application Ser. No. 61/611,959, filed on Mar. 16, 2012, U.S. Provisional Application Ser. No. 61/624,990, filed on Apr. 16, 2012, U.S. Provisional Application Ser. No. 61/658,344, filed Jun. 11, 2012, U.S. Provisional Application Ser. No. 61/663,484, filed Jun. 22, 2012, and U.S. Provisional Application Ser. No. 61/746,476, filed Dec. 27, 2012 the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes various techniques for supporting extensions of coding standards, such as the upcoming High Efficiency Video Coding (HEVC) standard, with only high-level syntax changes. For example, this disclosure describes techniques in both the HEVC base specification and HEVC extensions of multiview video codec and/or three-dimensional (3D) video codec, where the base view is compatible with the HEVC base specification. In general, a "base video coding specification" may correspond to a video coding specification, such as HEVC base specification, that is used to code two-dimensional, single-layer video data. Extensions to the base video coding specification may extend the capabilities of the base video coding specification to allow for 3D and/or multi-layer video coding. HEVC base specification represents an example of a base video coding specification, while MVC and SVC extensions to the HEVC base specification represent examples of extensions to a base video coding specification.

In one example, a method includes decoding a picture order count (POC) value for a first picture of video data, decoding a second-dimension picture identifier for the first picture, and decoding, in accordance with a base video coding specification, a second picture based at least in part on the POC value and the second-dimension picture identifier of the first picture. The second-dimention picture identifier may be further simplified to a type of the picture, e.g., whether the picture is a long-term or short-term picture, or whether a picture, when it is a reference picture, has the same picture order count (POC) value as that of the picture referring to it. When generating motion vector candidates from neighboring blocks, a candidate may be considered unavailable when the candidate has a different second-dimension picture identifier than that of the to-be-predicted motion vector, the second-dimension picture identider of which is the picture this motion vector points to and identified by a target reference index.

In another example, a method includes encoding a picture order count (POC) value for a first picture of video data, encoding a second-dimension picture identifier for the first picture, and encoding, in accordance with a base video coding specification, a second picture based at least in part on the POC value and the second-dimension picture identifier of the first picture.

In another example, a device includes a video decoder configured to decode a picture order count (POC) value for a first picture of video data, decode a second-dimension picture identifier for the first picture, and decode, in accordance with a base video coding specification, a second picture based at least in part on the POC value and the second-dimension picture identifier of the first picture.

In another example, a device includes a video encoder configured to encode a picture order count (POC) value for a first picture of video data, encode a second-dimension picture identifier for the first picture, and encode, in accordance with a base video coding specification, a second picture based at least in part on the POC value and the second-dimension picture identifier of the first picture.

In another example, a device includes means for decoding a picture order count (POC) value for a first picture of video data, means for decoding a second-dimension picture identifier for the first picture, and means for decoding, in accordance with a base video coding specification, a second picture based at least in part on the POC value and the second-dimension picture identifier of the first picture.

In another example, a device includes means for encoding a picture order count (POC) value for a first picture of video data, means for encoding a second-dimension picture identifier for the first picture, and means for encoding, in accordance with a base video coding specification, a second picture based at least in part on the POC value and the second-dimension picture identifier of the first picture.

In another example, a computer-readable storage medium having stored thereon instructions that, when executed, cause a processor to decode a picture order count (POC) value for a first picture of video data, decode a second-dimension picture identifier for the first picture, and decode, in accordance with a base video coding specification, a second picture based at least in part on the POC value and the second-dimension picture identifier of the first picture.

In another example, a computer-readable storage medium having stored thereon instructions that, when executed, cause a processor to encode a picture order count (POC) value for a first picture of video data, encode a second-dimension picture identifier for the first picture, and encode, in accordance with a base video coding specification, a second picture based at least in part on the POC value and the second-dimension picture identifier of the first picture.

The details of one or more examples are set forth in the accompanying drawings and the description below. Other features, objects, and advantages will be apparent from the description and drawings, and from the claims.

DETAILED DESCRIPTION

In general, this disclosure describes various techniques for supporting extensions of coding standards, such as the upcoming High Efficiency Video Coding (HEVC) standard, with only high-level syntax (HLS) changes. For example, this disclosure describes techniques in both the HEVC base specification and HEVC extensions of multiview video coding (MVC) and/or three-dimensional video (3DV) coding where the base view is compatible to the HEVC base specification.

This disclosure describes certain techniques to enable a high-level syntax only profile in an HEVC extension specification. The term "inter-view" in the context of MVC/3DV may be substituted by "inter-layer" in the context of Scalable Video Coding (SVC). That is, although the description of these techniques primarily focuses on "inter-view" prediction, the same or similar ideas may be applied to "inter-layer" reference pictures for an HLS-only SVC extension of HEVC.

Figure 1:
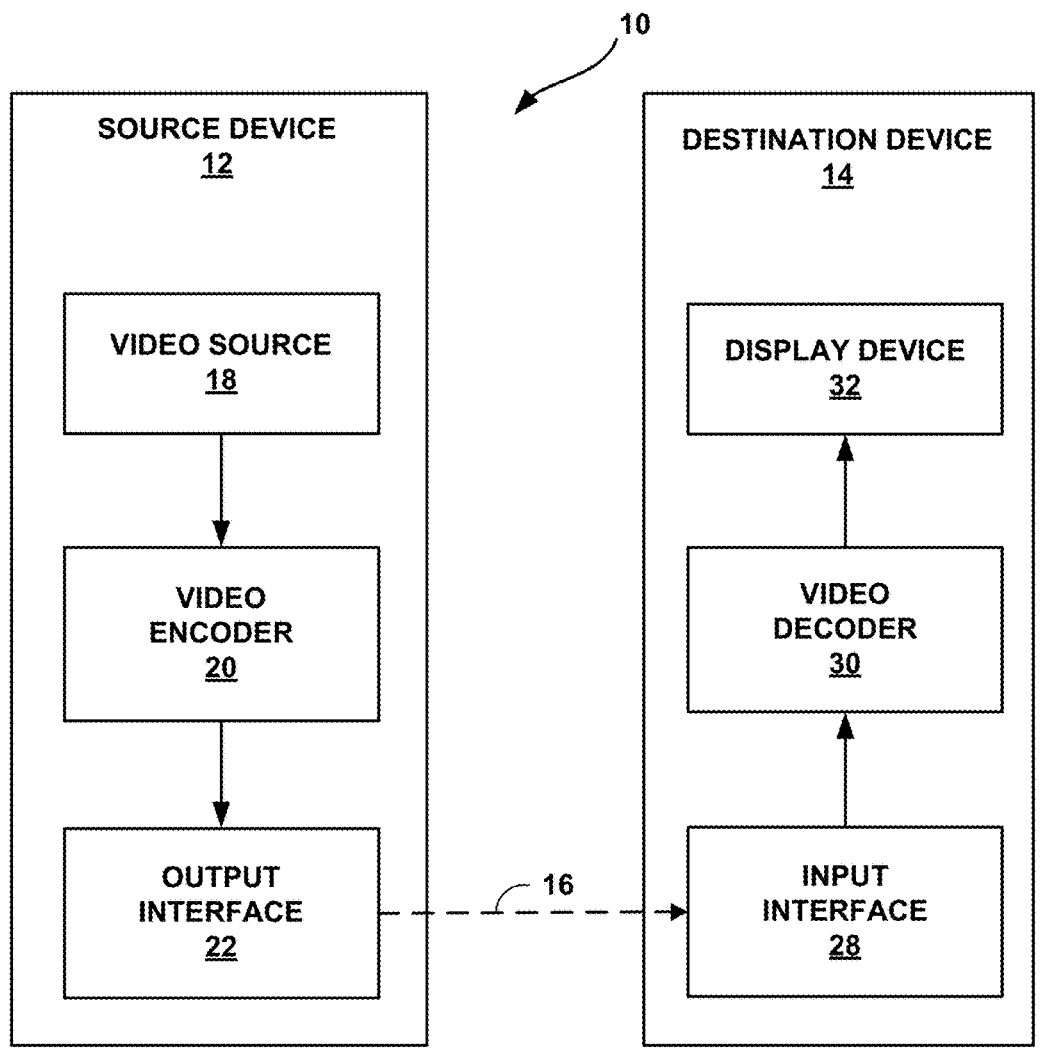
FIG. 1 is a block diagram illustrating an example video encoding and decoding system that may utilize techniques for coding video data according to a high-level syntax only extension of a video coding standard.

FIG. 1 is a block diagram illustrating an example video encoding and decoding system 10 that may utilize techniques for coding video data according to a high-level syntax only extension of a video coding standard. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding video data according to a high-level syntax only extension of a video coding standard. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding video data according to a high-level syntax only extension of a video coding standard may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). A recent draft of HEVC, referred to as "HEVC Working Draft 7" or "WD7" is described in document JCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jun. 22, 2102, is downloadable from http://phenix.it-sudparis.eu/jct/doc_end_user/documents/9_Geneva/wg11/JCTVC-I1003-v3.zip. As noted above, this disclosure includes techniques for extending HEVC using high-level syntax. Accordingly, video encoder 20 and video decoder 30 may operate according to a version of HEVC extended using high-level syntax.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Again, these extensions may be achieved using high-level syntax. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units.

Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In general, this disclosure describes various examples of solutions for enabling a high-level syntax (HLS)-only extension of a video coding standard, such as HEVC. For example, these techniques may be used to develop an HLS-only extension for a profile of HEVC, such as MVC or SVC. Various examples are described below. It should be understood that although various examples are described separately, elements of any or all of the examples may be combined in any combination.

In a first example, there are no changes to the current HEVC base specification. In the HEVC extension, a picture (e.g., a view component) may be identified by two properties: its picture order count (POC) value and a second-dimension picture identifier, e.g., a view_id value (which may identify a view in which the picture is present). Video encoder 20 may be required to indicate a view component to be used for inter-view prediction as a long-term reference picture.

In a second example, there are no changes to the current HEVC base specification. In the HEVC extension, the following changes may apply. A picture (e.g., a view component) may be identified by two properties: POC value and a second-dimension picture identifier, e.g., view_id. In this second example, an additional picture marking process may be introduced immediately before coding a current view component, to mark all the inter-view reference pictures as long-term reference pictures. Another picture marking process may be introduced immediately after coding a current view component, to mark each inter-view reference picture as either long-term, short-tem, or "unused for reference," which is the same as its previous marking status before the current view component is coded.

In a third example, techniques of the second example are used and supplemented as follows. In addition to the techniques of the second example, for each inter-view reference picture, after it is marked as a long-term reference picture, its POC value is mapped to a new POC value, which is not equivalent to the POC value of any existing reference picture. After decoding the current view component, for each inter-view reference picture, its POC value is mapped back to the original POC value, which is equal to the current view component. For example, the current view component may belong to view 3 (assuming view identifier is equal to view order index), and may have a POC value equal to 5. Two inter-view reference pictures may have their POC values (which are both 5) converted to, e.g., 1025 and 2053. After decoding the current view component, the POC values of the inter-view pictures may be converted back to 5.

In a fourth example, techniques of either the second or third examples may be used and supplemented as follows. In addition to the techniques of the first example or the second example, as referred to above, in the HEVC base specification, an additional hook may be used to disable prediction between any motion vector referring to a short-term picture and another motion vector referring to long-term pictures, especially during advanced motion vector prediction (AMVP).

In a fifth example, in the HEVC extension, a picture may be identified by two properties: POC value and a second-dimension picture identification, e.g., view_id. In the HEVC base specification, one or more of the following hooks may be added (alone or in any combination). In one example (referred to as example 5.1), when identifying a reference picture during AMVP and merge mode, a second-dimension picture identification, e.g., view order index, may be used together with POC. In the context of two-dimensional 2D video decoding in the HEVC base specification, the second-dimension picture identification may always be set equal to 0.

In another example (example 5.2), prediction between temporal motion vector and inter-view motion vector is disabled during AMVP (including temporal motion vector prediction (TMVP)). Whether a property of the motion vector may be decided by the associated reference index, which indentifies a reference picture and how the reference picture is being referred to by the picture containing the motion vector, e.g., as a long-term reference picture, a short-term reference picture, or an inter-view reference picture. In another example (example 5.3), prediction between a temporal short-term motion vector and temporal long-term motion vector may be disabled (e.g., explicitly or implicitly). In another example (example 5.4), prediction between temporal short-term motion vector and temporal long-term motion vector may be enabled (e.g., explicitly or implicitly).

In another example (example 5.5), prediction between motion vectors referring to two different inter-view reference pictures may be disabled (e.g., explicitly or implicitly). Two inter-view reference pictures may be considered as having different types if the second-dimension picture identifier values for them are different. In another example (example 5.6), prediction between motion vectors referring to two different inter-view reference pictures may be enabled (e.g., explicitly or implicitly). In another example (example 5.7), prediction between motion vectors referring to a long-term picture and an inter-view may be enabled (e.g., explicitly or implicitly). In another example (example 5.8), prediction between motion vectors referring to a long-term picture and an inter-view may be disabled (e.g., explicitly or implicitly).

In any of the examples above, prediction between two motion vectors referring to two different temporal short-term reference pictures may always be enabled and scaling from one to the other based on POC values may be enabled. Additionally or alternatively, in any of the examples above, prediction between motion vectors referring to two different long-term pictures may be disabled. Certain details of the various examples described above are discussed in greater detail below.

In general, this disclosure refers to a "motion vector" or "motion vector data" as including a reference index (that is, a pointer to a reference picture) and x- and y-coordinates of the motion vector itself. Both a disparity motion vector and a temporal motion vector may generally be referred to as "motion vectors." A reference picture corresponding to a reference index may be referred to as the reference picture to which a motion vector refers. If a motion vector refers to a reference picture in the same view, it is called a temporal motion vector. If a motion vector refers to a reference picture of a different view, it is called a disparity motion vector.

A temporal motion vector can be a short-term temporal motion vector ("short-term motion vector") or a long-term temporal motion vector ("long-term motion vector"). For example, a motion vector is short-term if it refers to a short-term reference picture, while a motion vector is long-term if it refers to a long-term reference picture. Note that unless otherwise mentioned, a disparity motion vector and a long-term motion vector generally describe different categories of motion vectors, e.g., for inter-view prediction and temporal intra-view prediction, respectively. Short-term and long-term reference pictures represent examples of temporal reference pictures.

Video encoder 20 and video decoder 30 may be configured to identify a reference picture from a decoded picture buffer (DPB), which may be implemented as a reference picture memory. The process of identifying a reference picture from the DPB may be used in any of the examples of the techniques described in this disclosure. The process of identifying a reference picture from the DPB may be used for the following purposes in the HEVC extension specification: reference picture set construction, reference picture list construction, and/or reference picture marking.

A view component, a texture view component, a depth view component, or a scalable layer (with, e.g., a specific combination of dependency_id and quality_id) may be identified with a picture order count (POC) value and a second-dimension picture identification information. The second-dimension picture identification information may include one or more of the following: view ID (view_id) in multi-view context; view order index in multiview context; in 3DV (multiview with depth) context, a combination of view order index and a depth_flag (indicating whether the current view component is texture or depth), e.g., view order index multiplied by two plus the value of the depth_flag; in SVC context, layer ID (in a scalable coding environment, e.g., in AVC-based SVC, the layer ID may be equal to dependency_id multiplied by 16 plus quality_id); or a generic layer ID (layer_id), e.g., the value of reserved_one_5 bits minus 1, wherein reserved_one_5 bits is as specified in the HEVC base specification. Note that a generic layer ID may be applicable to mixed 3DV (multiview with depth) and scalability scenarios. The above mentioned examples may apply to any multiple layer codec, including scalable video codec, by, e.g., considering each layer as a view. In other words, for multivew video coding, the various views may be considered separate layers.

In some scenarios, a base layer or dependent view might have multiple representations, e.g., due to the use of different upsampling/smoothing filters, or due to the fact of using a view synthesized picture for prediction; thus, in one view location, there might be two pictures ready for use, where one is the normal reconstructed dependent view picture, and the other is the synthesized view picture, both with the same view_id or view order index. In this case, a third-dimension picture identification may be used.

Video encoder 20 and video decoder 30 may also be configured to identify a reference picture from reference picture lists. The decoded picture buffer (DPB) may be organized into reference picture lists, e.g., RefPicList0 that includes potential reference pictures having POC values less than the POC value of a current picture and RefPicList1 that includes potential reference pictures having POC values greater than the POC value of the current picture. Techniques for identifying a reference picture from a reference picture list are used as a hook for the current HEVC base specification. Defined functions may be invoked multiple times by a video encoder or a video decoder during AMVP and merge mode.

A view component, a texture view component, a depth view component, or a scalable layer (with e.g., a specific combination of dependency_id and quality_id) may be identified with POC value and a second-dimension picture identification information, which can be one of the following: view order index in the context of either multiview or 3DV. The function viewOIdx(pic) returns the view order index of the view to which the picture identified as "pic" belongs. This function returns 0 for any view component, texture view component, or depth view component of the base view; view ID (view_id); in 3DV context, a combination of view order index and a depth_flag (indicating whether the current view component is texture or depth): view order index multiplied by two plus the value of the depth_flag; in SVC context, layer ID (in a scalable coding environment, e.g., in AVC-based SVC, the layer ID may be equal to dependency_id multiplied by 16 plus quality_id); or a generic layer ID (layer_id), e.g., the value of reserved_one_5 bits minus 1, wherein reserved_one_5 bits is as specified in the HEVC base specification. The function layerId(pic) returns the layer_id of picture pic. LayerId(pic) returns 0 for any (texture) view component of the base view. LayerId(pic) returns 0 for any picture (or layer representation) of the SVC base layer. Note that a generic layer ID may be applicable to mixed 3DV (multiview with depth) and scalability scenarios.

In some scenarios, a base layer or dependent view might have multiple representations, e.g., due to the use of different upsampling/smooth filters, or due to the fact of using a view synthesized picture for prediction; thus in one view location, there might be two pictures ready for use: one is the normal reconstructed dependent view picture, the other is the synthesized view picture, both with the same view_id or view order index. In this case, a third-dimension picture identification may be used.

One or more of the above mentioned second-dimension and/or third-dimension picture identifications may be defined by using the function AddPicId(pic).

Video encoder 20 and video decoder 30 may also be configured to identify a type of an entry in a reference picture list. This may be used as a hook for the current HEVC base specification. Any or all of the functions defined below may be invoked multiple times by video encoder 20 and/or video decoder 30 during AMVP and/or merge mode. Any or all of the following example techniques may be used to identify the type of an entry in a reference picture list. In one example, a function "RefPicType(pic)" returns 0 if the picture pic is a temporal reference picture, and returns 1 if the picture pic is a not a temporal reference picture. In another example, a function RefPicType(pic) returns 0 if the picture pic has the same POC as the current picture, and returns 1 if the picture pic has a different POC than the current picture.

In another example, the results of the examples discussed above may be achieved by replacing use of the function RefPicType(pic) by just checking whether the POC of "pic" (the argument to the function) is equal to the POC of the current picture. In some examples, an inter-view reference picture may be marked as "unused for reference." An inter-view reference picture may be marked as "unused for reference." For simplicity, such a picture is referred to as a non-reference picture in HEVC base specification. In some examples, a picture marked as either "used for long-term reference" or "used for short-term reference" may be referred to as a reference picture in HEVC base specification. In some examples, the function RefPicType(pic) returns 0 if the picture pic is marked as "used for long term reference" or "used for short term reference," and returns 1 if the picture pic is marked as "unused for reference." In addition, in some examples, in the HEVC extension, a view component, immediately after its decoding, may be marked as "unused for reference," regardless of the value of the nal_ref_flag syntax element.

After the entire access unit is coded, the view components of the access unit may be marked as "used for short-term reference" or "used for long-term reference" if nal_ref_flag is true. Alternatively, a view component may only be marked as "used for short-term reference" or "used for long-term reference" if it is included in the Reference Picture Set (RPS) of a succeeding view component in decoding order in the same view, immediately after the RPS for the succeeding view component is derived. In addition, in the HEVC base specification, a current picture, immediately after its decoding, may be marked as "unused for reference."

In some examples, RefPicType(picX, refIdx, LX) returns the value of RefPicType(pic) at the time when picX was the current picture, wherein pic is the reference picture with index refIdx from reference picture list LX of the picture picX.

Figure 10:
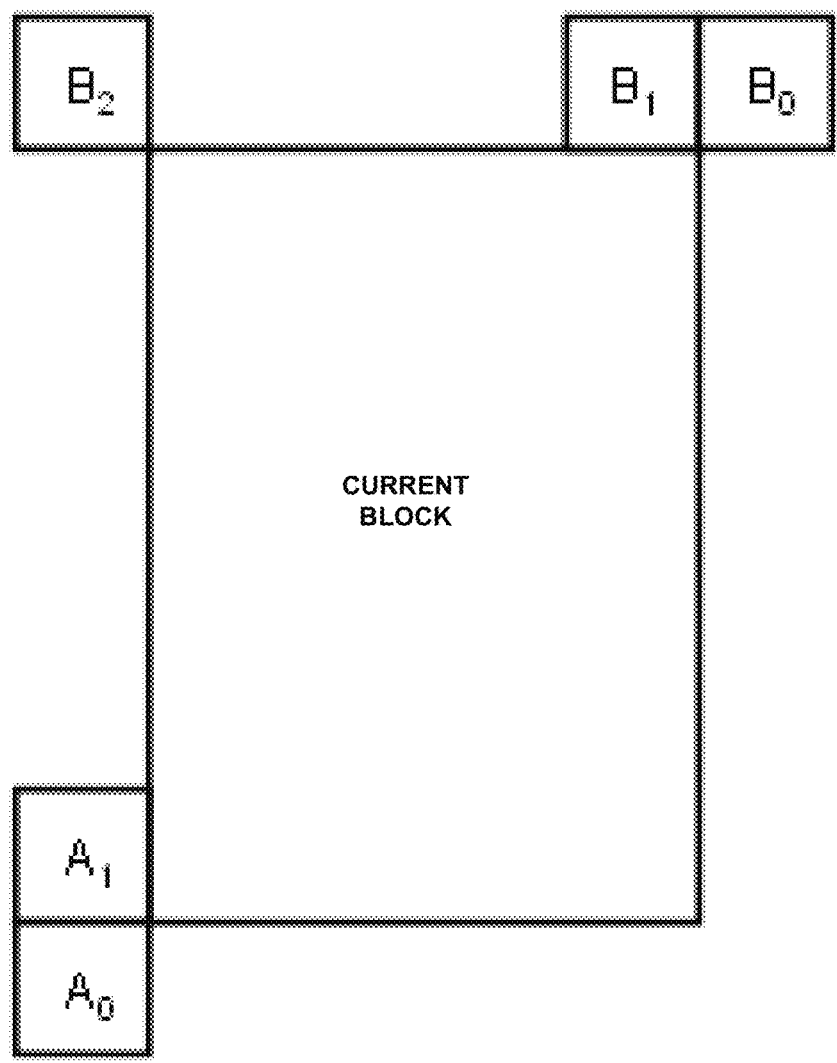
FIG. 10 is a conceptual diagram illustrating an example set of neighboring blocks to a current block for use in motion vector prediction.

With respect to the example referred to above as the "fourth example," video encoder 20 and video decoder 30 may be configured to enable prediction between long-term reference pictures without scaling during AMVP and TMVP. With respect to AMVP, video encoder 20 and video decoder 30 may be configured to perform a modified derivation process for motion vector predictor (MVP) candidates. Inputs to the process may include a luma location (xP, yP) specifying the top-left luma sample of the current prediction unit relative to the top-left sample of the current picture, variables specifying the width and the height of the prediction unit for luma, nPSW and nPSH, and the reference index of the current prediction unit partition refIdxLX (with X being 0 or 1). Outputs of the process may include (where N is replaced with either A or B, where A corresponds to left-neighboring candidates and B corresponds to above-neighboring candidates, as shown in the example of FIG. 10) the motion vectors mvLXN of the neighboring prediction units and the availability flags availableFlagLXN of the neighboring prediction units. The variable is ScaledFlagLX with X being 0 or 1 may be set equal to 0.

Video encoder 20 and video decoder 30 may derive the motion vector mvLXA and the availability flag availableFlagLXA in the following ordered steps in one example, where underlined text represents changes relative to HEVC WD7:

1. Let a set of two sample locations be $(xA_k, yA_k)$, with k=0, 1, specifying sample locations with $xA_k=xP-1$, $yA_0=yP+nPSH$ and $yA_1=yA_0-MinPuSize$. The set of sample locations $(xA_k, yA_k)$ represent the sample locations immediately to the left side of the left partition boundary and its extended line.
2. Let the availability flag availableFlagLXA be initially set equal to 0 and the both components of mvLXA are set equal to 0.
3. When one or more of the following conditions are true, the variable is ScaledFlagLX is set equal to 1, in this example.
   the prediction unit covering luma location $(xA_0, yA_0)$ is available [Ed. (BB): Rewrite it using MinCbAddrZS[ ][ ] and the availability process for minimum coding blocks] and PredMode is not MODE_INTRA.
   the prediction unit covering luma location $(xA_1, yA_1)$ is available [Ed. (BB): Rewrite it using MinCbAddrZS[ ][ ] and the availability process for minimum coding blocks] and PredMode is not MODE_INTRA.
4. For $(xA_k, yA_k)$ from $(xA_0, yA_0)$ to $(xA_1, yA_1)$ where $yA_1=yA_0-MinPuSize$, the following applies repeatedly until availableFlagLXA is equal to 1:
   If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1 and the reference index refIdxLX[$xA_k$][$yA_k$] is equal to the reference index of the current prediction unit refIdxLX, availableFlagLXA is set equal to 1 and the motion vector mvLXA is set equal to the motion vector mvLX[$xA_k$][$yA_k$], refIdxA is set equal to refIdxLX[$xA_k$][$yA_k$] and ListA is set equal to ListX.
   Otherwise, if the prediction unit covering luma location (xAk, yAk) is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1 and PicOrderCnt(RefPicListY[refIdxLY[$xA_k$][$yA_k$]]) is equal to PicOrderCnt(RefPicListX[refIdxLX]), availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY and mvLXA is set equal to mvLXA.
5. When availableFlagLXA is equal to 0, for $(xA_k, yA_k)$ from $(xA_0, yA_0)$ to $(xA_1, yA_1)$ where $yA_1=yA_0-MinPuSize$, the following applies repeatedly until availableFlagLXA is equal to 1, in this example:
   If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1, and RefPicListX[refIdxLX] and RefPicListX[refIdxLX[$xA_k$][$yA_k$]] both long-term reference pictures or are both short-term reference pictures, availableFlagLXA is set equal to 1, the motion vector mvLXA is set equal to the motion vector mvLX[$xA_k$][$yA_k$], refIdxA is set equal to refIdxLX[$xA_k$][$yA_k$], ListA is set equal to ListX.
   Otherwise, if the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1, and RefPicListX[refIdxLX] and RefPicListY[refIdxLY[$xA_k$][$yA_k$]] are both long-term reference pictures or are both short-term reference pictures, availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY.
When availableFlagLXA is equal to 1, and both RefPicListA[refIdxA] and RefPicListX[refIdxLX] are short-term reference pictures, mvLXA is derived as specified below (where the notation 8-### refers to sections of the current draft of HEVC, that is, WD7).

$$tx=(16384+(Abs(td)>>1))/td \quad (8\text{-}126)$$

$$DistScaleFactor=Clip3(-4096,4095,(tb*tx+32)>>6) \quad (8\text{-}127)$$

$$mvLXA=Clip3(-8192,8191.75,Sign(DistScaleFactor*mvLXA)*((Abs(DistScaleFactor*mvLXAX)+127)>>8)) \quad (8\text{-}128)$$

where td and tb may be derived as $$td=Clip3(-128,127,PicOrderCntVal-PicOrderCnt(RefPicListA[refIdxA])) \quad (8\text{-}129)$$

$$tb=Clip3(-128,127,PicOrderCntVal-PicOrderCnt(RefPicListX[refIdxLX])) \quad (8\text{-}130)$$

Video encoder 20 and video decoder 30 may be configured to derive the motion vector mvLXB and the availability flag availableFlagLXB in the following ordered steps in one example, where underlined text represents changes relative to HEVC WD7:

1. Let a set of three sample location $(xB_k, yB_k)$, with $k=0,1,2$, specifying sample locations with $xB_0=xP+nPSW$, $xB_1=xB_0-MinPuSize$, $xB_2=xP-MinPuSize$ and $yB_k=yP-1$. The set of sample locations $(xB_k, yB_k)$ represent the sample locations immediately to the upper side of the above partition boundary and its extended line. [Ed. (BB): Define MinPuSize in the SPS but the derivation should depend on the use of an AMP flag]
2. When yP−1 is less than ((yC>>Log 2CtbSize) Log 2CtbSize), the following applies.

$$xB_0 = (xB_0 >> 3) + ((xB_0 >> 3) \& 1)*7 \qquad (8\text{-}131)$$

$$xB_1 = (xB_1 >> 3) << 3) + ((xB_1 >> 3) \& 1)*7 \qquad (8\text{-}132)$$

$$xB_2 = (xB_2 >> 3) << 3) + ((xB_2 >> 3) \& 1)*7 \qquad (8\text{-}133)$$

3. Let the availability flag availableFlagLXB be initially set equal to 0 and the both components of mvLXB are set equal to 0.
4. For $(xB_k, yB_k)$ from $(xB_0, yB_0)$ to $(xB_2, yB_2)$ where $xB_0=xP+nPSW$, $xB_1=xB_0-MinPuSize$, and $xB_2=xP-MinPuSize$, the following applies repeatedly until availableFlagLXB is equal to 1:
   If the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLX[$xB_k$][$yB_k$] is equal to 1, and the reference index refIdxLX[$xB_k$][$yB_k$] is equal to the reference index of the current prediction unit refIdxLX, availableFlagLXB is set equal to 1 and the motion vector mvLXB is set equal to the motion vector mvLX[$xB_k$][$yB_k$], refIdxB is set equal to refIdxLX[$xB_k$][$yB_k$] and ListB is set equal to ListX.
   Otherwise, if the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLY[$xB_k$][$yB_k$] (with Y=!X) is equal to 1, and PicOrderCnt(RefPicListY[refIdxLY[$xB_k$][$yB_k$]]) is equal to PicOrderCnt(RefPicListX[refIdxLX]), availableFlagLXB is set equal to 1, the motion vector mvLXB is set equal to the motion vector mvLY[$xB_k$][$yB_k$], refIdxB is set equal to refIdxLY[$xB_k$][$yB_k$], and ListB is set equal to ListY.
5. When is ScaledFlagLX is equal to 0 and availableFlagLXB is equal to 1, mvLXA is set equal to mvLXB and refIdxA is set equal to refIdxB and availableFlagLXA is set equal to 1.
6. When is ScaledFlagLX is equal to 0, availableFlagLXB is set equal to 0 and for $(xB_k, yB_k)$ from $(xB_0, yB_0)$ to $(xB_2, yB_2)$ where $xB_0=xP+nPSW$, $xB_1=xB_0-MinPuSize$, and $xB_2=xP-MinPuSize$, the following applies repeatedly until availableFlagLXB is equal to 1:
   If the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLX[$xB_k$][$yB_k$] is equal to 1, and RefPicListX[refIdxLX] and RefPicListX[refIdxLX[$xB_k$][$yB_k$]] are both long-term reference pictures or are both short-term reference pictures, available FlagLXB is set equal to 1, the motion vector mvLXB is set equal to the motion vector mvLX[$xB_k$][$yB_k$], refIdxB is set equal to refIdxLX[$xB_k$][$yB_k$], ListB is set equal to ListX.
   Otherwise, if the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLY[$xB_k$][$yB_k$] (with Y=!X) is equal to 1, and RefPicListX[refIdxLX] and RefPicListY[refIdxLY[$xB_k$][$yB_k$]] are both long-term reference pictures or are both short-term reference pictures, availableFlagLXB is set equal to 1, the motion vector mvLXB is set equal to the motion vector mvLY[$xB_k$][$yB_k$], refIdxB is set equal to refIdxLY[$xB_k$][$yB_k$], ListB is set equal to ListY.

When availableFlagLXB is equal to 1 and PicOrderCnt(RefPicListB[refIdxB]) is not equal to PicOrderCnt(RefPicListX[refIdxLX]) and both RefPicListB[refIdxB] and RefPicListX[refIdxLX] are short-term reference pictures, mvLXB may be derived as specified below (where the notation 8-### refers to sections of the current draft of HEVC).

$$tx = (16384 + (Abs(td) >> 1))/td \qquad (8\text{-}134)$$

$$DistScaleFactor = Clip3(-4096, 4095, (tb*tx+32) >> 6) \qquad (8\text{-}135)$$

$$mvLXB = Clip3(-8192, 8191.75, Sign\ (DistScaleFactor*mvLXA)*((Abs\ (DistScaleFactor*mvLXA)+127) >> 8)) \qquad (8\text{-}136)$$

where td and tb may be derived as $$td = Clip3(128, 127, PicOrderCntVal - PicOrderCnt(RefPicListB[refIdxB])) \qquad (8\text{-}137)$$

$$tb = Clip3(-128, 127, PicOrderCntVal - PicOrderCnt(RefPicListX[refIdxLX])) \qquad (8\text{-}138)$$

Video encoder 20 and video decoder 30 may also be configured to perform a modified derivation process for temporal motion vector prediction (TMVP) for coding motion vectors of luminance blocks. In one example, inputs to this process include a luma location (xP, yP) specifying the top-left luma sample of the current prediction unit relative to the top-left sample of the current picture, variables specifying the width and the height of the prediction unit for luma, nPSW and nPSH, and the reference index of the current prediction unit partition refIdxLX (with X being 0 or 1). Outputs of this process may include the motion vector prediction mvLXCol and the availability flag availableFlagLXCol.

In one example, video encoder 20 and video decoder 30 may execute a function RefPicOrderCnt(picX, refIdx, LX) that returns the picture order count PicOrderCntVal of the reference picture with index refIdx from reference picture list LX of the picture picX. This function may be specified as follows, where (8-141) and like references in this description refer to sections of HEVC WD7:

$$RefPicOrderCnt(picX, refIdx, LX) = PicOrderCnt(RefPicListX[refIdx]\ of\ the\ picture\ picX) \qquad (8\text{-}141)$$

Depending on the values of slice_type, collocated_from_10_flag, and collocated_ref_idx, the variable colPic, specifying the picture that contains the collocated partition, may be derived as follows:
   If slice_type is equal to B and collocated_from_10_flag is equal to 0, the variable colPic specifies the picture that contains the collocated partition as specified by RefPicList1[collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Variable colPu and its position (xPCol, yPCol) may be derived using the following ordered steps:
1. The variable colPu may be derived as follows $$yPRb=yP+nPSH \quad (8\text{-}139)$$

If (yP>>Log 2CtbSize) is equal to (yPRb>>Log 2CtbSize), the horizontal component of the right-bottom luma position of the current prediction unit is defined by $$xPRb=xP+nPSW \quad (8\text{-}140)$$

and the variable colPu is set as the prediction unit covering the modified position given by ((xPRb>>4)<<4, (yPRb>>4)<<4) inside the colPic.

Otherwise ((yP>>Log 2CtbSize) is not equal to (yPRb>>Log 2CtbSize)), colPu is marked as "unavailable."

2. When colPu is coded in an intra-prediction mode or colPu is marked as "unavailable," the following applies.

Central luma position of the current prediction unit is defined by $$xPCtr=(xP+(nPSW>>1) \quad (8\text{-}141)$$

$$yPCtr=(yP+(nPSH>>1) \quad (8\text{-}142)$$

The variable colPu is set as the prediction unit covering the modified position given by ((xPCtr>>4)<<4, (yPCtr>>4)<<4) inside the colPic.

(xPCol, yPCol) is set equal to the top-left luma sample of the colPu relative to the top-left luma sample of the colPic.

The function LongTermRefPic(picX, refIdx, LX) may be defined as follows. If the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0.

The variables mvLXCol and availableFlagLXCol may be derived as follows, where underlined text represents changes relative to HEVC WD7:

If one or more of the following conditions are true, both components of mvLXCol are set equal to 0 and availableFlagLXCol is set equal to 0.
  colPu is coded in an intra prediction mode.
  colPu is marked as "unavailable."
  pic_temporal_mvp_enable_flag is equal to 0.

Otherwise, the motion vector mvCol, the reference index refIdxCol, and the reference list identifier listCol are derived as follows.
  If PredFlagL0[xPCol][yPCol] is equal to 0, mvCol, refIdxCol, and listCol are set equal to MyL1[xPCol][yPCol], RefIdxL1[xPCol][yPCol], and L1, respectively.
  Otherwise (PredFlagL0[xPCol][yPCol] is equal to 1), the following applies.
    If PredFlagL1[xPCol][yPCol] is equal to 0, mvCol, refIdxCol, and listCol are set equal to MvL0[xPCol][yPCol], RefIdxL0[xPCol][yPCol], and L0, respectively.
    Otherwise (PredFlagL1[xPCol][yPCol] is equal to 1), the following assignments are made.
      If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
      Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

If one of the following conditions is true, the variable availableFlagLXCol is set equal to 0:
  RefPicListX[refIdxLX] is a long-term reference picture and LongTermRefPic(colPic, refIdxCol, listCol) is equal to 0;
  RefPicListX] refIdxLX] is a short-term reference picture and LongTermRefPic(colPic, refIdxCol, listCol) is equal to 1;

Otherwise, the variable availableFlagLXCol is set equal to 1, and the following applies.
  If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal−PicOrderCnt(RefPicListX[refIdxLX]), $$mvLXCol=mvCol \quad (8\text{-}143)$$

Otherwise, mvLXCol is derived as scaled version of the motion vector mvCol as specified below $$tx=(16384+(Abs(td)>>1))/td \quad (8\text{-}144)$$

$$DistScaleFactor=Clip3(4096,4095,(tb*tx+32)>>6) \quad (8\text{-}145)$$

$$mvLXCol=Clip3(-8192,8191.75,Sign\ (DistScaleFactor*mvCol)*((Abs\ (DistScaleFactor*mvCol)+127)>>8)) \quad (8\text{-}146)$$

where td and tb may be derived as $$td=Clip3(-128,127,PicOrderCnt(colPic)-RefPicOrderCnt(colPic,refIdxCol,listCol)) \quad (8\text{-}147)$$

$$tb=Clip3(-128,127,PicOrderCntVal-PicOrderCnt(RefPicListX[refIdxLX])) \quad (8\text{-}148)$$

In the example above, the availability of the co-located block used during TMVP may also depend on the picture type (e.g., whether the picture is a long-term or a short-term reference picture) of a reference picture for the co-located block. That is, even when a bottom-right block for TMVP is available (after step 1 in the subclause), the bottom-right block can be further set to be unavailable if the motion vector in the block refers to a picture type (short-term or long-term) which is different from that of the target reference picture. Likewise, a center block can be further used for TMVP.

For example, video encoder 20 and video decoder 30 may be configured to derive a motion vector predictor for a luma motion vector according to the following detailed example. Inputs to the process, implemented by video encoder 20 and video decoder 30, may include:

a luma location (xP, yP) specifying the top-left luma sample of the current prediction unit relative to the top-left sample of the current picture, variables specifying the width and the height of the prediction unit for luma, nPSW and nPSH, the reference index of the current prediction unit partition refIdxLX (with X being 0 or 1).

Outputs from the process may include:

the motion vector prediction mvLXCol, the availability flag availableFlagLXCol.

The function RefPicOrderCnt(picX, refIdx, LX), when executed by video encoder 20 and/or video decoder 30, may return the picture order count PicOrderCntVal of the reference picture with index refIdx from reference picture list LX of the picture picX. An example implementation of this function is specified as follows:

RefPicOrderCnt(picX,refIdx,*LX*)=PicOrderCnt(RefPicListX[refIdx] of the picture picX)  (8-141)

Depending on the values of slice_type, collocated_from_l0_flag, and collocated_ref_idx, the variable colPic, specifying the picture that contains the collocated partition, may be derived as follows:

If slice_type is equal to B and collocated_from_l0_flag is equal to 0, the variable colPic specifies the picture that contains the collocated partition as specified by RefPicList1[collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Video encoder 20 and video decoder 30 may derive the variable colPu and its position (xPCol, yPCol) using the following ordered steps:

1. Video encoder 20 and video decoder 30 may derive the variable colPu as follows:

$yPRb=yP+nPSH$  (8-139)

If (yP>>Log 2CtbSize) is equal to (yPRb>>Log 2CtbSize), the horizontal component of the right-bottom luma position of the current prediction unit may be defined by $xPRb=xP+nPSW$  (8-140)

and the variable colPu may be set as the prediction unit covering the modified position given by ((xPRb>>4)<<4, (yPRb>>4)<<4) inside the colPic.

Otherwise ((yP>>Log 2CtbSize) is not equal to (yPRb>>Log 2CtbSize)), video encoder 20 and video decoder 30 may mark colPu as "unavailable."

2. When colPu is coded in an intra prediction mode or colPu is marked as "unavailable," the following applies, in this example:

Central luma position of the current prediction unit is defined by $xPCtr=(xP+(nPSW>>1)$  (8-141)

$yPCtr=(yP+(nPSH>>1)$  (8-142)

The variable colPu is set as the prediction unit covering the modified position given by ((xPCtr>>4)<<4, (yPCtr>>4)<<4) inside the colPic.

3. Video encoder 20 and video decoder 30 may set (xPCol, yPCol) equal to the top-left luma sample of the colPu relative to the top-left luma sample of the colPic.

The function LongTermRefPic(picX, refIdx, LX) may be defined as follows: If the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0.

Video encoder 20 and video decoder 30 may derive the variables mvLXCol and availableFlagLXCol as follows:

availableFlagLXCol is set to 0, numTestBlock equal to 0.

While numTestBlock is less than 2 and availableFlagLXCol is equal to 0, the following are performed in order.

$xPCtr=(xP+(nPSW>>1)$ $yPCtr=(yP+(nPSH>>1)$

If colPu covers the position given by ((xPCtr>>4)<<4, (yPCtr>>4)<<4) inside the colPic, numTestBlock is set to 1;

Otherwise, if numTestBlock is equal to 1, colPu is set as the prediction unit covering the modified position given by ((xPCtr>>4)<<4, (yPCtr>>4)<<4) inside the colPic, and (xPCol, yPCol) is set equal to the top-left luma sample of the colPu relative to the top-left luma sample of the colPic.

numTestBlock++

If one or more of the following conditions are true, both components of mvLXCol are set equal to 0 and availableFlagLXCol is set equal to 0.

colPu is coded in an intra prediction mode.

colPu is marked as "unavailable".

pic_temporal_mvp_enable_flag is equal to 0.

Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MyL1 [xPCol][yPCol], RefIdxL1[xPCol][yPCol], and L1, respectively.

Otherwise (PredFlagL0[xPCol][yPCol] is equal to 1), the following applies.

If PredFlagL1[xPCol][yPCol] is equal to 0, mvCol, refIdxCol, and listCol are set equal to MvL0[xPCol][yPCol], RefIdxL0[xPCol][yPCol], and L0, respectively.

Otherwise (PredFlagL1 [xPCol][yPCol] is equal to 1), the following assignments are made.

If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

If one of the following conditions is true, the variable availableFlagLXCol is set equal to 0:

RefPicListX[refIdxLX] is a long-term reference picture and LongTermRefPic(colPic, refIdxCol, listCol) is equal to 0;

RefPicListX] refIdxLX] is a short-term reference picture and LongTermRefPic(colPic, refIdxCol, listCol) is equal to 1;

Otherwise, the variable availableFlagLXCol is set equal to 1, and the following applies.

If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal−PicOrderCnt(RefPicListX[refIdxLX]), mvLXCol=mvCol    (8-143)

Otherwise, mvLXCol is derived as scaled version of the motion vector mvCol as specified below $tx$=(16384+(Abs($td$)>>1))/$td$    (8-144)

DistScaleFactor=Clip3(−4096,4095,($tb*tx$+32)>>6)    (8-145)

mvLXCol=Clip3(−8192,8191.75,Sign (DistScaleFactor*mvCol)*((Abs (DistScaleFactor*mvCol)+127)>>8))    (8-146)

where td and tb may be derived as:

$td$=Clip3(−128,127,PicOrderCnt(colPic)−RefPicOrderCnt(colPic,refIdxCol,listCol))    (8-147)

$tb$=Clip3(−128,127,PicOrderCntVal−PicOrderCnt (RefPicListX[refIdxLX]))    (8-148)

In an alternative example, a long-term motion vector is never predicted from another long-term motion vector if the POC values of the reference pictures are not the same. Video encoder 20 and video decoder 30 may be configured according to the following process for deriving motion vector predictor candidates, where underlined text represents changes relative to HEVC WD7.

The variable is ScaledFlagLX with X being 0 or 1 may be set equal to 0 The motion vector mvLXA and the availability flag availableFlagLXA are derived in the following ordered steps, where ellipses represent text that is the same as that of the current draft of HEVC and underlines represent changes relative to the current draft of HEVC:

1. . . .
2. . . .
3. . . .
4. . . .
5. When availableFlagLXA is equal to 0, for ($xA_k$, $yA_k$) from ($xA_0$, $yA_0$) to ($xA_1$, $yA_1$) where $yA_1$=$yA_0$−MinPuSize, the following applies repeatedly until availableFlagLXA is equal to 1:
    If the prediction unit covering luma location ($xA_k$, $yA_k$) is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1, and RefPicListX[refIdxLX] and RefPicListX[refIdxLX[$xA_k$][$yA_k$]] are both long-term reference pictures with different POC values or are both short-term reference pictures, availableFlagLXA is set equal to 1, the motion vector mvLXA is set equal to the motion vector mvLX[$xA_k$][$yA_k$], refIdxA is set equal to refIdxLX[$xA_k$][$yA_k$], ListA is set equal to ListX.
    Otherwise, if the prediction unit covering luma location ($xA_k$, $yA_k$) is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1, and RefPicListX[refIdxLX] and RefPicListY[refIdxLY[$xA_k$][$yA_k$]] are both long-term reference pictures with different POC values or are both short-term reference pictures, availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY.

When availableFlagLXA is equal to 1, and both RefPicListA[refIdxA] and RefPicListX[refIdxLX] are short-term reference pictures, mvLXA is derived as specified below.

$Tx$=(16384+(Abs($td$)>>1))/$td$    (8-126)

DistScaleFactor=Clip3(−4096,4095,($tb*tx$+32)>>6)    (8-127)

mvLXA=Clip3(−8192,8191.75,Sign (DistScaleFactor*mvLXA)*((Abs (DistScaleFactor*mvLXA)+127)>>8))    (8-128)

where td and tb may be derived as $td$=Clip3(−128,127,PicOrderCntVal−PicOrderCnt (RefPicListA[refIdxA]))    (8-129)

$tb$=Clip3(−128,127,PicOrderCntVal−PicOrderCnt (RefPicListX[refIdxLX]))    (8-130)

Video encoder 20 and video decoder 30 may derive the motion vector mvLXB and the availability flag availableFlagLXB using the following ordered steps, where again ellipses represent text that is the same as that of HEVC WD7:

1. . . .
2. . . .
3. . . .
4. . . .
5. . . .
6. When is ScaledFlagLX is equal to 0, availableFlagLXB is set equal to 0 and for ($xB_k$, $yB_k$) from ($xB_0$, $yB_0$) to ($xB_2$, $yB_2$) where $xB_0$=xP+nPSW, $xB_1$=$xB_0$−MinPuSize, and $xB_2$=xP−MinPuSize, the following applies repeatedly until availableFlagLXB is equal to 1:
    If the prediction unit covering luma location ($xB_k$, $yB_k$) is available [Ed. (BB): Rewrite it using MinCbAddrZS[ ][ ] and the availability process for minimum coding blocks], PredMode is not MODE_INTRA, predFlagLX[$xB_k$][$yB_k$] is equal to 1, and RefPicListX[refIdxLX] and RefPicListX[refIdxLX[$xB_k$][$yB_k$]] are both long-term reference pictures with different POC values or are both short-term reference pictures, availableFlagLXB is set equal to 1, the motion vector mvLXB is set equal to the motion vector mvLX[$xB_k$][$yB_k$], refIdxB is set equal to refIdxLX[$xB_k$][$yB_k$], ListB is set equal to ListX.
    Otherwise, if the prediction unit covering luma location ($xB_k$, $yB_k$) is available [Ed. (BB): Rewrite it using MinCbAddrZS[ ][ ] and the availability process for minimum coding blocks], PredMode is not MODE_INTRA, predFlagLY[$xB_k$][$yB_k$] (with Y=!X) is equal to 1, and RefPicListX[refIdxLX] and RefPicListY[refIdxLY[$xB_k$][$yB_k$]] are both long-term reference pictures with different POC values or are both short-term reference pictures, availableFlagLXB is set equal to 1, the motion vector mvLXB is set equal to the motion vector mvLY[$xB_k$][$yB_k$], refIdxB is set equal to refIdxLY[$xB_k$][$yB_k$], ListB is set equal to ListY.

When availableFlagLXB is equal to 1 and PicOrderCnt(RefPicListB[refIdxB]) is not equal to PicOrderCnt(RefPicListX[refIdxLX]) and both RefPicListB[refIdxB] and RefPicListX[refIdxLX] are short-term reference pictures, mvLXB is derived as specified below.

$$tx=(16384+(Abs(td)>>1))/td \quad (8\text{-}134)$$

$$DistScaleFactor=Clip3(-4096,4095,(tb*tx+32)>>6) \quad (8\text{-}135)$$

$$mvLXB=Clip3(-8192,8191.75,Sign(DistScaleFactor*mvLXA)*((Abs(DistScaleFactor*mvLXA)+127)>>8)) \quad (8\text{-}136)$$

where td and tb may be derived as $$td=Clip3(-128,127,PicOrderCntVal-PicOrderCnt(RefPicListB[refIdxB])) \quad (8\text{-}137)$$

$$tb=Clip3(-128,127,PicOrderCntVal-PicOrderCnt(RefPicListX[refIdxLX])) \quad (8\text{-}138)$$

Video encoder 20 and video decoder 30 may be configured to derive temporal luma motion vector predictors according to the following process, where underlined text represents changes relative to HEVC WD7. The variables mvLXCol and availableFlagLXCol may be derived as follows:

If one or more of the following conditions are true, both components of mvLXCol are set equal to 0 and availableFlagLXCol is set equal to 0.
  colPu is coded in an intra-prediction mode.
  colPu is marked as "unavailable."
  pic_temporal_mvp_enable_flag is equal to 0.
Otherwise, the motion vector mvCol, the reference index refIdxCol, and the reference list identifier listCol are derived as follows.
  If PredFlagL0[xPCol][yPCol] is equal to 0, mvCol, refIdxCol, and listCol are set equal to MyL1[xPCol][yPCol], RefIdxL1[xPCol][yPCol], and L1, respectively.
  Otherwise (PredFlagL0[xPCol][yPCol] is equal to 1), the following applies.
    If PredFlagL1[xPCol][yPCol] is equal to 0, mvCol, refIdxCol, and listCol are set equal to MvL0[xPCol][yPCol], RefIdxL0[xPCol][yPCol], and L0, respectively.
    Otherwise (PredFlagL1[xPCol][yPCol] is equal to 1), the following assignments are made.
      If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
      Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.
If one of the following conditions is true, the variable availableFlagLXCol is set equal to 0:
  RefPicListX[refIdxLX] is a long-term reference picture and LongTermRefPic(colPic, refIdxCol, listCol) is equal to 0;
  RefPicListX[refIdxLX] is a short-term reference picture and LongTermRefPic(colPic, refIdxCol, listCol) is equal to 1;
  RefPicListX[refIdxLX] is a long-term reference picture, LongTermRefPic(colPic, refIdxCol, listCol) is equal to 1, and RefPicOrderCnt(colPic, refIdxCol, listCol) is not equal to PicOrderCnt(RefPicListX[refIdxLX]).
Otherwise, the variable availableFlagLXCol is set equal to 1, and the following applies.
  If RefPicListX[refIdxLX] is a long-term reference picture, or LongTermRefPic(colPic, refIdxCol, listCol) is equal to 1, or PicOrderCnt(colPic)–RefPicOrderCnt(colPic, refIdxCol, listCol) is equal to PicOrderCntVal–PicOrderCnt(RefPicListX[refIdxLX]), $$mvLXCol=mvCol \quad (8\text{-}143)$$

Otherwise, mvLXCol is derived as scaled version of the motion vector mvCol as specified below $$tx=(16384+(Abs(td)>>1))/td \quad (8\text{-}144)$$

$$DistScaleFactor=Clip3(-4096,4095,(tb*tx+32)>>6) \quad (8\text{-}145)$$

$$mvLXCol=Clip3(-8192,8191.75,Sign(DistScaleFactor*mvCol)*((Abs(DistScaleFactor*mvCol)+127)>>8)) \quad (8\text{-}146)$$

where td and tb may be derived as $$td=Clip3(-128,127,PicOrderCnt(colPic)-RefPicOrderCnt(colPic,refIdxCol,listCol)) \quad (8\text{-}147)$$

$$tb=Clip3(-128,127,PicOrderCntVal-PicOrderCnt(RefPicListX[refIdxLX])) \quad (8\text{-}148)$$

As yet another example, an inter-view reference picture may be marked as "unused for reference." For simplicity, such a picture may be referred to as a non-reference picture in HEVC base specification, and a picture marked as either "used for long term reference" or "used for short term reference" may be referred to as a reference picture in HEVC base specification. The terms "reference picture" and "non-reference picture" may be replaced by "picture marked as "used for reference"" and "picture marked as "unused for reference."

The function UnusedRefPic(picX, refIdx, LX) may be defined as follows. If the reference picture with index refIdx from reference picture list LX of the picture picX was marked as "unused for reference" at the time when picX was the current picture, UnusedRefPic(picX, refIdx, LX) returns 1; otherwise UnusedRefPic(picX, refIdx, LX) returns 0.

Video encoder 20 and video decoder 30 may be configured to perform a derivation process for motion vector predictor candidates as follows, where underlined text represents changes relative to HEVC WD7 and ellipses represent text that is the same as that of HEVC WD7:

The variable is ScaledFlagLX with X being 0 or 1 may be set equal to 0.

The motion vector mvLXA and the availability flag availableFlagLXA may be derived in the following ordered steps:
  1. . . .
  2. . . .
  3. . . .
  4. . . .
  5. When availableFlagLXA is equal to 0, for $(xA_k, yA_k)$ from $(xA_0, yA_0)$ to $(xA_1, yA_1)$ where $yA_1=yA_0$–MinPuSize, the following applies repeatedly until availableFlagLXA is equal to 1:
    If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[xA$_k$][yA$_k$] is equal to 1, and RefPicListX[refIdxLX] and RefPicListX[refIdxLX[xA$_k$][yA$_k$]] are both reference pictures or are both non-reference pictures, availableFlagLXA is set equal to 1, the motion vector mvLXA is set equal to the motion vector mvLX[xA$_k$][yA$_k$], refIdxA is set equal to refIdxLX[xA$_k$][yA$_k$], ListA is set equal to ListX.

Otherwise, if the prediction unit covering luma location (xA$_k$, yA$_k$) is available [Ed. (BB): Rewrite it using MinCbAddrZS[ ][ ] and the availability process for minimum coding blocks], PredMode is not MODE_INTRA, predFlagLY[xA$_k$][yA$_k$] (with Y=!X) is equal to 1, and RefPicListX[refIdxLX] and RefPicListY[refIdxLY[xA$_k$][yA$_k$]] are both reference pictures or are both non-reference pictures availableFlagLXA is set equal to 1, the motion vector mvLXA is set equal to the motion vector mvLY[xA$_k$][yA$_k$], refIdxA is set equal to refIdxLY[xA$_k$][yA$_k$], ListA is set equal to ListY.

When availableFlagLXA is equal to 1, and both RefPicListA[refIdxA] and RefPicListX[refIdxLX] are short-term reference pictures, mvLXA is derived as specified below.

$$Tx=(16384+(\text{Abs}(td)\gg 1))/td \quad (8\text{-}126)$$

$$\text{DistScaleFactor}=\text{Clip3}(-4096,4095,(tb*tx+32)\gg 6) \quad (8\text{-}127)$$

$$mvLXA=\text{Clip3}(-8192,8191.75,\text{Sign}(\text{DistScaleFactor}*mvLXA)*((\text{Abs}(\text{DistScaleFactor}*mvLXA)+127)\gg 8)) \quad (8\text{-}128)$$

where td and tb may be derived as $$td=\text{Clip3}(-128,127,\text{PicOrderCntVal}-\text{PicOrderCnt}(\text{RefPicListA}[\text{refIdxA}])) \quad (8\text{-}129)$$

$$tb=\text{Clip3}(128,127,\text{PicOrderCntVal}-\text{PicOrderCnt}(\text{RefPicListX}[\text{refIdxLX}])) \quad (8\text{-}130)$$

Video encoder 20 and video decoder 30 may be configured to derive the motion vector mvLXB and the availability flag availableFlagLXB using the following ordered steps, where underlined text represents changes relative to HEVC WD7:

1. . . .
2. . . .
3. . . .
4. . . .
5. . . .
6. When is ScaledFlagLX is equal to 0, availableFlagLXB is set equal to 0 and for (xB$_k$, yB$_k$) from (xB$_0$, yB$_0$) to (xB$_2$, yB$_2$) where xB$_0$=xP+nPSW, xB$_1$=xB$_0$−MinPuSize, and xB$_2$=xP−MinPuSize, the following applies repeatedly until availableFlagLXB is equal to 1:

If the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLX[xB$_k$][yB$_k$] is equal to 1, and RefPicListX[refIdxLX] and RefPicListX[refIdxLX[xB$_k$][yB$_k$]] are both reference pictures or are both non-reference pictures, availableFlagLXB is set equal to 1, the motion vector mvLXB is set equal to the motion vector mvLX[xB$_k$][yB$_k$], refIdxB is set equal to refIdxLX[xB$_k$][yB$_k$], ListB is set equal to ListX.

Otherwise, if the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLY[xB$_k$][yB$_k$] (with Y=!X) is equal to 1, and RefPicListX[refIdxLX] and RefPicListY[refIdxLY[xB$_k$][yB$_k$]] are both reference pictures or are both non-reference pictures, availableFlagLXB is set equal to 1, the motion vector mvLXB is set equal to the motion vector mvLY[xB$_k$][yB$_k$], refIdxB is set equal to refIdxLY[xB$_k$][yB$_k$], ListB is set equal to ListY.

When availableFlagLXB is equal to 1 and PicOrderCnt(RefPicListB[refIdxB]) is not equal to PicOrderCnt(RefPicListX[refIdxLX]) and both RefPicListB[refIdxB] and RefPicListX[refIdxLX] are short-term reference pictures, mvLXB is derived as specified below.

$$tx=(16384+(\text{Abs}(td)\gg 1))/td \quad (8\text{-}134)$$

$$\text{DistScaleFactor}=\text{Clip3}(-4096,4095,(tb*tx+32)\gg 6) \quad (8\text{-}135)$$

$$mvLXB=\text{Clip3}(-8192,8191.75,\text{Sign}(\text{DistScaleFactor}*mvLXA)*((\text{Abs}(\text{DistScaleFactor}*mvLXA)+127)\gg 8)) \quad (8\text{-}136)$$

where td and tb may be derived as $$td=\text{Clip3}(-128,127,\text{PicOrderCntVal}-\text{PicOrderCnt}(\text{RefPicListB}[\text{refIdxB}])) \quad (8\text{-}137)$$

$$tb=\text{Clip3}(-128,127,\text{PicOrderCntVal}-\text{PicOrderCnt}(\text{RefPicListX}[\text{refIdxLX}])) \quad (8\text{-}138)$$

Video encoder 20 and video decoder 30 may be configured to derive temporal luma motion vector predictors as follows, where underlined text represents changes relative to HEVC WD7:

The variables mvLXCol and availableFlagLXCol may be derived as follows.

If one or more of the following conditions are true, both components of mvLXCol are set equal to 0 and availableFlagLXCol is set equal to 0.

colPu is coded in an intra prediction mode.
colPu is marked as "unavailable."
pic_temporal_mvp_enable_flag is equal to 0.

Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MyL1[xPCol][yPCol], RefIdxL1[xPCol][yPCol], and L1, respectively.

Otherwise (PredFlagL0[xPCol][yPCol] is equal to 1), the following applies.

If PredFlagL1[xPCol][yPCol] is equal to 0, mvCol, refIdxCol, and listCol are set equal to MvL0[xPCol][yPCol], RefIdxL0[xPCol][yPCol], and L0, respectively.

Otherwise (PredFlagL1[xPCol][yPCol] is equal to 1), the following assignments are made.

If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yP- Col], RefIdxLN[xPCol][yPCol] and LN, respectively with N being the value of collocated_from_10_flag.

If one of the following conditions is true, the variable availableFlagLXCol is set equal to 0:

RefPicListX[refIdxLX] is a non-reference picture and UnusedRefPic(colPic, refIdxCol, listCol) is equal to 0;

RefPicListX[refIdxLX] is a reference picture and UnusedRefPic(colPic, refIdxCol, listCol) is equal to 1;

Otherwise, the variable availableFlagLXCol is set equal to 1, and the following applies.

If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal=PicOrderCnt(RefPicListX[refIdxLX]), $$mvLXCol=mvCol \quad (8\text{-}143)$$

Otherwise, mvLXCol is derived as scaled version of the motion vector mvCol as specified below $$tx=(16384+(Abs(td)>>1))/td \quad (8\text{-}144)$$

$$DistScaleFactor=Clip3(-4096,4095,(tb*tx+32)>>6) \quad (8\text{-}145)$$

$$mvLXCol=Clip3(-8192,8191.75,Sign\\(DistScaleFactor*mvCol)*((Abs\\(DistScaleFactor*mvCol)+127)>>8)) \quad (8\text{-}146)$$

where td and tb are derived as $$td=Clip3(-128,127,PicOrderCnt(colPic)-RefPicOrderCnt(colPic,refIdxCol,listCol)) \quad (8\text{-}147)$$

$$tb=Clip3(-128,127,PicOrderCntVal-PicOrderCnt\\(RefPicListX[refIdxLX])) \quad (8\text{-}148)$$

With respect to the example referred to above as the "fifth example," video encoder 20 and video decoder 30 may be configured to perform according to any or all of the following techniques. In this example, prediction between motion vectors referring to different long-term reference pictures may be disabled, prediction between motion vectors referring to different inter-view reference pictures may be disabled, and prediction between motion vectors referring to an inter-view reference picture and a long-term reference picture may be disabled.

In this example, the function AddPicId(pic) returns the view order index or layer ID of the view or layer the picture pic belongs to. Thus, for any picture "pic" belonging to the base view or layer, AddPicId(pic) returns 0. In the HEVC base specification, the following may apply: the function AddPicId(pic) may be defined as follows: AddPicId(pic) returns 0 (or reserved_one_5 bits minus 1). In this example, when AddPicId(pic) is not equal to 0, the picture pic is not a temporal reference picture (i.e., neither a short-term reference picture nor a long-term reference picture). AddPicId (picX, refIdx, LX) may return AddPicId(pic), wherein pic is the reference picture with index refIdx from reference picture list LX of the picture picX.

Video encoder 20 and video decoder 30 may be configured to perform a derivation process for motion vector predictor candidates. Inputs to this process may include a luma location (xP, yP) specifying the top-left luma sample of the current prediction unit relative to the top-left sample of the current picture, variables specifying the width and the height of the prediction unit for luma, nPSW and nPSH, and the reference index of the current prediction unit partition refIdxLX (with X being 0 or 1). Outputs of this process may include (where N may be replaced by A, or B): the motion vectors mvLXN of the neighboring prediction units and the availability flags availableFlagLXN of the neighboring prediction units.

The variable is ScaledFlagLX with X being 0 or 1 may be set equal to 0. Video encoder 20 and video decoder 30 may be configured to derive the motion vector mvLXA and the availability flag availableFlagLXA using the following ordered steps, where underlined text represents changes relative to HEVC WD7:

1. Let a set of two sample locations be $(xA_k, yA_k)$, with k=0, 1, specifying sample locations with $xA_k=xP-1$, $yA_0=yP+nPSH$ and $yA_1=yA_0-MinPuSize$. The set of sample locations $(xA_k, yA_k)$ represent the sample locations immediately to the left side of the left partition boundary and it's extended line.

2. Let the availability flag availableFlagLXA be initially set equal to 0 and the both components of mvLXA are set equal to 0.

3. When one or more of the following conditions are true, the variable is ScaledFlagLX is set equal to 1.
   the prediction unit covering luma location $(xA_0, yA_0)$ is available [Ed. (BB): Rewrite it using MinCbAddrZS[ ][ ] and the availability process for minimum coding blocks] and PredMode is not MODE_INTRA.
   the prediction unit covering luma location $(xA_1, yA_1)$ is available [Ed. (BB): Rewrite it using MinCbAddrZS[ ][ ] and the availability process for minimum coding blocks] and PredMode is not MODE_INTRA.

4. For $(xA_k, yA_k)$ from $(xA_0, yA_0)$ to $(xA_1, yA_1)$ where $yA_1=yA_0-MinPuSize$, if availableFlagLXA is equal to 0, the following applies:
   If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1 and the reference index refIdxLX[$xA_k$][$yA_k$] is equal to the reference index of the current prediction unit refIdxLX, availableFlagLXA is set equal to 1 and the motion vector mvLXA is set equal to the motion vector mvLX[$xA_k$][$yA_k$], refIdxA is set equal to refIdxLX[$xA_k$][$yA_k$] and ListA is set equal to ListX.
   Otherwise, if the prediction unit covering luma location (xAk, yAk) is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1, AddPicId(RefPicListX[refIdxLX]) is equal to AddPicId(RefPicListY[refIdxLY[$xA_k$][$yA_k$]]), and PicOrderCnt(RefPicListY[refIdxLY[$xA_k$][$yA_k$]]) is equal to PicOrderCnt(RefPicListX[refIdxLX]), availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY and mvLXA is set equal to mvLXA.
   When availableFlagLXA is equal to 1, availableFlagLXA is set to 0 if one or more of the following are true:
   One and only one of RefPicListX[refIdxLX] and ListA[refIdxA] is a long-term reference picture;

Both RefPicListX[refIdxLX] and ListA[refIdxA] are long-term reference pictures and PicOrderCnt (ListA[refIdxA]) is not equal to PicOrderCnt(RefPicListX[refIdxLX]).

5. When availableFlagLXA is equal to 0, for $(xA_k, yA_k)$ from $(xA_0, yA_0)$ to $(xA_1, yA_1)$ where $yA_1=yA_0-$MinPuSize, if availableFlagLXA is equal to 0, the following applies:

If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1, and AddPicId (RefPicListLX[refIdxLX]) is equal to AddPicId (RefPicListLX[refIdxLX[$xA_k$][$yA_k$]]), availableFlagLXA is set equal to 1, the motion vector mvLXA is set equal to the motion vector mvLX[$xA_k$][$yA_k$], refIdxA is set equal to refIdxLX[$xA_k$][$yA_k$], ListA is set equal to ListX.

Otherwise, if the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1, and AddPicId(RefPicListLX[refIdxLX]) is equal to AddPicId(RefPicListLY[refIdxLY[$xA_k$][$yA_k$]]), availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY.

When availableFlagLXA is equal to 1, availableFlagLXA is set to 0 if one or more of the following are true:
  One and only one of RefPicListX[refIdxLX] and ListA[refIdxA] is a long-term reference picture;
  Both RefPicListX[refIdxLX] and ListA[refIdxA] are long-term reference pictures and PicOrderCnt (ListA[refIdxA]) is not equal to PicOrderCnt(RefPicListX[refIdxLX]).

When availableFlagLXA is equal to 1, and both RefPicListA[refIdxA] and RefPicListX[refIdxLX] are short-term reference pictures, mvLXA is derived as specified below.

$$tx=(16384+(Abs(td)>>1))/td \quad (8\text{-}126)$$

$$DistScaleFactor=Clip3(-4096,4095,(tb*tx+32)>>6) \quad (8\text{-}127)$$

$$mvLXA=Clip3(-8192,8191.75,Sign(DistScaleFactor*mvLXA)*((Abs(DistScaleFactor*mvLXA)+127)>>8)) \quad (8\text{-}128)$$

where td and tb may be derived as $$td=Clip3(128,127,PicOrderCntVal-PicOrderCnt(RefPicListA[refIdxA])) \quad (8\text{-}129)$$

$$tb=Clip3(128,127,PicOrderCntVal\ PicOrderCnt(RefPicListX-[refIdxLX])) \quad (8\text{-}130)$$

Video encoder 20 and video decoder 30 may be configured to derive the motion vector mvLXB and the availability flag availableFlagLXB using the following ordered steps, where underlined text represents changes with respect to HEVC WD7:

1. Let a set of three sample location $(xB_k, yB_k)$, with k=0,1,2, specifying sample locations with $xB_0=xP+nPSW$, $xB_1=xB_0-$MinPuSize, $xB_2=xP-$MinPuSize and $yB_k=yP-1$. The set of sample locations $(xB_k, yB_k)$ represent the sample locations immediately to the upper side of the above partition boundary and its extended line. [Ed. (BB): Define MinPuSize in the SPS but the derivation should depend on the use of an AMP flag]

2. When yP−1 is less than ((yC>>Log 2CtbSize)<<Log 2CtbSize), the following applies.

$$xB_0=(xB_0>>3)<<3)+((xB_0>>3)\&1)*7 \quad (8\text{-}131)$$

$$xB_1=(xB_1>>3)<<3)+((xB_1>>3)\&1)*7 \quad (8\text{-}132)$$

$$xB_2=(xB_2>>3)<<3)+((xB_2>>3)\&1)*7 \quad (8\text{-}133)$$

3. Let the availability flag availableFlagLXB be initially set equal to 0 and the both components of mvLXB are set equal to 0.

4. For $(xB_k, yB_k)$ from $(xB_0, yB_0)$ to $(xB_2, yB_2)$ where $xB_0=xP+nPSW$, $xB_1=xB_0-$MinPuSize, and $xB_2=xP-$MinPuSize, if availableFlagLXB is equal to 0, the following applies:

If the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLX[$xB_k$][$yB_k$] is equal to 1, and the reference index refIdxLX[$xB_k$][$yB_k$] is equal to the reference index of the current prediction unit refIdxLX, availableFlagLXB is set equal to 1 and the motion vector mvLXB is set equal to the motion vector mvLX[$xB_k$][$yB_k$], refIdxB is set equal to refIdxLX[$xB_k$][$yB_k$] and ListB is set equal to ListX.

Otherwise, if the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLY[$xB_k$][$yB_k$] (with Y=!X) is equal to 1, AddPicId(RefPicListLX[refIdxLX]) is equal to AddPicId(RefPicListLY[refIdxY[xBk][yBk]]), and PicOrderCnt(RefPicListY[refIdxLY[$xB_k$][$yB_k$]]) is equal to PicOrderCnt(RefPicListX[refIdxLX]), availableFlagLXB is set equal to 1, the motion vector mvLXB is set equal to the motion vector mvLY[$xB_k$][$yB_k$], refIdxB is set equal to refIdxLY[$xB_k$][$yB_k$], and ListB is set equal to ListY.

When availableFlagLXA is equal to 1, availableFlagLXA is set to 0 if one or more of the following are true:
  One and only one of RefPicListX[refIdxLX] and ListB[refIdxB] is a long-term reference picture.
  AddPicId(RefPicListX[refIdxLX]) is not equal to AddPicId(ListB[refIdxB]).
  Both RefPicListX[refIdxLX] and ListB[refIdxB] are long-term reference pictures and PicOrderCnt (ListB[refIdxB]) is not equal to PicOrderCnt(RefPicListX[refIdxLX]).

5. When is ScaledFlagLX is equal to 0 and availableFlagLXB is equal to 1, mvLXA is set equal to mvLXB and refIdxA is set equal to refIdxB and availableFlagLXA is set equal to 1.

6. When is ScaledFlagLX is equal to 0, availableFlagLXB is set equal to 0 and for $(xB_k, yB_k)$ from $(xB_0, yB_0)$ to $(xB_2, yB_2)$ where $xB_0=xP+nPSW$, $xB_1=xB_0-$MinPuSize, and $xB_2=xP-$MinPuSize, if availableFlagLXB is equal to 0, the following applies:

If the prediction unit covering luma location $(xB_k, yB_k)$ is available [Ed. (BB): Rewrite it using MinCbAddrZS[ ][ ] and the availability process for minimum coding blocks], PredMode is not MODE_INTRA, predFlagLX[$xB_k$][$yB_k$] is equal to 1, and AddPicId (RefPicListX[refIdxLX]) is equal to AddPicId(RefPicListX[refIdxLX[xBk][yBk]]), availableFlagLXB is set equal to 1, the motion vector mvLXB is set equal to the motion vector mvLX[xB$_k$][yB$_k$], refIdxB is set equal to refIdxLX[xB$_k$][yB$_k$], ListB is set equal to ListX.

Otherwise, if the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLY[xB$_k$][yB$_k$] (with Y=!X) is equal to 1, and AddPicId(RefPicListX[refIdxLX]) is equal to AddPicId(RefPicListY[refIdxLY[xBk][yBk]]), availableFlagLXB is set equal to 1, the motion vector mvLXB is set equal to the motion vector mvLY[xB$_k$][yB$_k$], refIdxB is set equal to refIdxLY[xB$_k$][yB$_k$], ListB is set equal to ListY.

When availableFlagLXA is equal to 1, availableFlagLXA is set to 0 if one or more of the following are true:

One and only one of RefPicListX[refIdxLX] and ListB[(refIdxB]) is a long-term reference picture.

Both RefPicListX[refIdxLX] and ListB[refIdxB] are long-term reference pictures and PicOrderCnt (ListB[refIdxB]) is not equal to PicOrderCnt(RefPicListX[refIdxLX]).

When availableFlagLXB is equal to 1 and PicOrderCnt (RefPicListB[refIdxB]) is not equal to PicOrderCnt (RefPicListX[refIdxLX]) and both RefPicListB[refIdxB] and RefPicListX[refIdxLX] are short-term reference pictures, mvLXB is derived as specified below.

$$tx=(16384+(Abs(td)>>1))/td \qquad (8\text{-}134)$$

$$DistScaleFactor=Clip3(-4096,4095,(tb*tx+32)>>6) \qquad (8\text{-}135)$$

$$mvLXB=Clip3(-8192,8191.75,Sign(DistScaleFactor*mvLXA)*((Abs(DistScaleFactor*mvLXA)+127)>>8)) \qquad (8\text{-}136)$$

where td and tb may be derived as $$td=Clip3(-128,127,PicOrderCntVal-PicOrderCnt(RefPicListB[refIdxB])) \qquad (8\text{-}137)$$

$$tb=Clip3(-128,127,PicOrderCntVal-PicOrderCnt(RefPicListX[refIdxLX])) \qquad (8\text{-}138)$$

Video encoder 20 and video decoder 30 may be configured to derive temporal luma motion vector predictors as follows. Inputs to the process may include a luma location (xP, yP) specifying the top-left luma sample of the current prediction unit relative to the top-left sample of the current picture, variables specifying the width and the height of the prediction unit for luma, nPSW and nPSH, and the reference index of the current prediction unit partition refIdxLX (with X being 0 or 1). Outputs of the process may include the motion vector prediction mvLXCol and the availability flag availableFlagLXCol.

The function RefPicOrderCnt(picX, refIdx, LX), which may return the picture order count PicOrderCntVal of the reference picture with index refIdx from reference picture list LX of the picture picX, may be specified as follows:

$$RefPicOrderCnt(picX,refIdx,LX)=PicOrderCnt(RefPicListX[refIdx] \text{ of the picture picX}) \qquad (8\text{-}141)$$

Depending on the values of slice_type, collocated_from_l0_flag, and collocated_ref_idx, video encoder 20 and video decoder 30 may derive the variable colPic, specifying the picture that contains the collocated partition, as follows:

If slice_type is equal to B and collocated_from_l0_flag is equal to 0, the variable colPic specifies the picture that contains the collocated partition as specified by RefPicList1 [collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Video encoder 20 and video decoder 30 may derive variable colPu and its position (xPCol, yPCol) using the following ordered steps, where underlined text represents changes relative to HEVC WD7:

1. The variable colPu may be derived as follows $$yPRb=yP+nPSH \qquad (8\text{-}139)$$

If (yP>>Log 2CtbSize) is equal to (yPRb>>Log 2CtbSize), the horizontal component of the right-bottom luma position of the current prediction unit is defined by $$xPRb=xP+nPSW \qquad (8\text{-}140)$$

and the variable colPu is set as the prediction unit covering the modified position given by ((xPRb>>4)<<4, (yPRb>>4)<<4) inside the colPic.

Otherwise ((yP>>Log 2CtbSize) is not equal to (yPRb>>Log 2CtbSize)), colPu is marked as "unavailable."

2. When colPu is coded in an intra prediction mode or colPu is marked as "unavailable," the following applies.

Central luma position of the current prediction unit is defined by $$xPCtr=(xP+(nPSW>>1) \qquad (8\text{-}141)$$

$$yPCtr=(yP+(nPSH>>1) \qquad (8\text{-}142)$$

The variable colPu is set as the prediction unit covering the modified position given by ((xPCtr>>4)<<4, (yPCtr>>4)<<4) inside the colPic.

3. (xPCol, yPCol) is set equal to the top-left luma sample of the colPu relative to the top-left luma sample of the colPic.

The function LongTermRefPic(picX, refIdx, LX) is defined as follows. If the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0.

The function AddPicId(picX, refIdx, LX) returns AddPicId(pic), wherein pic is the reference picture with index refIdx from reference picture list LX of the picture picX.

The variables mvLXCol and availableFlagLXCol are derived as follows.

If one or more of the following conditions are true, both components of mvLXCol are set equal to 0 and availableFlagLXCol is set equal to 0.

colPu is coded in an intra prediction mode.

colPu is marked as "unavailable."

pic_temporal_mvp_enable_flag is equal to 0.

Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MyL1[xPCol][yPCol], RefIdxL1[xPCol][yPCol], and L1, respectively.

Otherwise (PredFlagL0[xPCol][yPCol] is equal to 1), the following applies.

If PredFlagL1[xPCol][yPCol] is equal to 0, mvCol, refIdxCol, and listCol are set equal to MvL0[xPCol][yPCol], RefIdxL0[xPCol][yPCol], and L0, respectively.

Otherwise (PredFlagL1[xPCol][yPCol] is equal to 1), the following assignments are made.

If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

If one of the following conditions is true, the variable availableFlagLXCol is set equal to 0.

AddPicId(RefPicListX[refIdxLX]) is not equal to AddPicId(colPic, refIdxCol, listCol);

RefPicListX[refIdxLX] is a short-term reference picture and LongTermRefPic(colPic, refIdxCol, listCol) is equal to 1;

RefPicListX[refIdxLX] is a long-term reference picture and LongTermRefPic(colPic, refIdxCol, listCol) is equal to 0;

RefPicListLX[refIdxLX] is a long-term reference picture and LongTermRefPic(colPic, refIdxCol, listCol) is equal to 1 and RefPicOrderCnt(colPic, refIdxCol, listCol) is not equal to PicOrderCnt(RefPicListLX r refIdxLX 1).

Otherwise, the variable availableFlagLXCol is set equal to 1, and the following applies.

If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal PicOrderCnt(RefPicListX[refIdxLX]), $$mvLXCol = mvCol \quad (8\text{-}143)$$

Otherwise, mvLXCol is derived as scaled version of the motion vector mvCol as specified below $$tx = (16384 + (\text{Abs}(td) \gg 1))/td \quad (8\text{-}144)$$

$$\text{DistScaleFactor} = \text{Clip3}(-4096, 4095, (tb \cdot tx + 32) \gg 6) \quad (8\text{-}145)$$

$$mvLXCol = \text{Clip3}(-8192, 8191.75, \text{Sign}(\text{DistScaleFactor} \cdot mvCol) \cdot ((\text{Abs}(\text{DistScaleFactor} \cdot mvCol) + 127) \gg 8)) \quad (8\text{-}146)$$

where td and tb may be derived as $$td = \text{Clip3}(-128, 127, \text{PicOrderCnt}(colPic) - \text{RefPicOrderCnt}(colPic, refIdxCol, listCol)) \quad (8\text{-}147)$$

$$tb = \text{Clip3}(-128, 127, \text{PicOrderCntVal PicOrderCnt}(\text{RefPicListX}[refIdxLX])) \quad (8\text{-}148)$$

Video encoder 20 and video decoder 30 may be configured to perform the following derivation process for combined bi-predictive merging candidates. Inputs of the process may include a merging candidate list mergeCandList, reference indices refIdxL0N and refIdxL1N of every candidate N being in mergeCandList, prediction list utilization flags predFlagL0N and predFlagL1N of every candidate N being in mergeCandList, motion vectors mvL0N and mvL1N of every candidate N being in mergeCandList, the number of elements numMergeCand within mergeCandList, and the number of elements numOrigMergeCand within the mergeCandList after the spatial and temporal merge candidate derivation process. Outputs of this process may include the merging candidate list mergeCandList, the number of elements numMergeCand within mergeCandList, reference indices refIdxL0combCandk and refIdxL1combCandk of every new candidate combCandk being added in mergeCandList during the invokation of this process, prediction list utilization flags predFlagL0combCandk and predFlagL1combCandk of every new candidate combCandk being added in mergeCandList during the invocation of this process, and motion vectors mvL0combCandk and mvL1combCandk of every new candidate combCandk being added in mergeCandList during the invocation of this process.

When numOrigMergeCand is greater than 1 and less than MaxNumMergeCand, the variable numInputMergeCand may be set to numMergeCand, the variables combIdx and combCnt may be set to 0, the variable combStop may be set to FALSE and the following steps may be repeated until combStop is equal to TRUE (where ellipses represent the same steps as provided in the HEVC WD7, and underlined text represents changes relative to HEVC WD7):

1. The variables l0CandIdx and l1CandIdx are derived using combIdx as specified in Table 8-8.
2. The following assignments are made with l0Cand being the candidate at position l0CandIdx and l1Cand being the candidate at position l1CandIdx in the merging candidate list mergeCandList (l0Cand=mergeCandList[l0CandIdx], l1Cand=mergeCandList[l1CandIdx]).
3. When all of the following conditions are true, predFlagL0l0Cand==1
predFlagL1l1Cand==1
AddPicId(RefPicListL0[refIdxL0l0Cand]) !=AddPicId(RefPicListL1[refIdxL1l1Cand])|| PicOrderCnt(RefPicList0[refIdxL0l0Cand]) !=PicOrderCnt(RefPicList1 [refIdxL1l1Cand])|| mvL0l0Cand !=myL1l1Cand
the following applies.
. . .
4. . . .
5. . . .

As an alternative, prediction between two long-term reference pictures may be enabled without scaling, and prediction between two inter-view reference pictures may be enabled without scaling. Video encoder 20 and video decoder 30 may be configured to perform a derivation process for motion vector predictor candidates as follows, where underlined text represents changes relative to HEVC WD7 and ellipses represent text that is the same as that of HEVC WD7:

The variable is ScaledFlagLX with X being 0 or 1 may be set equal to 0.

The motion vector mvLXA and the availability flag availableFlagLXA may be derived in the following ordered steps:

1. . . .
2. . . .
3. . . .
4. . . .
5. When availableFlagLXA is equal to 0, for ($xA_k$, $yA_k$) from ($xA_0$, $yA_0$) to ($xA_1$, $yA_1$) where $yA_1=yA_0-$MinPuSize, the following applies repeatedly until availableFlagLXA is equal to 1:
   If the prediction unit covering luma location ($xA_k$, $yA_k$) is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1, and RefPicType(RefPicListX[refIdxLX]) is equal to RefPicType(RefPicListX[refIdxLX[$xA_k$][$yA_k$]]), availableFlagLXA is set equal to 1, the motion vector mvLXA is set equal to the motion vector mvLX[$xA_k$][$yA_k$], refIdxA is set equal to refIdxLX[$xA_k$][$yA_k$], ListA is set equal to ListX.
   Otherwise, if the prediction unit covering luma location ($xA_k$, $yA_k$) is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1, and RefPicType(RefPicListX[refIdxLX]) is equal to RefPicType(RefPicListY[refIdxLY[$xA_k$][$yA_k$]]), availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY.
   When availableFlagLXA is equal to 1, and both RefPicListA[refIdxA] and RefPicListX[refIdxLX] are short-term reference pictures, mvLXA is derived as specified below.

$$Tx=(16384+(Abs(td)\gg1))/td \quad (8\text{-}126)$$

$$DistScaleFactor=Clip3(-4096,4095,(tb*tx+32)\gg6) \quad (8\text{-}127)$$

$$mvLXA=Clip3(-8192,8191.75,\text{Sign}(DistScaleFactor*mvLXA)*((Abs(DistScaleFactor*mvLXA)+127)\gg8)) \quad (8\text{-}128)$$

where td and tb may be derived as $$td=Clip3(-128,127,PicOrderCntVal-PicOrderCnt(RefPicListA[refIdxA])) \quad (8\text{-}129)$$

$$tb=Clip3(-128,127,PicOrderCntVal-PicOrderCnt(RefPicListX[refIdxLX])) \quad (8\text{-}130)$$

Video encoder 20 and video decoder 30 may derive the motion vector mvLXB and the availability flag availableFlagLXB using the following ordered steps, where underlined text represents changes relative to HEVC WD7 and ellipses represent text that is the same as that of HEVC WD7:
1. . . .
2. . . .
3. . . .
4. . . .
5. . . .
6. When is ScaledFlagLX is equal to 0, availableFlagLXB is set equal to 0 and for ($xB_k$, $yB_k$) from ($xB_0$, $yB_0$) to ($xB_2$, $yB_2$) where $xB_0=xP+nPSW$, $xB_1=xB_0-$MinPuSize, and $xB_2=xP-$MinPuSize, the following applies repeatedly until availableFlagLXB is equal to 1:
   If the prediction unit covering luma location ($xB_k$, $yB_k$) is available [Ed. (BB): Rewrite it using MinCbAddrZS[ ][ ] and the availability process for minimum coding blocks], PredMode is not MODE_INTRA, predFlagLX[$xB_k$][$yB_k$] is equal to 1, and RefPicType(RefPicListX[refIdxLX]) is equal to RefPicType(RefPicListX[refIdxLX[$xB_k$][$yB_k$]]), availableFlagLXB is set equal to 1, the motion vector mvLXB is set equal to the motion vector mvLX[$xB_k$][$yB_k$], refIdxB is set equal to refIdxLX[$xB_k$][$yB_k$], ListB is set equal to ListX.
   Otherwise, if the prediction unit covering luma location ($xB_k$, $yB_k$) is available [Ed. (BB): Rewrite it using MinCbAddrZS[ ][ ] and the availability process for minimum coding blocks], PredMode is not MODE_INTRA, predFlagLY[$xB_k$][$yB_k$] (with Y=!X) is equal to 1, and RefPicType(RefPicListX[refIdxLX]) is equal to RefPicType(RefPicListY[refIdxLY[$xB_k$][$yB_k$]]), availableFlagLXB is set equal to 1, the motion vector mvLXB is set equal to the motion vector mvLY[$xB_k$][$yB_k$], refIdxB is set equal to refIdxLY[$xB_k$][$yB_k$], ListB is set equal to ListY.
   When availableFlagLXB is equal to 1 and PicOrderCnt(RefPicListB[refIdxB]) is not equal to PicOrderCnt(RefPicListX[refIdxLX]) and both RefPicListB[refIdxB] and RefPicListX[refIdxLX] are short-term reference pictures, mvLXB is derived as specified below.

$$tx=(16384+(Abs(td)\gg1))/td \quad (8\text{-}134)$$

$$DistScaleFactor=Clip3(-4096,4095,(tb*tx+32)\gg6) \quad (8\text{-}135)$$

$$mvLXB=Clip3(-8192,8191.75,\text{Sign}(DistScaleFactor*mvLXA)*((Abs(DistScaleFactor*mvLXA)+127)\gg8)) \quad (8\text{-}136)$$

where td and tb may be derived as $$td=Clip3(-128,127,PicOrderCntVal-PicOrderCnt(RefPicListB[refIdxB])) \quad (8\text{-}137)$$

$$tb=Clip3(-128,127,PicOrderCntVal-PicOrderCnt(RefPicListX[refIdxLX])) \quad (8\text{-}138)$$

Video encoder 20 and video decoder 30 may be configured to perform a derivation process for temporal luma motion vector prediction, as follows.

The variables mvLXCol and availableFlagLXCol may be derived as follows.
If one or more of the following conditions are true, both components of mvLXCol are set equal to 0 and availableFlagLXCol is set equal to 0.
  colPu is coded in an intra prediction mode.
  colPu is marked as "unavailable."
  pic_temporal_mvp_enable_flag is equal to 0.
Otherwise, the motion vector mvCol, the reference index refIdxCol, and the reference list identifier listCol are derived as follows.
  If PredFlagL0[xPCol][yPCol] is equal to 0, mvCol, refIdxCol, and listCol are set equal to MyL1[xPCol][yPCol], RefIdxL1[xPCol][yPCol], and L1, respectively.
  Otherwise (PredFlagL0[xPCol][yPCol] is equal to 1), the following applies.
    If PredFlagL1[xPCol][yPCol] is equal to 0, mvCol, refIdxCol, and listCol are set equal to MvL0[xPCol][yPCol], RefIdxL0[xPCol][yPCol], and L0, respectively.
    Otherwise (PredFlagL1[xPCol][yPCol] is equal to 1), the following assignments are made.
      If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

If RefPicType(RefPicListX[refIdxLX]) is not equal to RefPicType(colPic, refIdxCol, listCol), the variable availableFlagLXCol is set equal to 0.

Otherwise, the variable availableFlagLXCol is set equal to 1, and the following applies.

If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal−PicOrderCnt(RefPicListX[refIdxLX]), $$mvLXCol = mvCol \qquad (8\text{-}143)$$

Otherwise, mvLXCol is derived as scaled version of the motion vector mvCol as specified below $$tx = (16384 + (\mathrm{Abs}(td) \gg 1))/td \qquad (8\text{-}144)$$

$$\mathrm{DistScaleFactor} = \mathrm{Clip3}(-4096, 4095, (tb * tx + 32) \gg 6) \qquad (8\text{-}145)$$

$$mvLXCol = \mathrm{Clip3}(-8192, 8191.75, \mathrm{Sign}(\mathrm{DistScaleFactor} * mvCol) * ((\mathrm{Abs}(\mathrm{DistScaleFactor} * mvCol) + 127) \gg 8)) \qquad (8\text{-}146)$$

where td and tb may be derived as $$td = \mathrm{Clip3}(-128, 127, \mathrm{PicOrderCnt}(colPic) - \mathrm{RefPicOrderCnt}(colPic, refIdxCol, listCol)) \qquad (8\text{-}147)$$

$$tb = \mathrm{Clip3}(-128, 127, \mathrm{PicOrderCntVal} - \mathrm{PicOrderCnt}(\mathrm{RefPicListX}[refIdxLX])) \qquad (8\text{-}148)$$

Section 8.5.2.1.3 of HEVC WD7 may remain the same, for purposes of this example.

In an alternative example, prediction between motion vectors referring to different long-term reference pictures may be disabled, prediction between motion vectors referring to an inter-view reference picture and a long-term reference picture may be disabled, and prediction between motion vectors referring to different inter-view reference pictures may be enabled. In this example, video encoder 20 and video decoder 30 may be configured to perform a derivation process for motion vector predictor candidates as described below. Inputs to this process may include a luma location (xP, yP) specifying the top-left luma sample of the current prediction unit relative to the top-left sample of the current picture, variables specifying the width and the height of the prediction unit for luma, nPSW and nPSH, and the reference index of the current prediction unit partition refIdxLX (with X being 0 or 1). Outputs of this process may include (with N being replaced by A or B) the motion vectors mvLXN of the neighboring prediction units and the availability flags availableFlagLXN of the neighboring prediction units.

The variable is ScaledFlagLX with X being 0 or 1 may be set equal to 0. Video encoder 20 and video decoder 30 may derive the motion vector mvLXA and the availability flag availableFlagLXA using the following ordered steps, where underlined text represents changes relative to HEVC WD7:

1. Let a set of two sample locations be (xAk, yAk), with k=0, 1, specifying sample locations with xAk=xP−1, yA0=yP+nPSH and yA1=yA0−MinPuSize. The set of sample locations (xAk, yAk) represent the sample locations immediately to the left side of the left partition boundary and it's extended line.
2. Let the availability flag availableFlagLXA be initially set equal to 0 and the both components of mvLXA are set equal to 0.
3. When one or more of the following conditions are true, the variable is ScaledFlagLX is set equal to 1.
   the prediction unit covering luma location $(xA_0, yA_0)$ is available [Ed. (BB): Rewrite it using MinCbAddrZS[ ][ ] and the availability process for minimum coding blocks] and PredMode is not MODE_INTRA.
   the prediction unit covering luma location $(xA_1, yA_1)$ is available [Ed. (BB): Rewrite it using MinCbAddrZS[ ][ ] and the availability process for minimum coding blocks] and PredMode is not MODE_INTRA.
4. For $(xA_k, yA_k)$ from $(xA_0, yA_0)$ to $(xA_1, yA_1)$ where $yA_1=yA_0-$MinPuSize, if availableFlagLXA is equal to 0, the following applies:
   If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1 and the reference index refIdxLX[$xA_k$][$yA_k$] is equal to the reference index of the current prediction unit refIdxLX, availableFlagLXA is set equal to 1 and the motion vector mvLXA is set equal to the motion vector mvLX[$xA_k$][$yA_k$], refIdxA is set equal to refIdxLX[$xA_k$][$yA_k$] and ListA is set equal to ListX.
   Otherwise, if the prediction unit covering luma location (xAk, yAk) is available [Ed. (BB): Rewrite it using MinCbAddrZS[ ][ ] and the availability process for minimum coding blocks], PredMode is not MODE_INTRA, predFlagLY[$xA_k$][$yA_k$] (with Y=!X) is equal to 1, AddPicId(RefPicListX[refIdxLX]) is equal to AddPicId(RefPicListY[refIdxLY[$xA_k$][$yA_k$]]), and PicOrderCnt(RefPicListY[refIdxLY[$xA_k$][$yA_k$]]) is equal to PicOrderCnt(RefPicListX[refIdxLX]), availableFlagLXA is set equal to 1, the motion vector mvLXA is set equal to the motion vector mvLY[$xA_k$][$yA_k$], refIdxA is set equal to refIdxLY[$xA_k$][$yA_k$], ListA is set equal to ListY and mvLXA is set equal to mvLXA.
   When availableFlagLXA is equal to 1, availableFlagLXA is set to 0 if the following is true
      One and only one of RefPicListX[refIdxLX] and ListA[refIdxA] is a long-term reference picture.
5. When availableFlagLXA is equal to 0, for $(xA_k, yA_k)$ from $(xA_0, yA_0)$ to $(xA_1, yA_1)$ where $yA_1=yA_0-$MinPuSize, if availableFlagLXA is equal to 0, the following applies:
   If the prediction unit covering luma location $(xA_k, yA_k)$ is available [Ed. (BB): Rewrite it using MinCbAddrZS[ ][ ] and the availability process for minimum coding blocks], PredMode is not MODE_INTRA, predFlagLX[$xA_k$][$yA_k$] is equal to 1, and AddPicId (RefPicListX[refIdxLX]) is equal to AddPicId (RefPicListX[refIdxLX[xAk][yAk]]), availableFlagLXA is set equal to 1, the motion vector mvLXA is set equal to the motion vector mvLX[xA$_k$][yA$_k$], refIdxA is set equal to refIdxLX[xA$_k$][yA$_k$], ListA is set equal to ListX.

Otherwise, if the prediction unit covering luma location (xA$_k$, yA$_k$) is available [Ed. (BB): Rewrite it using MinCbAddrZS[ ][ ] and the availability process for minimum coding blocks], PredMode is not MODE_INTRA, predFlagLY[xA$_k$][yA$_k$] (with Y=!X) is equal to 1, and AddPicId(RefPicListLX[refIdxLX]) is equal to AddPicId(RefPicListLY[refIdxLY[xAk][yAk]]), availableFlagLXA is set equal to 1, the motion vector mvLXA is set equal to the motion vector mvLY[xA$_k$][yA$_k$], refIdxA is set equal to refIdxLY[xA$_k$][yA$_k$], ListA is set equal to ListY.

When availableFlagLXA is equal to 1, availableFlagLXA is set to 0 if the following is true:
  One and only one of RefPicListX[refIdxLX] and ListA[refIdxA] is a long-term reference picture.

When availableFlagLXA is equal to 1, and both RefPicListA[refIdxA] and RefPicListX[refIdxLX] are short-term reference pictures, mvLXA is derived as specified below.

$$tx = (16384 + (\text{Abs}(td) >> 1))/td \quad (8\text{-}126)$$

$$\text{DistScaleFactor} = \text{Clip3}(-4096, 4095, (tb*tx+32) >> 6) \quad (8\text{-}127)$$

$$mvLXA = \text{Clip3}(-8192, 8191.75, \text{Sign}(\text{DistScaleFactor}*mvLXA)*((\text{Abs}(\text{DistScaleFactor}*mvLXA)+127) >> 8)) \quad (8\text{-}128)$$

where td and tb may be derived as $$td = \text{Clip3}(-128, 127, \text{PicOrderCntVal} - \text{PicOrderCnt}(\text{RefPicListA}[refIdxA])) \quad (8\text{-}129)$$

$$tb = \text{Clip3}(-128, 127, \text{PicOrderCntVal} - \text{PicOrderCnt}(\text{RefPicListX}[refIdxLX])) \quad (8\text{-}130)$$

Video encoder 20 and video decoder 30 may be configured to derive the motion vector mvLXB and the availability flag availableFlagLXB using the following ordered steps, where underlined text represents changes relative to HEVC WD7:

1. Let a set of three sample location (xBk, yBk), with k=0,1,2, specifying sample locations with xB0=xP+nPSW, xB1=xB0−MinPuSize, xB2=xP−MinPuSize and yBk=yP−1. The set of sample locations (xBk, yBk) represent the sample locations immediately to the upper side of the above partition boundary and its extended line. [Ed. (BB): Define MinPuSize in the SPS but the derivation should depend on the use of an AMP flag]
2. When yP−1 is less than ((yC>>Log 2CtbSize)<<Log 2CtbSize), the following applies.

$$xB_0 = (xB_0 >> 3) << 3) + ((xB_0 << 3) \& 1)*7 \quad (8\text{-}131)$$

$$xB_1 = (xB_1 >> 3) << 3) + ((xB_1 >> 3) \& 1)*7 \quad (8\text{-}132)$$

$$xB_2 = (xB_2 >> 3) << 3) + ((xB_2 >> 3) \& 1)*7 \quad (8\text{-}133)$$

3. Let the availability flag availableFlagLXB be initially set equal to 0 and the both components of mvLXB are set equal to 0.
4. For (xB$_k$, yB$_k$) from (xB$_0$, yB$_0$) to (xB$_2$, yB$_2$) where xB$_0$=xP+nPSW, xB$_1$=xB$_0$−MinPuSize, and xB$_2$=xP−MinPuSize, if availableFlagLXB is equal to 0, the following applies:
  If the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLX[xB$_k$][yB$_k$] is equal to 1, and the reference index refIdxLX[xB$_k$][yB$_k$] is equal to the reference index of the current prediction unit refIdxLX, availableFlagLXB is set equal to 1 and the motion vector mvLXB is set equal to the motion vector mvLX[xB$_k$][yB$_k$], refIdxB is set equal to refIdxLX[xB$_k$][yB$_k$] and ListB is set equal to ListX.

Otherwise, if the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLY[xB$_k$][yB$_k$] (with Y=!X) is equal to 1, AddPicId(RefPicListX[refIdxLX]) is equal to AddPicId(RefPicListLY[refIdxY[xBk][yBk]]), and PicOrderCnt(RefPicListY[refIdxLY[xB$_k$][yB$_k$]]) is equal to PicOrderCnt(RefPicListX[refIdxLX]), availableFlagLXB is set equal to 1, the motion vector mvLXB is set equal to the motion vector mvLY[xB$_k$][yB$_k$], refIdxB is set equal to refIdxLY[xB$_k$][yB$_k$], and ListB is set equal to ListY.

When availableFlagLXA is equal to 1, availableFlagLXA is set to 0 if the following is true:
  One and only one of RefPicListX[refIdxLX] and ListB[refIdxB] is a long-term reference picture.

5. When is ScaledFlagLX is equal to 0 and availableFlagLXB is equal to 1, mvLXA is set equal to mvLXB and refIdxA is set equal to refIdxB and availableFlagLXA is set equal to 1.
6. When is ScaledFlagLX is equal to 0, availableFlagLXB is set equal to 0 and for (xB$_k$, yB$_k$) from (xB$_0$, yB$_0$) to (xB$_2$, yB$_2$) where xB$_0$=xP+nPSW, xB$_1$=xB$_0$−MinPuSize, and xB$_2$=xP−MinPuSize, if availableFlagLXB is equal to 0, the following applies:
  If the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLX[xB$_k$][yB$_k$] is equal to 1, and AddPicId(RefPicListX[refIdxLX]) is equal to AddPicId(RefPicListX[refIdxLX[xBk][yBk]]), availableFlagLXB is set equal to 1, the motion vector mvLXB is set equal to the motion vector mvLX[xB$_k$][yB$_k$], refIdxB is set equal to refIdxLX[xB$_k$][yB$_k$], ListB is set equal to ListX.

Otherwise, if the prediction unit covering luma location (xB$_k$, yB$_k$) is available [Ed. (BB): Rewrite it using MinCbAddrZS[ ][ ] and the availability process for minimum coding blocks], PredMode is not MODE_INTRA, predFlagLY[xB$_k$][yB$_k$] (with Y=!X) is equal to 1, and AddPicId(RefPicListX[refIdxLX]) is equal to AddPicId(RefPicListY[refIdxLY[xBk][yBk]]), availableFlagLXB is set equal to 1, the motion vector mvLXB is set equal to the motion vector mvLY[xB$_k$][yB$_k$], refIdxB is set equal to refIdxLY[xB$_k$][yB$_k$], ListB is set equal to ListY.

When availableFlagLXA is equal to 1, availableFlagLXA is set to 0 if the following is true:
  One and only one of RefPicListX[refIdxLX] and ListB[(refIdxB]) is a long-term reference picture.

When availableFlagLXB is equal to 1 and PicOrderCnt(RefPicListB[refIdxB]) is not equal to PicOrderCnt(RefPicListX[refIdxLX]) and both RefPicListB[refIdxB] and RefPicListX[refIdxLX] are short-term reference pictures, mvLXB is derived as specified below.

$$tx=(16384+(\text{Abs}(td)>>1))/td \quad (8\text{-}134)$$

$$\text{DistScaleFactor}=\text{Clip3}(-4096,4095,(tb*tx+32)>>6) \quad (8\text{-}135)$$

$$mvLXB=\text{Clip3}(-8192,8191.75,\text{Sign}\\(\text{DistScaleFactor}*mvLXA)*((\text{Abs}\\(\text{DistScaleFactor}*mvLXA)+127)>>8)) \quad (8\text{-}136)$$

where td and tb may be derived as $$td=\text{Clip3}(-128,127,\text{PicOrderCntVal}-\text{PicOrderCnt}\\(\text{RefPicListB}[\text{refIdxB}])) \quad (8\text{-}137)$$

$$tb=\text{Clip3}(-128,127,\text{PicOrderCntVal}-\text{PicOrderCnt}\\(\text{RefPicListX}[\text{refIdxLX}])) \quad (8\text{-}138)$$

Video encoder 20 and video decoder 30 may be configured to implement a derivation process for temporal luma motion vector prediction, as disussed below. Inputs to this process may include a luma location (xP, yP) specifying the top-left luma sample of the current prediction unit relative to the top-left sample of the current picture, variables specifying the width and the height of the prediction unit for luma, nPSW and nPSH, and the reference index of the current prediction unit partition refIdxLX (with X being 0 or 1). Outputs of this process may include the motion vector prediction mvLXCol and the availability flag availableFlagLXCol.

The function RefPicOrderCnt(picX, refIdx, LX), in one example, returns the picture order count PicOrderCntVal of the reference picture with index refIdx from reference picture list LX of the picture picX, and may be specified as follows:

$$\text{RefPicOrderCnt}(picX,\text{refIdx},LX)=\text{PicOrderCnt}(\text{RefPi-}\\\text{cListX}[\text{refIdx}] \text{ of the picture picX}) \quad (8\text{-}141)$$

Depending on the values of slice_type, collocated_from_l0_flag, and collocated_ref_idx, video encoder 20 and video decoder 30 may derive the variable colPic, specifying the picture that contains the collocated partition, as follows:
  If slice_type is equal to B and collocated_from_l0_flag is equal to 0, the variable colPic specifies the picture that contains the collocated partition as specified by RefPicList1[collocated_ref_idx].
  Otherwise (slice_type is equal to B and collocated_from_l0_flag is equal to 1 or slice_type is equal to P), the variable colPic specifies the picture that contains the collocated partition as specified by RefPicList0[collocated_ref_idx].

Video encoder 20 and video decoder 30 may derive variable colPu and its position (xPCol, yPCol) using the following ordered steps:
1. The variable colPu is derived as follows $$yPRb=yP+nPSH \quad (8\text{-}139)$$

If (yP>>Log 2CtbSize) is equal to (yPRb>>Log 2CtbSize), the horizontal component of the right-bottom luma position of the current prediction unit is defined by $$xPRb=xP+nPSW \quad (8\text{-}140)$$

and the variable colPu is set as the prediction unit covering the modified position given by ((xPRb>>4)<<4, (yPRb>>4)<<4) inside the colPic.
  Otherwise ((yP>>Log 2CtbSize) is not equal to (yPRb>>Log 2CtbSize)), colPu is marked as "unavailable."

2. When colPu is coded in an intra prediction mode or colPu is marked as "unavailable," the following applies.
  Central luma position of the current prediction unit is defined by $$xPCtr=(xP+(nPSW>>1) \quad (8\text{-}141)$$

$$yPCtr=(yP+(nPSH>>1) \quad (8\text{-}142)$$

The variable colPu is set as the prediction unit covering the modified position given by ((xPCtr>>4)<<4, (yPCtr>>4)<<4) inside the colPic.
3. (xPCol, yPCol) is set equal to the top-left luma sample of the colPu relative to the top-left luma sample of the colPic.

The function LongTermRefPic(picX, refIdx, LX) may be defined as follows: if the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0.

Video encoder 20 and video decoder 30 may implement a modified version of the "AddPicID( )" function of HEVC. For example, video encoder 20 and video decoder 30 may implement AddPicId(picX, refIdx, LX) such that this function returns AddPicId(pic), wherein "pic" is the reference picture with index refIdx from reference picture list LX of the picture picX.

Video encoder 20 and video decoder 30 may derive variables mvLXCol and availableFlagLXCol as follows, where underlined text represents changes relative to HEVC WD7:
  If one or more of the following conditions are true, both components of mvLXCol are set equal to 0 and availableFlagLXCol is set equal to 0.
    colPu is coded in an intra prediction mode.
    colPu is marked as "unavailable."
    pic_temporal_mvp_enable_flag is equal to 0.
  Otherwise, the motion vector mvCol, the reference index refIdxCol, and the reference list identifier listCol are derived as follows.
    If PredFlagL0[xPCol][yPCol] is equal to 0, mvCol, refIdxCol, and listCol are set equal to MyL1[xPCol][yPCol], RefIdxL1[xPCol][yPCol], and L1, respectively.
    Otherwise (PredFlagL0[xPCol][yPCol] is equal to 1), the following applies.
      If PredFlagL1[xPCol][yPCol] is equal to 0, mvCol, refIdxCol, and listCol are set equal to MvL0[xPCol][yPCol], RefIdxL0[xPCol][yPCol], and L0, respectively.
      Otherwise (PredFlagL1[xPCol][yPCol] is equal to 1), the following assignments are made.
        If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
        Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

If one of the following conditions is true, the variable availableFlagLXCol is set equal to 0.

AddPicId(RefPicListX[refIdxLX]) is not equal to AddPicId(colPic, refIdxCol, listCol);

RefPicListX[refIdxLX] is a short-term reference picture and LongTermRefPic(colPic, refIdxCol, listCol) is equal to 1;

RefPicListX[refIdxLX] is a long-term reference picture and LongTermRefPic(colPic, refIdxCol, listCol) is equal to 0;

Otherwise, the variable availableFlagLXCol is set equal to 1, and the following applies.

If RefPicListX[refIdxLX] is a long-term reference picture, or LongTermRefPic(colPic, refIdxCol, listCol) is equal to 1, or PicOrderCnt(colPic)−RefPicOrderCnt(colPic, refIdxCol, listCol) is equal to PicOrderCntVal−PicOrderCnt(RefPicListX[refIdxLX]), $$mvLXCol=mvCol \qquad (8\text{-}143)$$

Otherwise, mvLXCol is derived as scaled version of the motion vector mvCol as specified below $$tx=(16384+(Abs(td)>>1))/td \qquad (8\text{-}144)$$

$$DistScaleFactor=Clip3(-4096,4095,(tb*tx+32)>>6) \qquad (8\text{-}145)$$

$$mvLXCol=Clip3(-8192,8191.75,Sign(DistScaleFactor*mvCol)*((Abs(DistScaleFactor*mvCol)+127)>>8)) \qquad (8\text{-}146)$$

where td and tb may be derived as $$td=Clip3(-128,127,PicOrderCnt(colPic)-RefPicOrderCnt(colPic,refIdxCol,listCol)) \qquad (8\text{-}147)$$

$$tb=Clip3(-128,127,PicOrderCntVal-PicOrderCnt(RefPicListX[refIdxLX])) \qquad (8\text{-}148)$$

Video encoder 20 and video decoder 30 may be configured to perform a derivation process for combined bi-predictive merging candidates. Inputs of this process may include a merging candidate list mergeCandList, reference indices refIdxL0N and refIdxL1N of every candidate N being in mergeCandList, prediction list utilization flags predFlagL0N and predFlagL1N of every candidate N being in mergeCandList, motion vectors mvL0N and mvL1N of every candidate N being in mergeCandList, the number of elements numMergeCand within mergeCandList, and the number of elements numOrigMergeCand within the mergeCandList after the spatial and temporal merge candidate derivation process. Outputs of this process may include the merging candidate list mergeCandList, the number of elements numMergeCand within mergeCandList, reference indices refIdxL0combCandk and refIdxL1combCandk of every new candidate combCandk being added in mergeCandList during the invokation of this process, prediction list utilization flags predFlagL0combCandk and predFlagL1combCandk of every new candidate combCandk being added in mergeCandList during the invokation of this process, and motion vectors mvL0combCandk and mvL1combCandk of every new candidate combCandk being added in mergeCandList during the invokation of this process.

This process may be defined as follows, where underlined text represents changes relative to HEVC WD7 and ellipses represent text that is the same as HEVC WD7. When numOrigMergeCand is greater than 1 and less than MaxNumMergeCand, the variable numInputMergeCand may be set to numMergeCand, the variables combIdx and combCnt may be set to 0, the variable combStop may be set to FALSE and the following steps may be repeated until combStop is equal to TRUE:

1. The variables l0CandIdx and l1CandIdx are derived using combIdx as specified in Table 8-8.
2. The following assignments are made with l0Cand being the candidate at position l0CandIdx and l1Cand being the candidate at position l1CandIdx in the merging candidate list mergeCandList (l0Cand=mergeCandList[l0CandIdx], l1Cand=mergeCandList[l1CandIdx]).
3. When all of the following conditions are true,
predFlagL0l0Cand==1
predFlagL1l1Cand==1
AddPicId(RefPicListL0[refIdxL0l0Cand])!=AddPicId(RefPicListL1[refIdxL1l1Cand])|| PicOrderCnt(RefPicList0[refIdxL0l0Cand])!=PicOrderCnt(RefPicList1[refIdxL1l1Cand])|| mvL0l0Cand !=mvL1l1Cand the following applies.

. . .

4. . . .

5. . . .

In some examples, prediction between two motion vectors referring to two different long-term reference pictures may be disabled. In other examples, prediction between two motion vectors referring to two different inter-view reference pictures may be disabled.

In this manner, video encoder 20 and video decoder 30 represent examples of a video coder configured to code a picture order count (POC) value for a first picture of video data, code a second-dimension picture identifier for the first picture, and code a second picture based at least in part on the POC value and the second-dimension picture identifier of the first picture. Coding the second picture based on the POC value and the second-dimension picture identifier of the first picture may include identifying the first picture using both the POC value of the first picture and the second-dimension picture identifier.

Moreover, as shown above, coding the second picture may include enabling or disabling motion vector prediction for a motion vector that refers to the first picture, based on the POC value and the second-dimension picture identifier of the first picture and a POC value and a second-dimension picture identifier of a reference picture to which a candidate motion vector predictor refers. For example, if the second-dimension picture identifier of the first picture indicates that the first picture is a short-term picture, and the second-dimension picture identifier of the reference picture indicates that the reference picture is a long-term reference picture, video encoder 20 and video decoder 30 may disable motion vector prediction between a motion vector referring to the first picture and a motion vector referring to the reference picture.

Furthermore, as also shown above, coding the second picture may include coding a motion vector of a block of the second picture that refers to the first picture, as noted above. Such coding may be based on the POC value of the first picture in that, if a motion vector predictor refers to a reference picture having a different POC value, video encoder 20 and video decoder 30 may be configured to scale the motion vector predictor based on POC value differences between the first and second picture, and the reference picture and the second picture.

Video encoder 20 and video decoder 30 may be configured to perform the techniques of any or all of the examples described above, alone or in any combination. Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone or tablet computer.

Figure 2:
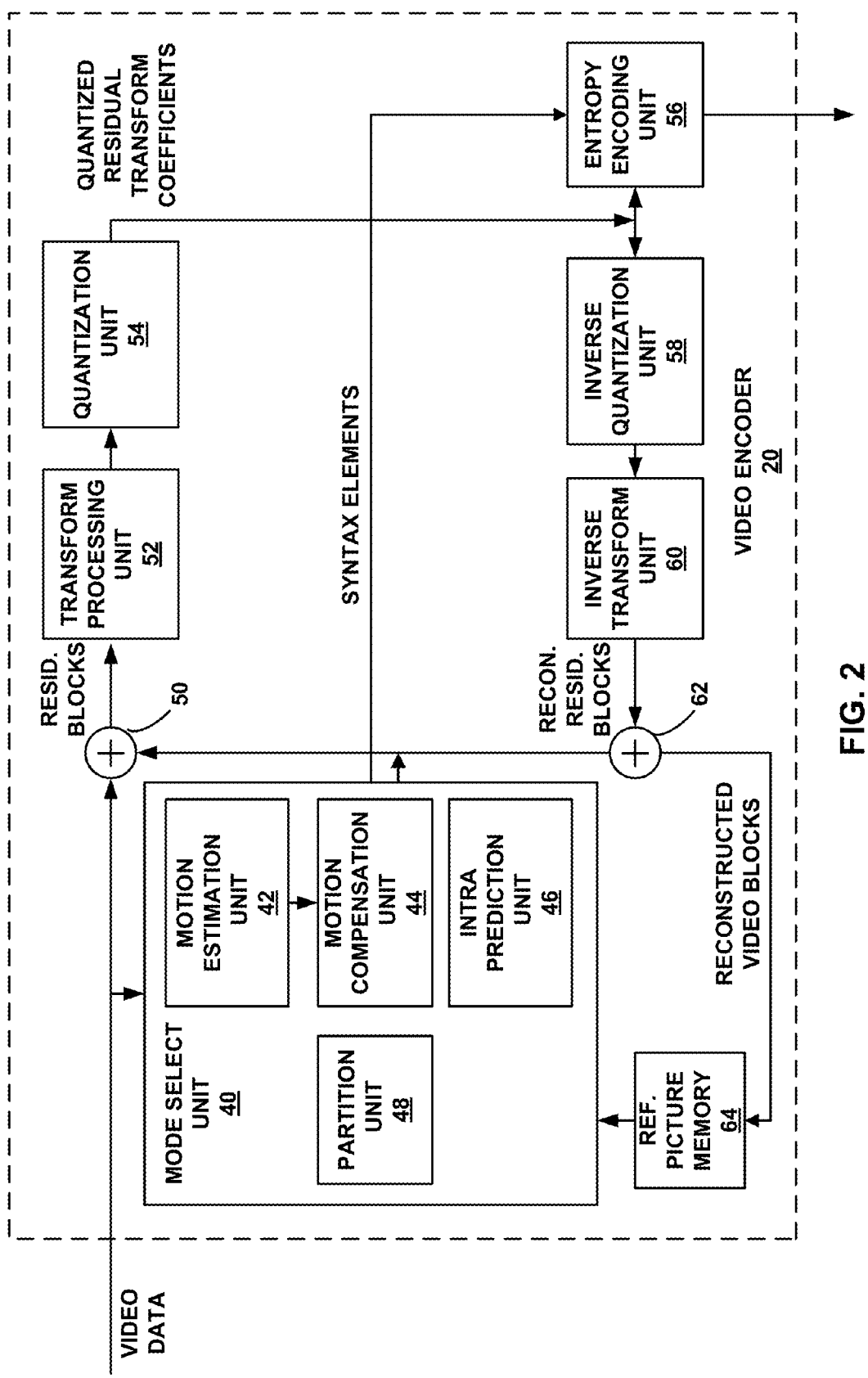
FIG. 2 is a block diagram illustrating an example of a video encoder that may implement techniques for coding video data according to a high-level syntax only extension of a video coding standard.

FIG. 2 is a block diagram illustrating an example of video encoder 20 that may implement techniques for coding video data according to a high-level syntax only extension of a video coding standard. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Motion compensation unit 44 may code a motion vector in accordance with the techniques of this disclosure, e.g., during advanced motion vector prediction (AMVP), temporal motion vector prediction (TMVP), or merge mode coding. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 may be configured to perform any or all of the various example techniques discussed with respect to FIG. 1, alone or in any combination. For example, in accordance with the techniques of this disclosure, video encoder 20 may encode a picture based on a picture order count (POC) value of a reference picture and a second-dimension identifier of the reference picture. That is, video encoder 20 may encode a POC value of a first picture (a reference picture, in this example), as well as a second-dimension picture identifier for the first picture. The second dimension picture identifier may comprise, for example, a view identifier for a view including the first picture, a view order index for the view including the first picture, a combination of the view order index and a depth flag, a layer identifier for a scalable video coding (SVC) layer including the first picture, and a generic layer identifier.

The second-dimension identifier may, additionally or alternatively, comprise a value indicating whether the first picture is a long-term reference picture or a short-term reference picture. Alternatively, a separate value may indicate whether the first picture is a long-term or short-term reference picture, in addition to the POC value and the second-dimension picture identifier. In some examples, long-term and short-term indications for reference pictures may indicate whether the reference pictures are temporal reference pictures or inter-view reference pictures. For example, a long-term reference picture may correspond to a temporal reference picture (that is, a reference picture in the same layer or view), whereas a short-term reference picture may correspond to an inter-view reference picture. As another example, a long-term reference picture may correspond to an inter-view reference picture, whereas a short-term reference picture may correspond to a temporal reference picture.

Likewise, video encoder 20 may disable motion vector prediction between motion vectors of different types. "Types" of motion vectors may include, for example, temporal motion vectors, which refer to temporal reference pictures (that is, pictures in the same view as a current picture being encoded), and disparity motion vectors, which refer to inter-view reference pictures (that is, pictures in a view other than the view including the current picture). Typically, inter-view reference pictures have the same POC value as the current picture. That is, typically, the inter-view reference pictures and the current picture occur in the same access unit. Video encoder 20 may disable motion vector prediction between motion vectors of different types. That is, if a current motion vector of the current picture is a temporal motion vector, video encoder 20 may disable motion vector prediction relative to a disparity motion vector. Likewise, if the current motion vector is a disparity motion vector, video encoder 20 may disable motion vector prediction relative to a temporal motion vector. Video encoder 20 may otherwise encode the current motion vector using a motion vector coding process, such as advanced motion vector prediction (AMVP) or merge mode.

In some examples, video encoder 20 may be configured to code a value indicating whether the first picture (e.g., a view component, in multiview video coding) is a long-term reference picture basd at least in part on whether the first picture is used for inter-view prediction. For example, video encoder 20 may encode a syntax element indicating whether the first picture is a long-term or short-term reference picture in a sequence parameter set (SPS) corresponding to a sequence including the first picture.

In addition, or in the alternative, video encoder 20 may be configured to mark inter-view reference pictures as long-term reference pictures, at least temporarily. Video encoder 20 may further store current statuses of the inter-view reference pictures, where the statuses may comprise one of long-term reference picture, short-term reference picture, and unused for reference. Thus, if the first picture comprises an inter-view picture, video encoder 20 may mark the first picture as a long-term reference picture. After coding a second picture relative to the first picture, video encoder 20 may restore a status for the inter-view reference picture based on the stored status.

Additionally or alternatively, video encoder 20 may temporarily assign new POC values to inter-view reference pictures while encoding the second picture. For example, video encoder 20 may determine a set of POC values for current temporal refenrece pictures and assign unused POC values to the inter-view reference pictures. Video encoder 20 may also store respective current POC values for each inter-view reference picture. After encoding the second picture, video encoder 20 may restore the stored (that is, original) POC values for the inter-view reference pictures. Because the inter-view reference pictures are typically in the same access unit as the second picture (that is, the picture currently being encoded), in some examples, video encoder 20 may instead simply set the POC values for the inter-view reference pictures equal to the POC value of the second picture, that is, the current picture being encoded, such that storing the POC values is not necessary.

In this manner, video encoder 20 of FIG. 2 represents an example of a video encoder configured to encode a picture order count (POC) value for a first picture of video data, encode a second-dimension picture identifier for the first picture, and encode, in accordance with a base video coding specification, a second picture based at least in part on the POC value and the second-dimension picture identifier of the first picture. The base video coding specification may comprise HEVC. In addition, video encoder 20 may be configured to encode a picture in accordance with an extension of the base video coding specification, e.g., an SVC or MVC extension of HEVC. Thus, video encoder 20 also represents an example of a video encoder configured to encode a picture order count (POC) value for a first picture of video data, encode a second-dimension picture identifier for the first picture, and encode, in accordance with an extension of a base video coding specification, a second picture based at least in part on the POC value and the second-dimension picture identifier of the first picture.

Figure 3:
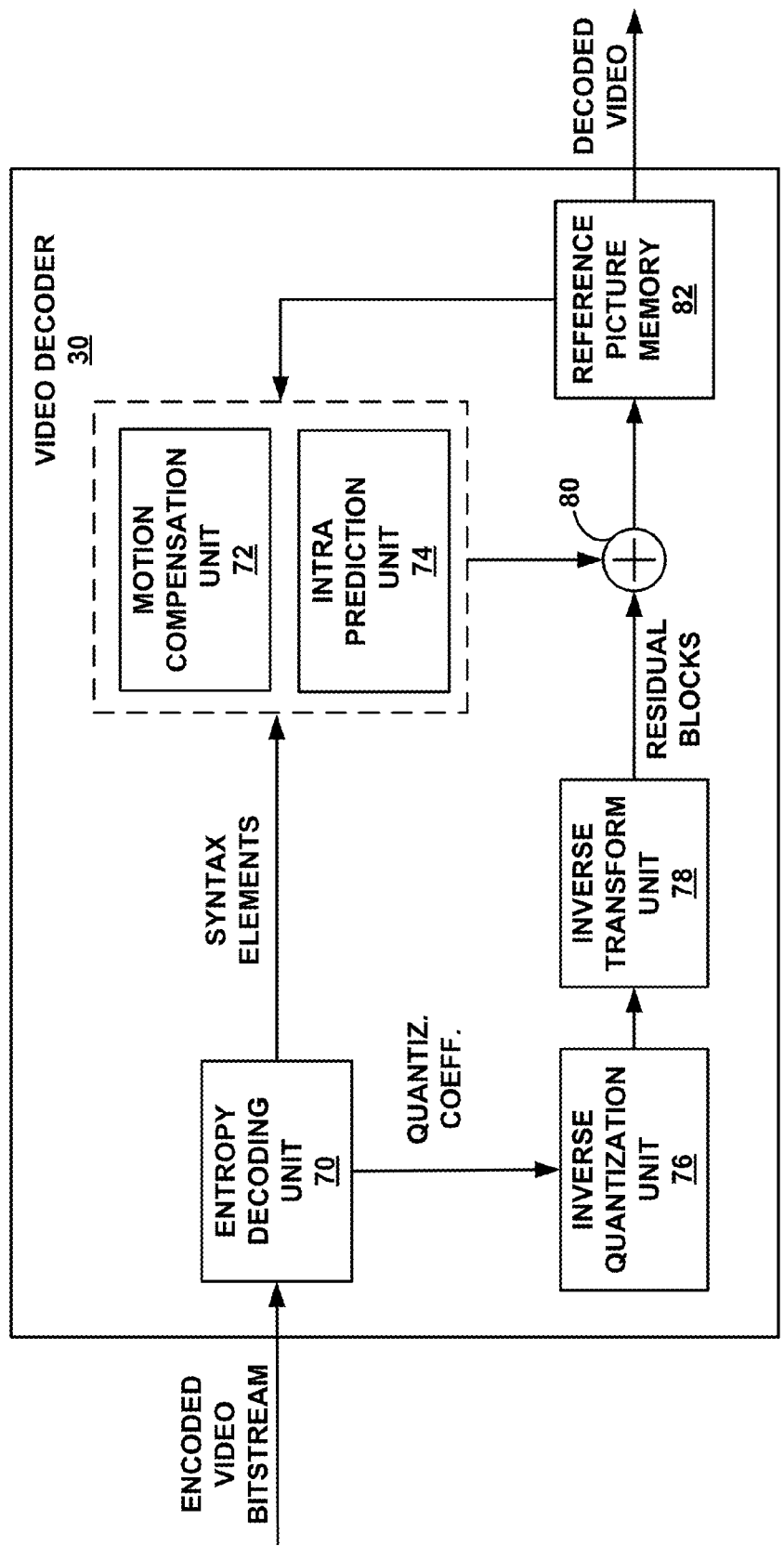
FIG. 3 is a block diagram illustrating an example of a video decoder that may implement techniques for coding video data according to a high-level syntax only extension of a video coding standard.

FIG. 3 is a block diagram illustrating an example of video decoder 30 that may implement techniques for coding video data according to a high-level syntax only extension of a video coding standard. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

In accordance with the techniques of this disclosure, entropy decoding unit 70 may decode entropy encoded data representative of motion information for a current block of a current picture. For example, in accordance with AMVP, entropy decoding unit 70 may decode motion vector difference (MVD) values for the current block. Motion compensation unit 72 (or another unit of video decoder 30, such as entropy decoding unit 70) may reconstruct the motion vector for the current block using the entropy decoded motion information, such as the MVD values. For example, motion compensation unit 72 may determine a set of available motion vector predictors for the current motion vector, e.g., based on whether the current motion vector refers to a long-term reference picture or a short-term reference picture (or a temporal or inter-view reference picture), and whether a set of candidate reference pictures also refer to long- or short-term reference pictures (or temporal or inter-view reference pictures).

As discussed above, motion compensation unit 72 may determine that candidate motion vector predictors of different types are not available for use to predict a current motion vector. For example, when the current motion vector is a temporal motion vector, motion compensation unit 72 may determine that disparity motion vectors are unavailable for use as motion vector predictors for the current motion vector. Likewise, when the current motion vector is a disparity motion vector, motion compensation unit 72 may determine that temporal motion vectors are unavailable for use as motion vector predictors for the current motion vector. In some examples, motion compensation unit 72 may disable motion vector prediction between long-term and short-term reference pictures as well, or in the alternative.

In the case that the current motion vector is a disparity motion vector, motion compensation unit 72 may also avoid scaling a motion vector predictor (which may, likewise, correspond to a disparity motion vector as well). In addition, or in the alternative, motion compensation unit 72 may assign a temporary POC value to an inter-view reference picture to which a disparity motion vector predictor refers during motion vector prediction of a disparity motion vector.

In any case, motion compensation unit 72, or another element of video decoder 30, may reproduce a motion vector for a current block, e.g., using AMVP or merge mode. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. Motion compensation unit 72 may code a motion vector in accordance with the techniques of this disclosure, e.g., during advanced motion vector prediction (AMVP), temporal motion vector prediction (TMVP), or merge mode coding.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to decode a picture order count (POC) value for a first picture of video data, decode a second-dimension picture identifier for the first picture, and decode a second picture based at least in part on the POC value and the second-dimension picture identifier of the first picture. The base video coding specification may comprise HEVC. In addition, video decoder 30 may be configured to encode a picture in accordance with an extension of the base video coding specification, e.g., an SVC or MVC extension of HEVC. Thus, video decoder 30 also represents an example of a video decoder configured to decode a picture order count (POC) value for a first picture of video data, decode a second-dimension picture identifier for the first picture, and decode, in accordance with an extension of a base video coding specification, a second picture based at least in part on the POC value and the second-dimension picture identifier of the first picture.

Figure 4:
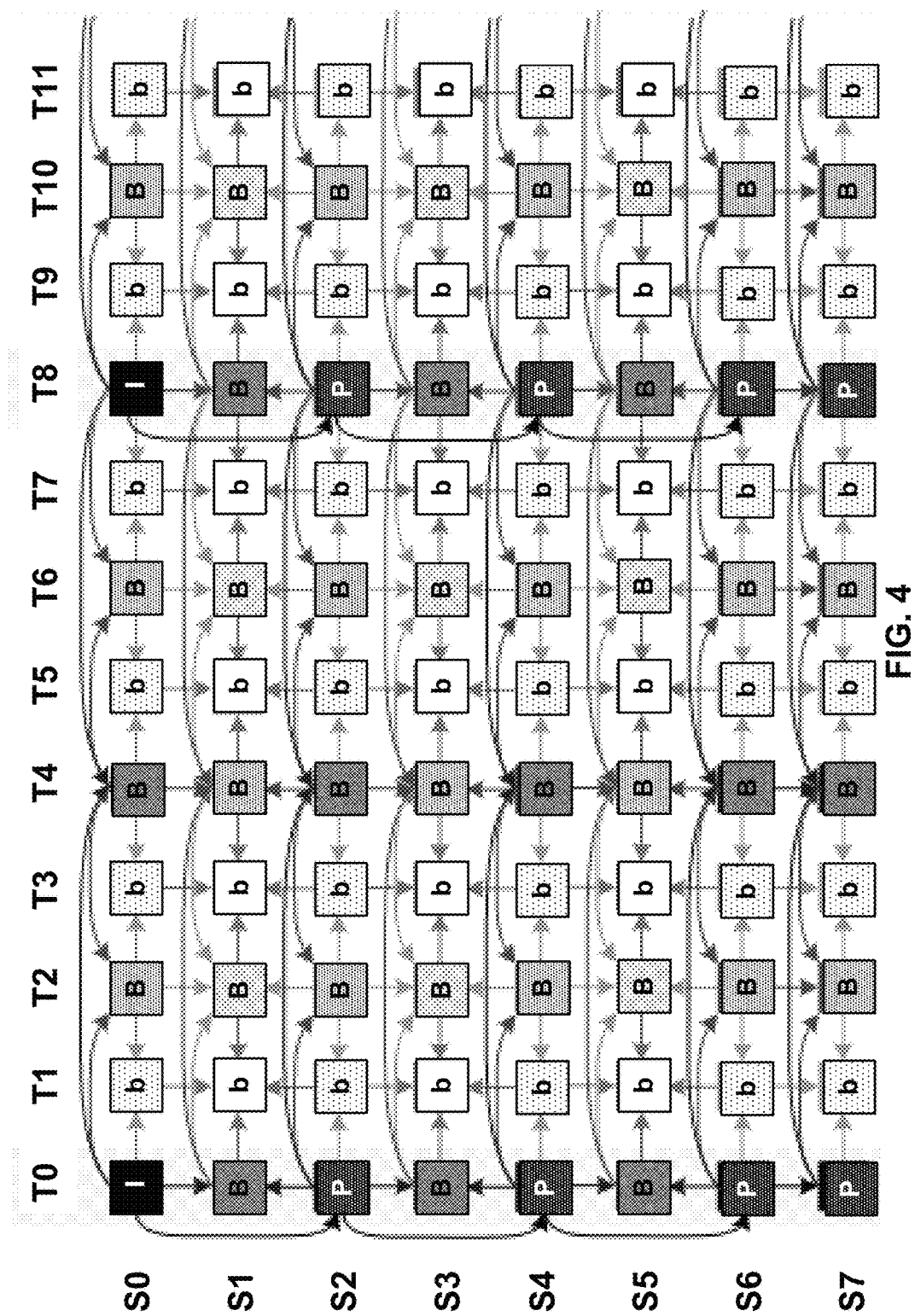
FIG. 4 is a conceptual diagram illustrating an example MVC prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order arrangement is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames, i.e., pictures, in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multiview video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So, a rendering device with an MVC decoder may expect 3D video contents with more than two views.

In MVC, inter-view prediction (IVP) is allowed among pictures in the same access unit (that is, with the same time instance). An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but within the same time instance (e.g., having the same POC value, and thus, in the same access unit). An inter-view prediction reference picture may be put in any position of a reference picture list, just like any inter prediction reference picture.

Typically, a reference picture list construction for the first or the second reference picture list of a B picture includes two steps: reference picture list initialization and reference picture list reordering (modification). The reference picture list initialization is an explicit mechanism according to which a video coder places the reference pictures in the reference picture memory (also known as a decoded picture buffer) into a list based on the order of POC (Picture Order Count, aligned with display order of a picture) values.

The video coder may use the reference picture list reordering mechanism to modify the position of a picture that was put in the list during the reference picture list initialization to any new position, or put any reference picture in the reference picture memory in any position even the picture does not belong to the initialized list. Some pictures after the reference picture list reordering (modification) may be put in a further position in the list. However, if a position of a picture exceeds the number of active reference pictures of the list, the picture is not considered as an entry of the final reference picture list. The number of active reference pictures may be signaled in the slice header for each list. After reference picture lists are constructed (e.g., RefPicList0 and RefPicList1, if available), a reference index to a reference picture list can be used to identify any reference picture included in the reference picture list.

To get a Temporal Motion Vector Predictor (TMVP), firstly a co-located picture is to be identified. If the current picture is a B slice, a collocated_from_10_flag is signalled in the slice header to indicate whether the co-located picture is from RefPicList0 or RefPicList1. After a reference picture list is identified, collocated_ref_idx, signalled in the slice header, is used to identify the picture in the picture in the list. A co-located PU is then identified by checking the co-located picture. Either the motion of the right-bottom PU of the CU containing this PU, or the motion of the right-bottom PU within the center PUs of the CU containing this PU, is used. When motion vectors identified by the above process are used to generate a motion candidate for AMVP or merge mode, they need to be scaled based on the temporal location (reflected by POC).

In HEVC, the sequence parameter set (SPS) includes a flag sps_temporal_mvp_enable_flag and the slice header includes a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

Currently, the Moving Pictures Experts Group (MPEG) is developing a 3DV standard based on HEVC, for which part of the standardization efforts also includes the standardization of the multiview video codec based on HEVC. Similarly, in HEVC based 3DV, inter-view prediction based on the reconstructed view components from different views is enabled.

AVC was extended by a multiview extension in a way that the extension actually fulfills the "HLS-only" (high-level syntax only) requirement. The "HLS-only" requirement guarantees there is only high-level syntax (HLS) changes in the Multiview Video Coding (MVC), such that no module in the macroblock level in AVC needs to be re-designed and can be fully reused for MVC. It is possible that the "HLS-only" requirement may be fulfilled for an MVC/3DV extension of HEVC, and also for Scalable Video Coding (SVC) extension of HEVC, if multi-loop decoding is considered as acceptable.

To enable inter-view prediction, HLS changes may be made for the following purpose: picture identification, where reference picture list construction and marking need to be able to identify a picture in a specific view.

The HLS changes are not sufficient to fulfill the "HLS-only" requirement in H.264/MVC, as other constraints, assumptions are made, so that the low-level coding modules will never encounter a situation of, e.g., handling zero motion related scaling. Such constraints, modifications, and assumptions are:

Disabling temporal direct mode if a co-located picture is an inter-view (only) reference picture Considering an inter-view (only) reference picture as not a short-term: related to spatial direct Disabling implicit weighted prediction To fulfil the "HLS-only" requirement, such modifications in an extension must only be in the high-level syntax. Thus, there should be no modifications for syntax elements under slice header, and no CU level decoding process changes for the extension specification; for example, the motion vector prediction of the HEVC extension specification should be exactly the same as that in the HEVC base specification. The HLS changes are normative decoder changes of the extension specification; however, from the base specification point of view, such changes do not necessarily need to be known and can be informative.

To enable functionalities such as efficient inter-view prediction, both modifications in the HEVC extension and base specifications may be implemented. The base specification changes that do not impact the typical decoding processes or coding efficiency of the base HEVC decoders, but target enabling functionalities in the extension specification, are called hooks. In most cases, a "HLS-only" requirement is fulfilled with both hooks in the base specification and HLS changes in the extension specification. If the hooks in base specifications are not defined well, certain desired functionality might not be enabled in the extension specification or may need a lot of modifications in the extension specification.

In HLS-only SVC, a base layer representation, possibly after upsampling and/or filtering, may be put into the reference picture list of the current picture of the current layer. Such a picture is called an inter-layer reference picture.

Various modifications in both the base specification and the extension specification of an HLS-only HEVC modification may be made. Given a certain desired functionality, in a stage that the designs of both base and extension specifications can be modified, it is a question of trade-off between the base specification modification and extension specification modification.

Figure 5:
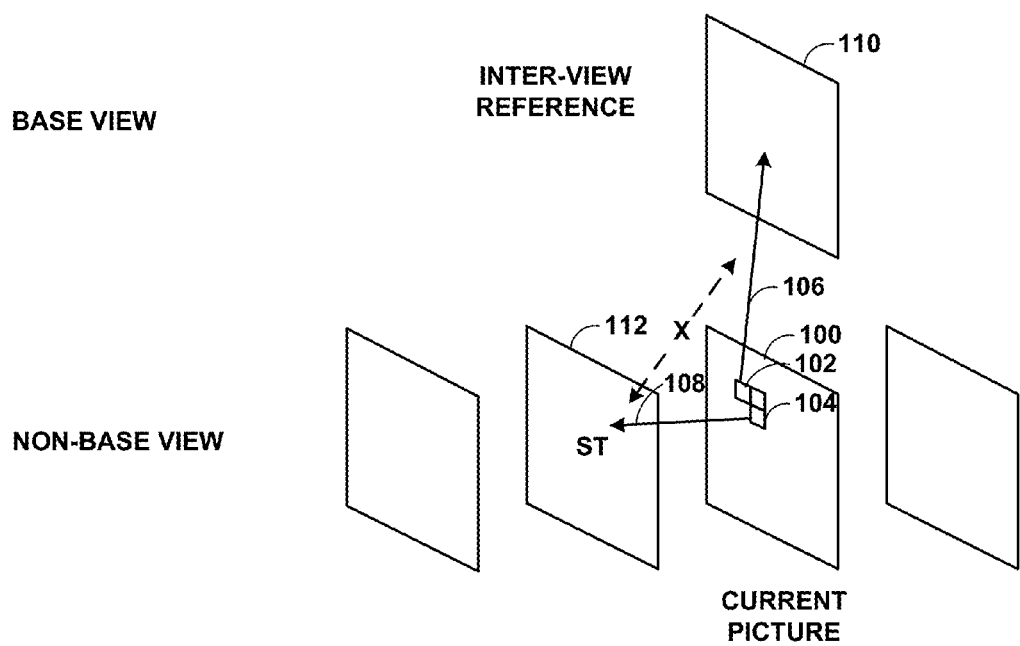
FIGS. 5-9 are conceptual diagrams illustrating potential problems that should be overcome to achieve a high-level syntax only HEVC extension.

FIGS. 5-9 are conceptual diagrams illustrating potential problems that should be overcome to achieve an HLS-only HEVC extension. FIG. 5, for example, illustrates an example in which a current picture 100 includes blocks, such as blocks 102 and 104, predicted using various prediction techniques. Specifically, current picture 100 corresponds to a picture of a non-base view, while an inter-view reference picture 110 is a picture of a base view. Block 102 of current picture 100 is inter-view predicted relative to inter-view reference picture 110 (using disparity motion vector 106), while block 104 is predicted using inter-prediction relative to short term (ST) reference picture 112 of the same non-base view (using temporal motion vector 108). FIG. 5 therefore illustrates an example in which a current picture includes neighboring blocks with both a temporal motion vector (temporal motion vector 108) and an inter-view motion vector (also referred to as a disparity motion vector, namely, disparity motion vector 106).

This disclosure recognizes that, in some examples, a disparity motion vector shall not be scaled to predict a temporal motion vector. In addition, this disclosure also recognizes that, in some examples, a temporal motion vector shall not be scaled to predict a disparity motion vector. This disclosure also recognizes that it should be possible to disable predicting a disparity motion vector from a temporal short-term motion vector, e.g., during AMVP, and to disable prediction of a temporal motion vector from a disparity motion vector. Disparity motion vectors typically correspond to the local disparity of the same object in different views. However, temporal motion vectors typically correspond to the motion of an object. In HTM, which is the 3DV reference software, the prediction between motion vectors of the above two categories is disabled.

Figure 6:
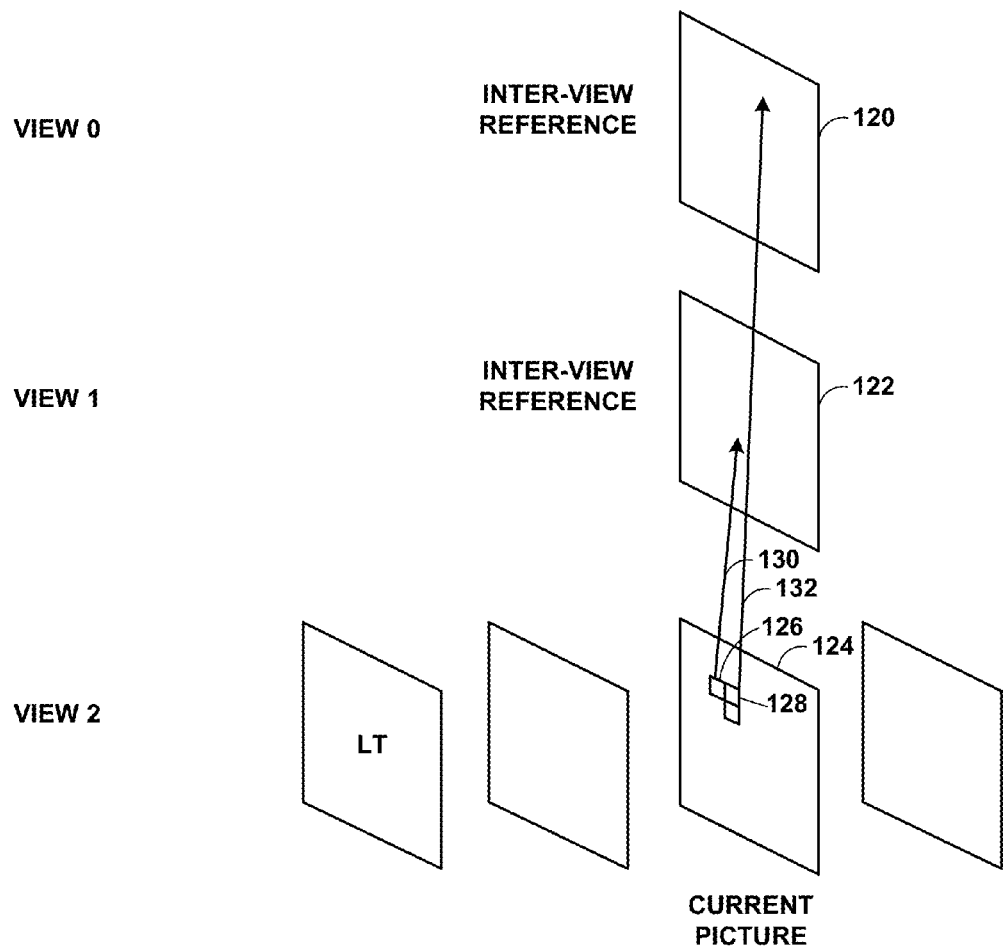

FIG. 6 illustrates an example in which a current picture includes blocks predicted using inter-view reference pictures of different views. Specifically, in this example, inter-view reference picture 120 is in view 0, and inter-view reference picture 122 is in view 1. Current picture 124 is in view 2. Current picture 124 includes blocks 126, 128 predicted, using inter-view prediction, from both inter-view reference picture 120 of view 0 and inter-view reference picture 122 of view 1. Specifically, in this example, block 126 is predicted from inter-view reference picture 122, while block 128 is predicted from inter-view reference picture 120.

Blocks 126 and 128 are predicted using different disparity motion vectors. That is, block 126 is predicted using disparity motion vector 130, which refers to a portion of inter-view reference picture 122, while block 128 is predicted using disparity motion vector 132, which refers to a portion of inter-view reference picture 120. Accordingly, FIG. 6 represents an example in which a current picture includes neighboring blocks with inter-view motion vectors that refer to inter-view reference pictures of different views.

This disclosure recognizes that it should be possible to identify whether two disparity motion vectors correspond to the same reference picture. When an entry in RefPicList0 and an entry in RefPicList1 are both inter-view reference pictures, it should be possible, during AMVP, to identify whether these two reference pictures are the same. When a RefPicListX (where 'X' may represent a value of 0 or 1, for example) contains two entries that are inter-view reference pictures, it should be possible, during AMVP, to identify whether these two reference pictures are the same. Furthermore, two entries with the same POC value might not be identical, e.g., when the two entries correspond to different views, as shown in FIG. 6.

Figure 7:
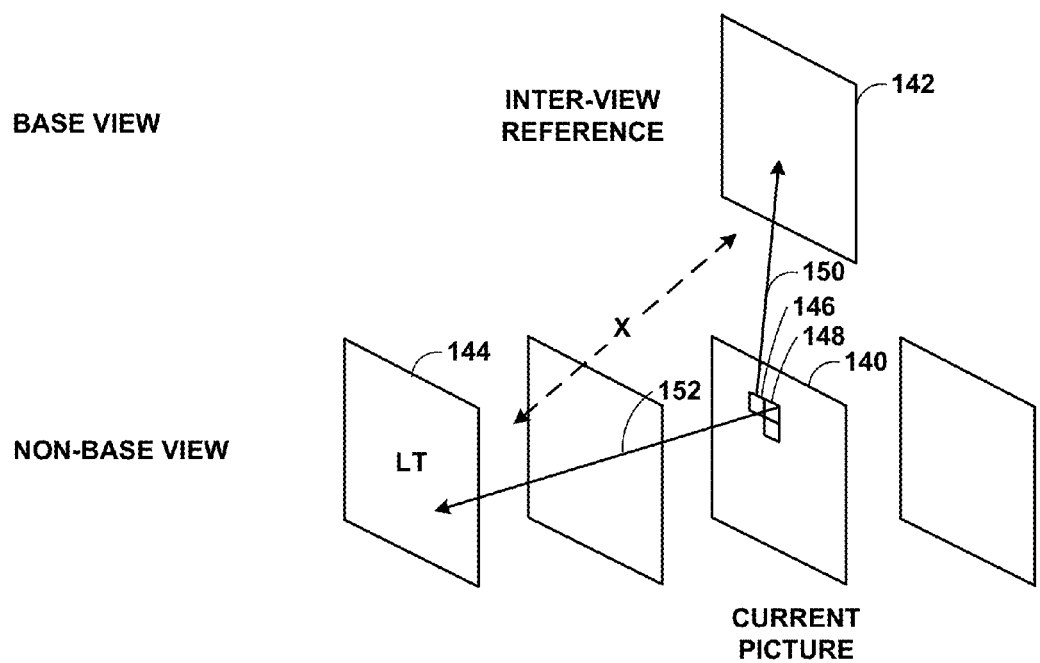

FIG. 7 illustrates an example in which a current picture in a non-base view includes blocks predicted both using inter-view prediction relative to an inter-view reference picture in a base view and using inter-prediction relative to a long-term (LT) reference picture in the non-base view. That is, FIG. 7 illustrates an example in which current picture 140 includes neighboring blocks 146, 148 with both temporal motion vector 152 (referring to long-term reference picture 144) and inter-view motion vector 150 (referring to inter-view reference picture 142). Inter-view motion vector 150 may also be referred to as "disparity motion vector 150." This disclosure recognizes that it should be possible to disable predicting a disparity motion vector, such as disparity motion vector 150, from a temporal long-term motion vector, such as temporal motion vector 152, and to disable predicting a temporal long-term motion vector from a disparity motion vector.

Figure 8:
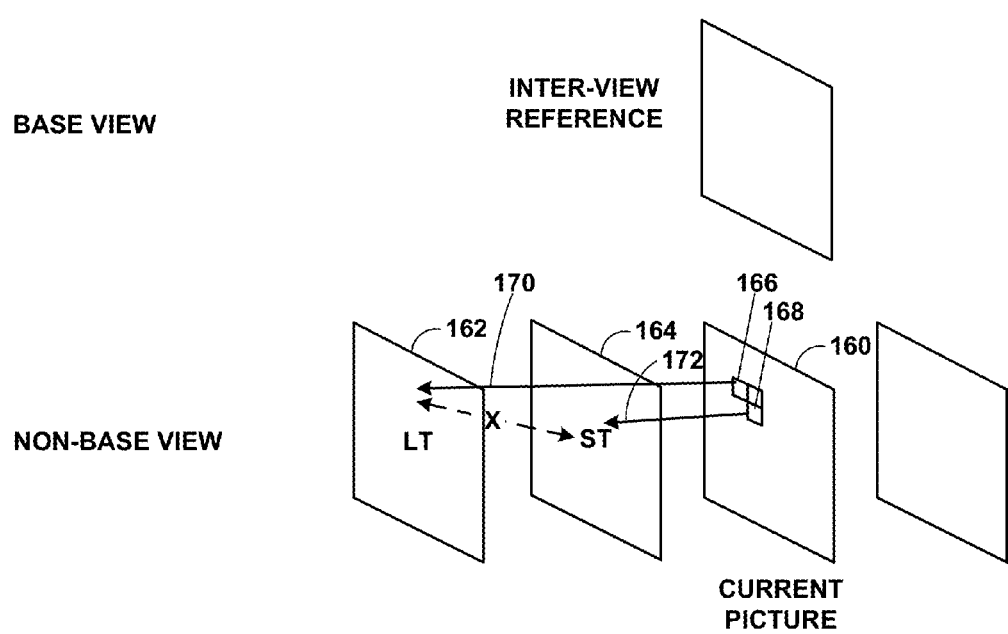

FIG. 8 illustrates an example in which a current picture in a non-base view includes blocks that are predicted using inter-prediction, both from a long-term (LT) reference picture and a short-term (ST) reference picture, of the non-base view. That is, FIG. 8 illustrates an example in which current picture 160 includes neighboring blocks 166, 168 with both temporal long-term and short-term motion vectors. Specifically, block 166 is predicted using temporal motion vector 170, which refers to long-term reference picture 162, while block 168 is predicted using temporal motion vector 172, which refers to short-term reference picture 164. Therefore, temporal motion vector 170 may be referred to as a long-term motion vector or a long-term temporal motion vector, while temporal motion vector 172 may be referred to as a short-term motion vector or a short-term temporal motion vector. This disclosure recognizes that it should be possible to disable predicting between temporal short-term motion vectors and temporal long-term motion vectors, e.g., during AMVP.

Figure 9:
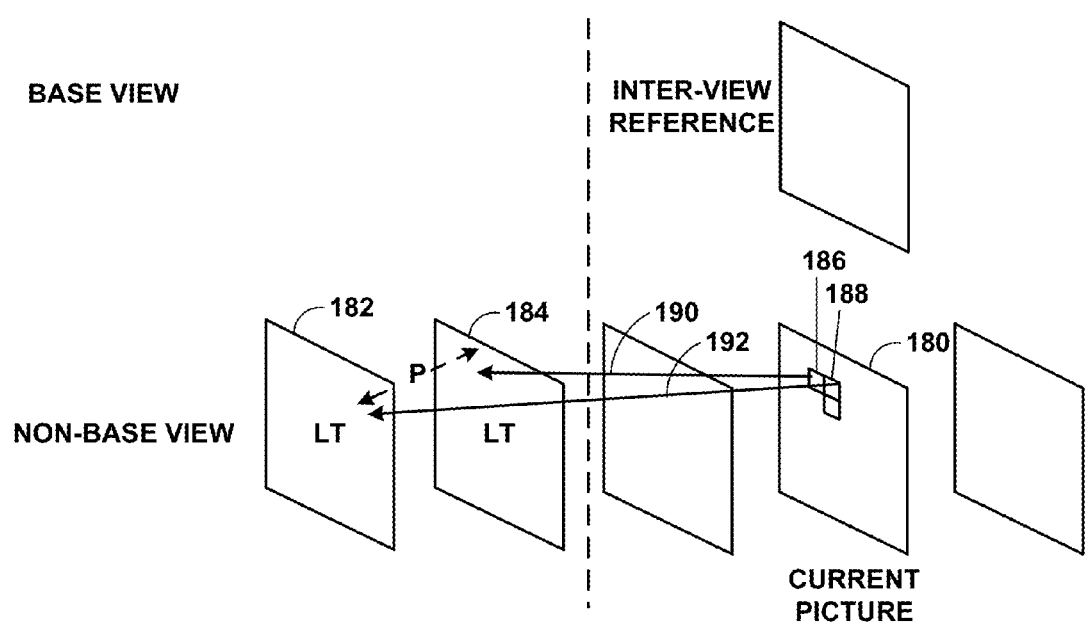

FIG. 9 illustrates an example in which a current picture in a non-base view includes blocks that are predicted using inter-prediction, where the blocks are predicted relative to different long-term (LT) reference pictures of the non-base view. That is, FIG. 9 illustrates an example in which current picture 180 includes neighboring blocks 186, 188 with temporal motion vectors 190, 192 referring to long-term pictures 184, 182, respectively. Specifically, in this example, block 186 is predicted using temporal motion vector 190, which refers to a portion of long-term reference picture 184, while block 188 is predicted using temporal motion vector 192, which refers to a portion of long-term reference picture 182. This disclosure recognizes that it should be possible to enable and/or disable predicting temporal long-term motion vectors during AMVP.

FIG. 10 is a conceptual diagram illustrating an example set of neighboring blocks to a current block. In particular, in this example, the current block has left-neighboring blocks labeled A0 and A1 and above-neighboring blocks B0, B1, and B2. The current block may be coded using inter-prediction, e.g., temporal prediction or inter-view prediction. Thus, a video coder, such as video encoder 20 or video decoder 30, may code the current block using a motion vector. Moreover, the video coder may code the motion vector. In various examples, the video coder may code the motion vector for the current block using techniques described above, e.g., for advanced motion vector prediction (AMVP), temporal motion vector prediction (TMVP), or merge mode. A TMVP predictor may correspond to a motion vector for a block that is co-located with the current block in a previously coded picture.

Motion vectors of one or more of neighboring blocks A0, A1, B0, B1, and B2 may be of different types than the motion vector used to code the current block. For example, the current block may be coded using a long-term motion vector, while one or more of blocks A0, A1, B0, B1, and B2 may be coded using a short-term motion vector. As another example, the current block may be coded using a short-term motion vector, while one or more of blocks A0, A1, B0, B1, and B2 may be coded using a long-term motion vector. As yet another example, the current block may be coded using a disparity motion vector, while one or more of blocks A0, A1, B0, B1, and B2 may be coded using a temporal motion vector. As still another example, the current block may be coded using a temporal motion vector, while one or more of blocks A0, A1, B0, B1, and B2 may be coded using a disparity motion vector. In such cases, as explained above, a video coder, such as video encoder 20 or video decoder 30, may disable motion vector prediction between motion vectors of different types.

The example of FIG. 10 illustrates spatial motion vector predictor candidates. However, it should be understood that temporal motion vector predictor candidates may also be considered for temporal motion vector prediction (TMVP). Such TMVP candidates may correspond to motion information for co-located blocks in previously coded pictures, that is, blocks that are co-located with the block labeled "current block" in FIG. 10. In addition, in accordance with the techniques of this disclosure, a TMVP candidate may be considered as unavailable for use as a motion vector predictor when the motion information of the TMVP candidate and the motion vector for the current block point to pictures of different types, e.g., short-term and long-term reference pictures.

Figure 11:
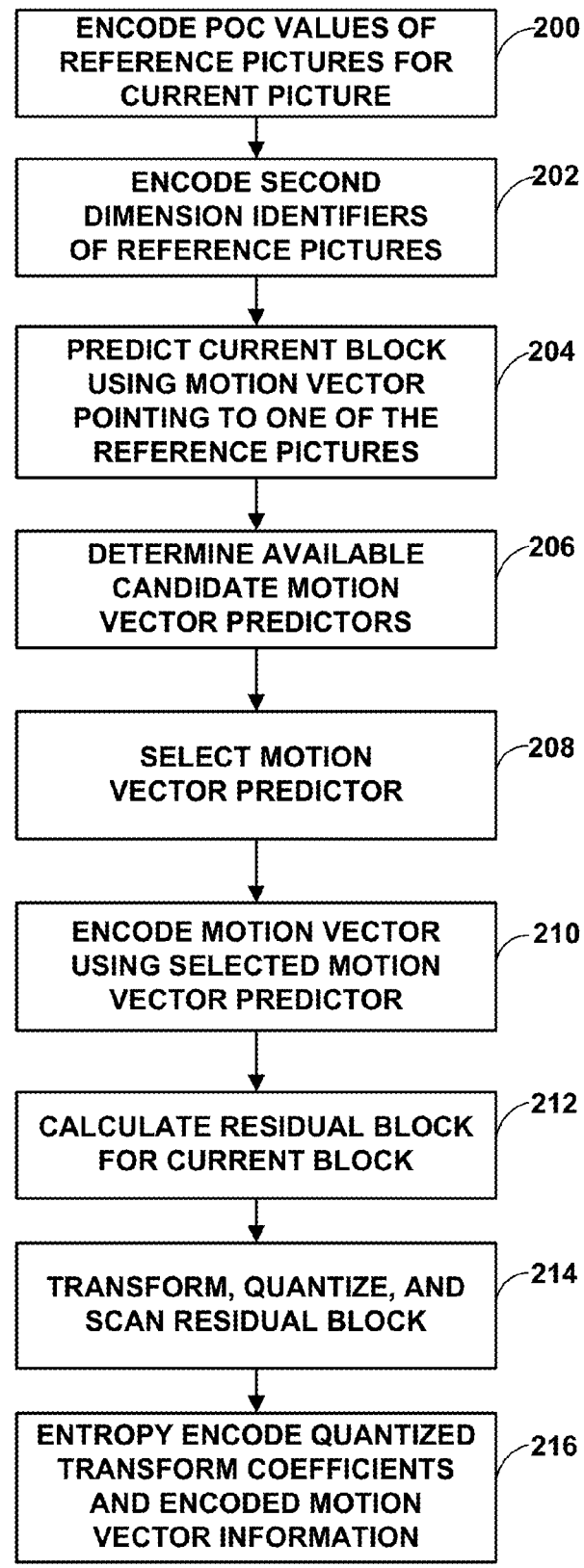
FIG. 11 is a flowchart illustrating an example method for encoding video data in accordance with the techniques of this disclosure.

FIG. 11 is a flowchart illustrating an example method for encoding video data in accordance with the techniques of this disclosure. The steps in the example method of FIG. 11 may, alternatively, be performed in a different order, or substantially in parallel, in some examples. Likewise, certain steps may be omitted, and/or other steps may be added. Although described as being performed by video encoder 20, it should be understood that other video encoding devices may be configured to perform a substantially similar method.

In this example, video encoder 20 encodes picture order count (POC) values of reference pictures for a current picture (200). For example, video encoder 20 may encode POC values, or data representative of the POC values (such as least significant bits (LSBs)) for certain reference pictures in a sequence parameter set (SPS) data structure for a sequence including the current picture. Video encoder 20 may also, additionally or alternatively, encode POC values for one or more reference pictures in a slice header of a current slice of the current picture. In some examples, video encoder 20 may encode data representing POC values of long-term reference pictures in an SPS and POC values of short-term reference pictures in a slice header. Video encoder 20 may also encode POC values of inter-view reference pictures, e.g., in the SPS, the slice header, or elsewhere. In general, POC values of inter-view reference pictures are the same as the POC value of the current picture being encoded.

Video encoder 20 may also encode second-dimension identifiers of the reference pictures (202). The second-dimension identifiers may include one or more of view identifiers for views including the reference pictures, view order indexes for the views including the reference pictures, a combination of the view order indexes and depth flags, layer identifiers for scalable video coding (SVC) layers including the reference pictures, and/or generic layer identifiers. In this manner, the combination of a POC value for a reference picture and the second-dimension identifier for the reference picture may be used to identify the reference picture.

Video encoder 20 may further perform a motion search for a current block of the current picture. That is, motion estimation unit 42 may search the reference pictures for a reference block that most closely matches the current block. This may result in motion information, including a motion vector, referring to the reference block as well as the reference picture in which the reference block occurs. Thus, motion compensation unit 44 of video encoder 20 may predict the current block using the motion vector that points to one of the reference pictures (204).

Video encoder 20 may also encode the motion vector, e.g., using advanced motion vector prediction (AMVP), temporal motion vector prediction (TMVP), or merge mode. In particular, video encoder 20 may determine a set of available candidate motion vector predictors (206). For example, referring to FIG. 10, video encoder 20 may determine whether motion vectors for neighboring blocks A0, A1, B0, B1, and B2 are available. In particular, in accordance with the techniques of this disclosure, video encoder 20 may determine that a motion vector of one of these neighboring blocks is not available when the motion vector of the neighboring block is of a different type than the motion vector for the current block. Similarly, video encoder 20 may determine whether a motion vector for a temporal motion vector predictor candidate refers to a different type of reference picture than the motion vector for the current block in determining whether the TMVP candidate is available for use as a predictor for coding the motion vector of the current block.

As explained above, examples different types of motion vectors include long-term motion vectors, short-term motion vectors, temporal motion vectors, and disparity motion vectors. Thus, video encoder 20 may determine a type for the motion vector of the current block, as well as types for the motion vectors of the neighboring blocks, and determine that motion vectors of the neighboring blocks of different types than the type for the current motion vector of the current block are not available for use as motion vector predictors for the current motion vector. To determine the types, video encoder 20 may refer to POC values of the reference pictures to which the candidate motion vectors refer, the POC value of the reference picture to which the current motion vector refers, the second-dimension identifiers of the reference pictures to which the candidate motion vectors refer, and/or the second-dimension identifier of the reference picture to which the current motion vector refers.

Subsequently, video encoder 20 may select one of the available candidate motion vector predictors from a neighboring block (which may include a co-located block in a previously coded picture and/or a corresponding block in a picture of a differnet view) as a motion vector predictor for the current motion vector (208). Video encoder 20 may then encode the current motion vector using the selected motion vector predictor (210).

Furthermore, video encoder 20 may calculate a residual block for the current block (212). As explained with respect to FIG. 2, summer 50 may calculate pixel-by-pixel differences between the original, uncoded block and the predicted block formed by motion compensation unit 44. Transform processing unit 52, quantization unit 54, and entropy encoding unit 56 may then, respectively, transform, quantize, and scan the residual block (214). Specifically, transform processing unit 52 may transform the residual block to produce a block of transform coefficients, quantization unit 52 may quantize the transform coefficients, and entropy encoding unit 56 may scan the quantized transform coefficients. Entropy encoding unit 56 may then entropy encode the quantized transform coefficients and the encoded motion vector information (216).

In this manner, the method of FIG. 11 represents an example of a method including encoding a picture order count (POC) value for a first picture of video data, encoding a second-dimension picture identifier for the first picture, and encoding, in accordance with a base video coding specification (or an extension of the base video coding specification), a second picture based at least in part on the POC value and the second-dimension picture identifier of the first picture. In addition, the method may include disabling motion vector prediction between a first motion vector of a first block of the second picture, wherein the first motion vector refers to a short-term reference picture, and a second motion vector of a second block of the second picture, wherein the second motion vector refers to a long-term reference picture. Additionally or alternatively, the method may include disabling motion vector prediction between a first motion vector of a first block of the second picture, wherein the first motion vector refers to an inter-view reference picture, and a second motion vector of a second block of the second picture, wherein the second motion vector refers to a temporal reference picture.

Figure 12:
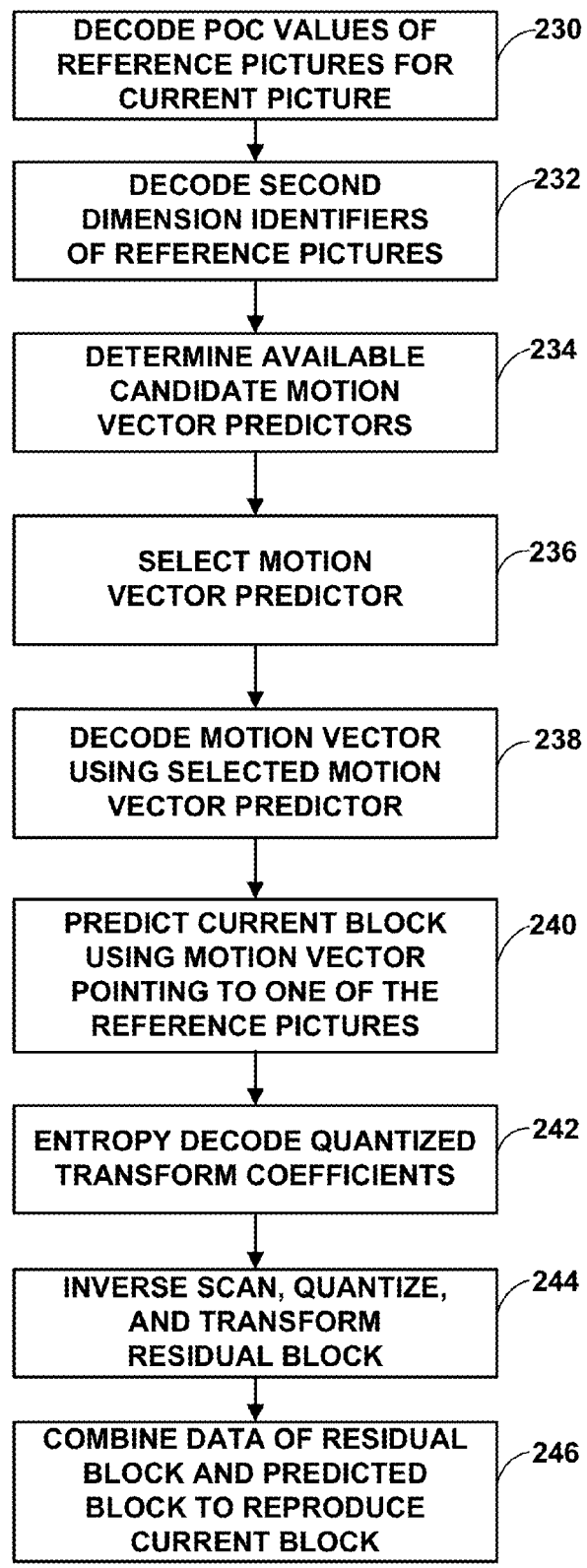
FIG. 12 is a flowchart illustrating an example method for decoding video data in accordance with the techniques of this disclosure.

FIG. 12 is a flowchart illustrating an example method for decoding video data in accordance with the techniques of this disclosure. The steps in the example method of FIG. 12 may, alternatively, be performed in a different order, or substantially in parallel, in some examples. Likewise, certain steps may be omitted, and/or other steps may be added. Although described as being performed by video decoder 30, it should be understood that other video decoding devices may be configured to perform a substantially similar method.

In this example, video decoder 30 decodes POC values of reference pictures for a current picture (230). For example, video decoder 30 may decode POC values, or data representative of the POC values (such as least significant bits (LSBs)) for certain reference pictures in a sequence parameter set (SPS) data structure for a sequence including the current picture. Video decoder 30 may reconstruct the POC values from decoded LSBs for the POC values by appending the LSBs to respective MSBs derived from, e.g., a previously decoded full POC value. Video decoder 30 may also, additionally or alternatively, decode POC values for one or more reference pictures in a slice header of a current slice of the current picture. In some examples, video decoder 30 may decode data representing POC values of long-term reference pictures in an SPS and POC values of short-term reference pictures in a slice header. Video decoder 30 may also decode POC values of inter-view reference pictures, e.g., in the SPS, the slice header, or elsewhere. In general, POC values of inter-view reference pictures are the same as the POC value of the current picture being encoded.

Video decoder 30 may also decode second dimension identifiers of the reference pictures (232). The second-dimension identifiers may include one or more of view identifiers for views including the reference pictures, view order indexes for the views including the reference pictures, a combination of the view order indexes and depth flags, layer identifiers for scalable video coding (SVC) layers including the reference pictures, and/or generic layer identifiers. In this manner, the combination of a POC value for a reference picture and the second-dimension identifier for the reference picture may be used to identify the reference picture. Thus, to identify a reference picture, motion information may include both a POC value and a second-dimension identifier for the reference picture.

Video decoder 30 may also decode a motion vector for a current block of the current picture. In particular, video decoder 30 may determine a set of available candidate motion vector predictors (234). For example, referring to FIG. 10, video decoder 30 may determine whether motion vectors for neighboring blocks A0, A1, B0, B1, and B2 are available. In particular, in accordance with the techniques of this disclosure, video decoder 30 may determine that a motion vector of one of these neighboring blocks is not available when the motion vector of the neighboring block is of a different type than the motion vector for the current block. Similarly, video decoder 30 may determine whether a motion vector for a temporal motion vector predictor candidate refers to a different type of reference picture than the motion vector for the current block in determining whether the TMVP candidate is available for use as a predictor for coding the motion vector of the current block.

As explained above, examples different types of motion vectors include long-term motion vectors, short-term motion vectors, temporal motion vectors, and disparity motion vectors. Thus, video decoder 30 may determine a type for the motion vector of the current block, as well as types for the motion vectors of the neighboring blocks, and determine that motion vectors of the neighboring blocks of different types than the type for the current motion vector of the current block are not available for use as motion vector predictors for the current motion vector. To determine the types, video decoder 30 may refer to POC values of the reference pictures to which the candidate motion vectors refer, the POC value of the reference picture to which the current motion vector refers, the second-dimension identifiers of the reference pictures to which the candidate motion vectors refer, and/or the second-dimension identifier of the reference picture to which the current motion vector refers.

Subsequently, video decoder 30 may select one of the available candidate motion vector predictors from a neighboring block (which may include a co-located block in a previously coded picture and/or a corresponding block in a picture of a differnet view) as a motion vector predictor for the current motion vector (236). Video decoder 30 may then decode the current motion vector using the selected motion vector predictor (238). For example, using AMVP, video decoder 30 may decode motion vector difference (MVD) values for the current motion vector, then apply the MVD values to the selected motion vector predictor. That is, video decoder 30 may add an x-component of the MVD value to an x-component of the selected motion vector predictor, and a y-component of the MVD value to a y-component of the selected motion vector predictor.

Motion compensation unit 72 of video decoder 30 may then predict the current block using the motion vector, which points to one of the reference pictures (240). That is, in addition to the motion vector itself, video decoder 30 may decode reference picture identifying information for the block to which the motion vector corresponds, such as a POC value and a second-dimension identifying value. In this manner, video decoder 30 may determine the reference picture to which the motion vector points using the POC value and the second-dimension identifying value. Accordingly, motion compensation unit 72 may form a predicted block for the current block using the motion vector and reference picture identifying information, that is, the POC value and the second dimension identifying value.

Entropy decoding unit 70 may further entropy decode quantized transform coefficients for a residual block corresponding to the current block (242). Entropy decoding unit 70, inverse quantization unit 76, and inverse transform unit 78, respectively, inverse scan, quantize, and transform the quantized transform coefficients to reproduce the residual block (244). Summer 80 of video decoder 30 may then combine (that is, add, on a pixel-by-pixel basis) the predicted block and the residual block, to reproduce the current block (246).

In this manner, the method of FIG. 12 represents an example of a method including decoding a picture order count (POC) value for a first picture of video data, decoding a second-dimension picture identifier for the first picture, and decoding, in accordance with a base video coding specification (or an extension of the base video coding specification), a second picture based at least in part on the POC value and the second-dimension picture identifier of the first picture. In addition, the method may include disabling motion vector prediction between a first motion vector of a first block of the second picture, wherein the first motion vector refers to a short-term reference picture, and a second motion vector of a second block of the second picture, wherein the second motion vector refers to a long-term reference picture. Additionally or alternatively, the method may include disabling motion vector prediction between a first motion vector of a first block of the second picture, wherein the first motion vector refers to an inter-view reference picture, and a second motion vector of a second block of the second picture, wherein the second motion vector refers to a temporal reference picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a first motion vector of a first block of a picture refers to a short-term reference picture;
   determining that a second motion vector of a second block of the picture refers to a long-term reference picture; and
   based on the determination that the first motion vector refers to the short-term reference picture and the determination that the second motion vector refers to the long-term reference picture, disabling motion vector prediction between the first motion vector of the first block of the picture and the second motion vector of the second block of the picture, wherein the first block and the second block are spatial neighbors in the picture, and wherein disabling motion vector prediction between the first motion vector and the second motion vector comprises:
   at least one of processing a value for a flag indicating whether the second motion vector is available for use as a first motion vector predictor for the first motion value equal to a value indicating that the second motion vector is not available for use as the first motion vector predictor for the first motion vector or processing a value for a flag indicating whether the first motion vector is available for use as a second motion vector predictor for the second motion value equal to a value indicating that the first motion vector is not available for use as the second motion vector predictor for the second motion vector; and
   decoding the first motion vector without using the second motion vector to predict the first motion vector and decoding the second motion vector without using the first motion vector to predict the second motion vector.

2. The method of claim 1, further comprising:
   enabling prediction between a first short-term motion vector of the picture and a second short-term motion vector of the picture; and
   scaling at least one of the first short-term motion vector and the second short-term motion vector based on a picture order count (POC) value for a first short-term reference picture referred to by the first short-term motion vector and a POC value for a second short-term reference picture referred to by the second short-term motion vector.

3. The method of claim 1, further comprising decoding a value indicating whether a second picture of the video data comprises a long-term reference picture, wherein the value indicating whether the second picture comprises the long-term reference picture further indicates whether the second picture is used for inter-view prediction.

4. The method of claim 1,
   wherein determining that the first motion vector of the first block of the second picture refers to the short-term reference picture comprises determining that the first motion vector refers to a first reference picture marked as used for short-term reference, and
   wherein determining that the second motion vector of the second block of the second picture refers to the long-term reference picture comprises determining that the second motion vector refers to a second reference picture marked as used for long-term reference.

5. The method of claim 1, wherein the picture comprises a second picture, the method further comprising:
   decoding data of the second picture that refers to a picture order count (POC) value for a first picture of video data;
   decoding data of the second picture that refers to a second-dimension picture identifier for the first picture; and
   decoding, in accordance with a base video coding specification, the second picture based at least in part on the POC value and the second-dimension picture identifier of the first picture.

6. The method of claim 5, wherein decoding the second picture comprises:
   identifying the first picture using the POC value and the second-dimension picture identifier; and
   decoding at least a portion of the second picture relative to the first picture.

7. The method of claim 6, wherein identifying the first picture comprises identifying the first picture during decoding of a motion vector for a block of the second picture, wherein decoding of the motion vector comprises decoding the motion vector according to at least one of advanced motion vector prediction (AMVP), temporal motion vector prediction (TMVP), and merge mode.

8. The method of claim 5, further comprising decoding, in accordance with an extension to the base video coding specification, a third picture based at least in part on the POC value and the second-dimension picture identifier of the first picture.

9. The method of claim 8, further comprising, prior to decoding the third picture, marking all inter-view reference pictures, including the first picture, as long-term reference pictures.

10. The method of claim 9, further comprising:
    storing a status for each of the inter-view reference pictures for the third picture, wherein the status comprises one of long-term reference picture, short-term reference picture, and unused for reference, prior to marking the inter-view reference pictures as long-term reference pictures, wherein the inter-view reference pictures include the first picture; and
    after decoding the second picture, setting new statuses for each of the inter-view reference pictures based on the stored statuses.

11. The method of claim 8, wherein the base video coding specification comprises High Efficiency Video Coding (HEVC) base specification, and wherein the extension to the base video coding specification comprises one of a Scalable Video Coding (SVC) extension to the HEVC base specification and a Multiview Video Coding (MVC) extension to the HEVC base specification.

12. The method of claim 8, wherein the second-dimension picture identifier comprises at least one of a view identifier for a view including the first picture, a view order index for the view including the first picture, a combination of the view order index and a depth flag, a layer identifier for a scalable video coding (SVC) layer including the first picture, and a generic layer identifier.

13. The method of claim 8, further comprising, after decoding the third picture, marking each inter-view reference picture as one of a long-term reference picture, a short-term reference picture, and unused for reference.

14. The method of claim 13, further comprising:
after marking an inter-view reference picture as a long-term reference picture, assigning the inter-view reference picture a new POC value that is currently unused; and
after decoding the second picture, restoring an original POC value for the inter-view reference picture.

15. The method of claim 14, wherein the original POC value comprises the POC value of the first picture.

16. A method of encoding video data, the method comprising:
determining that a first motion vector of a first block of a picture refers to a short-term reference picture;
determining that a second motion vector of a second block of the picture refers to a long-term reference picture; and
based on the determination that the first motion vector refers to the short-term reference picture and the determination that the second motion vector refers to the long-term reference picture, disabling motion vector prediction between the first motion vector of the first block of the picture and the second motion vector of the second block of the picture, wherein the first block and the second block are spatial neighbors in the picture, and wherein disabling motion vector prediction between the first motion vector and the second motion vector comprises:
at least one of processing a value for a flag indicating whether the second motion vector is available for use as a first motion vector predictor for the first motion value equal to a value indicating that the second motion vector is not available for use as the first motion vector predictor for the first motion vector or processing a value for a flag indicating whether the first motion vector is available for use as a second motion vector predictor for the second motion value equal to a value indicating that the first motion vector is not available for use as the second motion vector predictor for the second motion vector; and
encoding the first motion vector without using the second motion vector to predict the first motion vector and encoding the second motion vector without using the first motion vector to predict the second motion vector.

17. The method of claim 16, further comprising:
enabling prediction between a first short-term motion vector of the picture and a second short-term motion vector of the picture; and
scaling at least one of the first short-term motion vector and the second short-term motion vector based on a picture order count (POC) value for a first short-term reference picture referred to by the first short-term motion vector and a POC value for a second short-term reference picture referred to by the second short-term motion vector.

18. The method of claim 16, wherein the second-dimension picture identifier comprises at least one of a view identifier for a view including the first picture, a view order index for the view including the first picture, a combination of the view order index and a depth flag, a layer identifier for a scalable video coding (SVC) layer including the first picture, and a generic layer identifier.

19. The method of claim 16, further comprising encoding a value indicating whether a second picture of the video data comprises a long-term reference picture, wherein the value indicating whether the second picture comprises the long-term reference picture further indicates whether the second picture is used for inter-view prediction.

20. The method of claim 16,
wherein determining that the first motion vector of the first block of the second picture refers to the short-term reference picture comprises determining that the first motion vector refers to a first reference picture marked as used for short-term reference, and
wherein determining that the second motion vector of the second block of the second picture refers to the long-term reference picture comprises determining that the second motion vector refers to a second reference picture marked as used for long-term reference.

21. The method of claim 16, wherein the picture comprises a second picture, the method further comprising:
encoding data of a second picture that refers to a picture order count (POC) value for a first picture of video data;
encoding data of the second picture that refers to a second-dimension picture identifier for the first picture; and
encoding, in accordance with a base video coding specification, the second picture based at least in part on the POC value and the second-dimension picture identifier of the first picture.

22. The method of claim 21, further comprising:
identifying the first picture using the POC value and the second-dimension picture identifier; and
coding at least a portion of the second picture relative to the first picture.

23. The method of claim 22, wherein identifying the first picture comprises identifying the first picture during encoding of the motion vector for a block of the second picture, wherein encoding of the motion vector comprises encoding the motion vector according to at least one of advanced motion vector prediction (AMVP), temporal motion vector prediction (TMVP), and merge mode.

24. The method of claim 21, further comprising encoding, in accordance with an extension to the base video coding specification, a third picture based at least in part on the POC value and the second-dimension picture identifier of the first picture.

25. The method of claim 24, further comprising, prior to encoding the third picture, marking all inter-view reference pictures as long-term reference pictures.

26. The method of claim 25, further comprising:
storing a status for each of the inter-view reference pictures, wherein the status comprises one of long-term reference picture, short-term reference picture, and unused for reference, prior to marking the inter-view reference pictures as long-term reference pictures; and
after encoding the second picture, setting new statuses for each of the inter-view reference pictures based on the stored statuses.

27. The method of claim 24, further comprising, after encoding the third picture, marking each inter-view reference picture as one of a long-term reference picture, a short-term reference picture, and unused for reference.

28. The method of claim 27, further comprising:
after marking an inter-view reference picture as a long-term reference picture, assigning the inter-view reference picture a new POC value that is currently unused; and
after encoding the second picture, restoring an original POC value for the inter-view reference picture.

29. The method of claim 28, wherein the original POC value comprises the POC value of the second picture.

30. The method of claim 24, wherein the base video coding specification comprises High Efficiency Video Coding (HEVC) base specification, and wherein the extension to the base video coding specification comprises one of a Scalable Video Coding (SVC) extension to the HEVC base specification and a Multiview Video Coding (MVC) extension to the HEVC base specification.

31. A device for decoding video data, the device comprising:
   a memory configured to store video data; and
   a video decoder configured to:
   determine that a first motion vector of a first block of a picture refers to a short-term reference picture,
   determine that a second motion vector of a second block of the picture refers to a long-term reference picture, and
   based on the determination that the first motion vector refers to the short-term reference picture and the determination that the second motion vector refers to the long-term reference picture, disable motion vector prediction between the first motion vector of the first block of the picture and the second motion vector of the second block of the picture, wherein the first block and the second block are spatial neighbors in the picture, and wherein to disable motion vector prediction between the first motion vector and the second motion vector, the video decoder is configured to:
   at least one of process a value for a flag indicating whether the second motion vector is available for use as a first motion vector predictor for the first motion value equal to a value indicating that the second motion vector is not available for use as the first motion vector predictor for the first motion vector or process a value for a flag indicating whether the first motion vector is available for use as a second motion vector predictor for the second motion value equal to a value indicating that the first motion vector is not available for use as the second motion vector predictor for the second motion vector; and
   decode the first motion vector without using the second motion vector to predict the first motion vector and decode the second motion vector without using the first motion vector to predict the second motion vector.

32. The device of claim 31, wherein the device comprises at least one of:
   an integrated circuit;
   a microprocessor; and
   a wireless communication device that includes the video decoder.

33. The device of claim 31, wherein the video decoder is configured to enable prediction between a first short-term motion vector of the picture and a second short-term motion vector of the picture, and scale at least one of the first short-term motion vector and the second short-term motion vector based on a picture order count (POC) value for a first short-term reference picture referred to by the first short-term motion vector and a POC value for a second short-term reference picture referred to by the second short-term motion vector.

34. The device of claim 31, wherein the second-dimension picture identifier comprises at least one of a view identifier for a view including the first picture, a view order index for the view including the first picture, a combination of the view order index and a depth flag, a layer identifier for a scalable video coding (SVC) layer including the first picture, and a generic layer identifier.

35. The device of claim 31, wherein the video decoder is configured to decode a value indicating whether a second picture of the video data comprises a long-term reference picture, wherein the value indicating whether the second picture comprises the long-term reference picture further indicates whether the second picture is used for inter-view prediction.

36. The device of claim 31,
   wherein to determine that the first motion vector of the first block of the second picture refers to the short-term reference picture, the video decoder is configured to determine that the first motion vector refers to a first reference picture marked as used for short-term reference, and
   wherein to determine that the second motion vector of the second block of the second picture refers to the long-term reference picture, the video decoder is configured to determine that the second motion vector refers to a second reference picture marked as used for long-term reference.

37. The device of claim 31, wherein the picture comprises a second picture, and wherein the video decoder is further configured to:
   decode data of the second picture that refers to a picture order count (POC) value for a first picture of the video data,
   decode data of the second picture that refers to a second-dimension picture identifier for the first picture, and
   decode, in accordance with a base video coding specification, the second picture based at least in part on the POC value and the second-dimension picture identifier of the first picture.

38. The device of claim 37, wherein the video decoder is configured to identify the first picture using the POC value and the second-dimension picture identifier, and decode at least a portion of the second picture relative to the first picture.

39. The device of claim 38, wherein the video decoder is configured to identify the first picture during decoding of a motion vector for a block of the second picture, and wherein the video decoder is configured to decode the motion vector according to at least one of advanced motion vector prediction (AMVP), temporal motion vector prediction (TMVP), and merge mode.

40. The device of claim 37, wherein the video decoder is further configured to decode, in accordance with an extension to the base video coding specification, a third picture based at least in part on the POC value and the second-dimension picture identifier of the first picture.

41. The device of claim 40, wherein the video decoder is configured to mark all inter-view reference pictures for the third picture, including the first picture, as long-term reference pictures prior to decoding the third picture, store a status for each of the inter-view reference pictures, wherein the status comprises one of long-term reference picture, short-term reference picture, and unused for reference prior to marking the inter-view reference pictures as long-term reference pictures, and, after decoding the third picture, set new statuses for each of the inter-view reference pictures based on the stored statuses.

42. The device of claim 40, wherein the video decoder is further configured to mark each inter-view reference picture for the third picture, including the first picture, as one of a long-term reference picture, a short-term reference picture, and unused for reference after decoding the third picture, assign each of the inter-view reference pictures a new POC value that is currently unused after marking an inter-view reference picture as a long-term reference picture, and restore an original POC value for the inter-view reference picture after decoding the second picture.

43. A device for encoding video data, the device comprising:
a memory configured to store video data; and
a video encoder configured to:
determine that a first motion vector of a first block of a picture refers to a short-term reference picture,
determine that a second motion vector of a second block of the picture refers to a long-term reference picture, and
based on the determination that the first motion vector refers to the short-term reference picture and the determination that the second motion vector refers to the long-term reference picture, disable motion vector prediction between the first motion vector of the first block of the picture and the second motion vector of the second block of the picture, wherein the first block and the second block are spatial neighbors in the picture, and wherein to disable motion vector prediction between the first motion vector and the second motion vector, the video encoder is configured to:
at least one of process a value for a flag indicating whether the second motion vector is available for use as a first motion vector predictor for the first motion value equal to a value indicating that the second motion vector is not available for use as the first motion vector predictor for the first motion vector or process a value for a flag indicating whether the first motion vector is available for use as a second motion vector predictor for the second motion value equal to a value indicating that the first motion vector is not available for use as the second motion vector predictor for the second motion vector; and
encode the first motion vector without using the second motion vector to predict the first motion vector and encode the second motion vector without using the first motion vector to predict the second motion vector.

44. The device of claim 43, wherein the video encoder is configured to enable prediction between a first short-term motion vector of the picture and a second short-term motion vector of the picture, and scale at least one of the first short-term motion vector and the second short-term motion vector based on a picture order count (POC) value for a first short-term reference picture referred to by the first short-term motion vector and a POC value for a second short-term reference picture referred to by the second short-term motion vector.

45. The device of claim 43, wherein the second-dimension picture identifier comprises at least one of a view identifier for a view including the first picture, a view order index for the view including the first picture, a combination of the view order index and a depth flag, a layer identifier for a scalable video coding (SVC) layer including the first picture, and a generic layer identifier.

46. The device of claim 43, wherein the video encoder is configured to encode a value indicating whether a second picture of the video data comprises a long-term reference picture, wherein the value indicating whether the second picture comprises the long-term reference picture further indicates whether the second picture is used for inter-view prediction.

47. The device of claim 43,
wherein to determine that the first motion vector of the first block of the second picture refers to the short-term reference picture, the video encoder is configured to determine that the first motion vector refers to a first reference picture marked as used for short-term reference, and
wherein to determine that the second motion vector of the second block of the second picture refers to the long-term reference picture, the video encoder is configured to determine that the second motion vector refers to a second reference picture marked as used for long-term reference.

48. The device of claim 43, wherein the picture comprises a second picture, and wherein the video encoder is further configured to:
encode data of the second picture that refers to a picture order count (POC) value for a first picture of video data,
encode data of the second picture that refers to a second-dimension picture identifier for the first picture, and
encode, in accordance with a base video coding specification, the second picture based at least in part on the POC value and the second-dimension picture identifier of the first picture.

49. The device of claim 48, wherein the video encoder is configured to identify the first picture using the POC value and the second-dimension picture identifier, and encode at least a portion of the second picture relative to the first picture.

50. The device of claim 49, wherein the video encoder is configured to identify the first picture during encoding of a motion vector for a block of the second picture, and wherein the video encoder is configured to encode the motion vector according to at least one of advanced motion vector prediction (AMVP), temporal motion vector prediction (TMVP), and merge mode.

51. The device of claim 48, wherein the video encoder is further configured to encode, in accordance with an extension to the base video coding specification, a third picture based at least in part on the POC value and the second-dimension picture identifier of the first picture.

52. The device of claim 51, wherein the video encoder is configured to mark all inter-view reference pictures for the third picture, including the first picture, as long-term reference pictures prior to encoding the third picture, store a status for each of the inter-view reference pictures, wherein the status comprises one of long-term reference picture, short-term reference picture, and unused for reference prior to marking the inter-view reference pictures as long-term reference pictures, and, after encoding the third picture, set new statuses for each of the inter-view reference pictures based on the stored statuses.

53. The device of claim 51, wherein the video encoder is further configured to mark each inter-view reference picture for the third picture, including the first picture, as one of a long-term reference picture, a short-term reference picture, and unused for reference after encoding the third picture, assign each of the inter-view reference pictures a new POC value that is currently unused after marking an inter-view reference picture as a long-term reference picture, and restore an original POC value for the inter-view reference picture after encoding the second picture.

54. A device for encoding video data, the device comprising:
means for determining that a first motion vector of a first block of a picture refers to a short-term reference picture;
means for determining that a second motion vector of a second block of the picture refers to a long-term reference picture; and
means for disabling, based on the determination that the first motion vector refers to the short-term reference picture and the determination that the second motion vector refers to the long-term reference picture, motion vector prediction between the first motion vector of the first block of the picture and the second motion vector of the second block of the picture, wherein the first block and the second block are spatial neighbors in the picture, and wherein the means for disabling motion vector prediction between the first motion vector and the second motion vector comprises:

at least one of means for processing a value for a flag indicating whether the second motion vector is available for use as a first motion vector predictor for the first motion value equal to a value indicating that the second motion vector is not available for use as the first motion vector predictor for the first motion vector or means for processing a value for a flag indicating whether the first motion vector is available for use as a second motion vector predictor for the second motion value equal to a value indicating that the first motion vector is not available for use as the second motion vector predictor for the second motion vector; and means for encoding the first motion vector without using the second motion vector to predict the first motion vector and means for encoding the second motion vector without using the first motion vector to predict the second motion vector.

55. The device of claim 54,
wherein the means for determining that the first motion vector of the first block of the second picture refers to the short-term reference picture comprises means for determining that the first motion vector refers to a first reference picture marked as used for short-term reference, and
wherein the means for determining that the second motion vector of the second block of the second picture refers to the long-term reference picture comprises means for determining that the second motion vector refers to a second reference picture marked as used for long-term reference.

56. The device of claim 54, wherein the picture comprises a second picture, further comprising:
means for encoding data of the second picture that refers to a picture order count (POC) value for a first picture of video data;
means for encoding data of the second picture that refers to a second-dimension picture identifier for the first picture; and
means for encoding, in accordance with a base video coding specification, the second picture based at least in part on the POC value and the second-dimension picture identifier of the first picture.

57. A computer-readable storage medium having stored thereon instructions that, when executed, cause a processor to:
determine that a first motion vector of a first block of a picture refers to a short-term reference picture;
determine that a second motion vector of a second block of the picture refers to a long-term reference picture; and based on the determination that the first motion vector refers to the short-term reference picture and the determination that the second motion vector refers to the long-term reference picture, disable motion vector prediction between the first motion vector of the first block of the picture and the second motion vector of the second block of the picture, wherein the first block and the second block are spatial neighbors in the picture, and wherein the instructions that cause the processor to disable motion vector prediction between the first motion vector and the second motion vector comprise instructions that cause the processor to:

at least one of process a value for a flag indicating whether the second motion vector is available for use as a first motion vector predictor for the first motion value equal to a value indicating that the second motion vector is not available for use as the first motion vector predictor for the first motion vector or process a value for a flag indicating whether the first motion vector is available for use as a second motion vector predictor for the second motion value equal to a value indicating that the first motion vector is not available for use as the second motion vector predictor for the second motion vector; and decode the first motion vector without using the second motion vector to predict the first motion vector and decode the second motion vector without using the first motion vector to predict the second motion vector.

58. The computer-readable storage medium of claim 57, wherein the instructions that cause the processor to determine that the first motion vector of the first block of the second picture refers to the short-term reference picture comprises instructions that cause the processor to determine that the first motion vector refers to a first reference picture marked as used for short-term reference, and
wherein the instructions that cause the processor to determine that the second motion vector of the second block of the second picture refers to the long-term reference picture comprises instructions that cause the processor to determine that the second motion vector refers to a second reference picture marked as used for long-term reference.

59. The computer-readable storage medium of claim 57, wherein the picture comprises a second picture, further comprising instructions that cause the processor to:
decode data of a second picture that refers to a picture order count (POC) value for a first picture of video data;
decode data of the second picture that refers to a second-dimension picture identifier for the first picture; and
decode, in accordance with a base video coding specification, the second picture based at least in part on the POC value and the second-dimension picture identifier of the first picture.

* * * * *